United States Patent
Xue et al.

(10) Patent No.: US 11,864,231 B2
(45) Date of Patent: Jan. 2, 2024

(54) LISTEN-BEFORE-TALK (LBT) AWARE AUTONOMOUS SENSING FOR SIDELINK

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US); Ozcan Ozturk, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/305,454

(22) Filed: Jul. 7, 2021

(65) Prior Publication Data
US 2022/0061095 A1    Feb. 24, 2022

Related U.S. Application Data

(60) Provisional application No. 62/706,501, filed on Aug. 20, 2020.

(51) Int. Cl.
| | |
|---|---|
| H04W 56/00 | (2009.01) |
| H04W 74/08 | (2009.01) |
| H04W 74/00 | (2009.01) |
| H04W 80/02 | (2009.01) |
| H04W 72/0446 | (2023.01) |
| H04W 72/02 | (2009.01) |

(52) U.S. Cl.
CPC ....... *H04W 74/0816* (2013.01); *H04W 72/02* (2013.01); *H04W 72/0446* (2013.01); *H04W 74/008* (2013.01); *H04W 80/02* (2013.01)

(58) Field of Classification Search
CPC ............ H04W 74/0816; H04W 72/02; H04W 72/0446; H04W 74/008; H04W 80/02
USPC .......................................................... 370/329
See application file for complete search history.

(56) References Cited

U.S. PATENT DOCUMENTS

| | | | |
|---|---|---|---|
| 2009/0247241 A1* | 10/2009 | Gollnick | ............. G06F 15/0225 455/574 |
| 2019/0281588 A1 | 9/2019 | Zhang et al. | |

(Continued)

OTHER PUBLICATIONS

"Li, Ying Yang, A User Equipment and Data Transmission Method Thereof, 2017, Samsung, EP 3603307, 33 Pages" (Year: 2017).*

(Continued)

*Primary Examiner* — Sai Ming Chan
(74) *Attorney, Agent, or Firm* — QUALCOMM Incorporated

(57) ABSTRACT

Wireless communications systems and methods related to LBT aware autonomous sidelink sensing are provided. A first UE determines, based on a projected listen-before-talk (LBT) completion time, at least one of a sensing window or a first resource selection window. The first UE senses, based on the determining, in a sidelink resource pool within a shared radio frequency band during the sensing window. The first UE identifies, based on the sensing, a subset of resources from the sidelink resource pool that are within the first resource selection window. The first UE selects at least a first resource from the subset of resources. The first UE transmits, to a second UE using the selected first resource, a sidelink transmission.

30 Claims, 14 Drawing Sheets

(56) References Cited

U.S. PATENT DOCUMENTS

| | | | | |
|---|---|---|---|---|
| 2020/0029340 | A1* | 1/2020 | He | H04W 72/10 |
| 2020/0351037 | A1* | 11/2020 | Lee | H04L 1/1893 |
| 2020/0396024 | A1* | 12/2020 | Ganesan | H04L 1/1896 |
| 2021/0100031 | A1* | 4/2021 | Cirik | H04W 24/04 |
| 2021/0392683 | A1* | 12/2021 | Awadin | H04B 7/088 |
| 2021/0410129 | A1* | 12/2021 | Freda | H04W 72/087 |
| 2022/0167397 | A1* | 5/2022 | Thangarasa | H04W 74/08 |
| 2022/0183036 | A1* | 6/2022 | Noh | H04W 72/0446 |
| 2022/0279579 | A1* | 9/2022 | He | H04W 72/0446 |
| 2022/0279581 | A1* | 9/2022 | Baek | H04W 64/00 |

OTHER PUBLICATIONS

"Zhou, Jue-jia, Retransmission Information of a Method, Device, Base Station and Terminal, Oct. 16, 2018, CN 109496400" (Year: 2018).*

3GPP TS 38.214: "3rd Generation Partnership Project, Technical Specification Group Radio Access Network, NR, Physical Layer Procedures for Data (Release 16)", 3GPP Standard, Technical Specification, 3GPP TS 38.214 V16.2.0 (Jun. 2020), 3rd Generation Partnership Project (3GPP), Mobile Competence Centre, 650, Route Des Lucioles, F-06921 Sophia-Antipolis Cedex, France, vol. RAN WG1, No. V16.2.0, Jul. 20, 2020 (Jul. 20, 2020), XP051925549, pp. 1-163, Retrieved from the Internet: URL:ftp://ftp.3gpp.org/Specs/archive/38_series/38.214/38214-g20.zip, 38214-g20.docx [retrieved on Jul. 20, 2020] clause 6.2.1.4, Section 1 Section 8.1.4.

Huawei., et al., "Sidelink Resource Allocation Mode 2 for NR V2X", 3GPP Draft, R1-1911884, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823066, 14 Pages, Retrieved from the Internet: URL: https://ftp.3gpp.org/tsg_ran/WG1_RL1/TSGR1_99/Docs/R1-1911884.zip R1-1911884.docx [retrieved on Nov. 9, 2019], the Whole Document, Sections 2.4, 2.4.1. 2.4.2, 2.4.3.2.2.4.3.2.3.

International Search Report and Written Opinion—PCT/US2021/040972—ISA/EPO—dated Nov. 11, 2021.

NTT DOCOMO., et al., "NR Sidelink Resource Allocation Mechanism Mode 2", 3GPP Draft, 3GPP TSG RAN WG1 #98, R1-1909187, NR Sidelink Resource Allocation Mechanism Mode 2, 3rd Generation Partnership Project (3GPP), Mobile Competence Centre, 650, Route Des Lucioles, F-06921 Sophia-Antipolis Cedex, vol. RAN WG1, No. Prague, Czech Rep, Aug. 26, 2019-Aug. 30, 2019, Aug. 17, 2019 (Aug. 17, 2019), XP051765792, 7 Pages, Retrieved from the Internet: URL: http://www.3gpp.org/ftp/tsg_ran/WG1_RL1/TSGR1_98/Docs/R1-1909187.zip [retrieved on Aug. 17, 2019] Figures 1, 2 Sections 1-3.

Samsung: "Discussion on Resource Allocation Mechanisms for NR V2X", 3GPP Draft, 3GPP TSG RAN WG1 Meeting #95, R1-1812987 Discussion on Resource Allocation Mechanisms for NR V2X, 3rd Generation Partnership Project (3GPP), Mobile Competence Centre, 650, Route Des Lucioles, F-06921 Sophia-Antipolis, vol. RAN WG1, No. Spokane, USA, Nov. 12, 2018-Nov. 16, 2018 Nov. 11, 2018 (Nov. 11, 2018), XP051554966, 7 Pages, Retrieved from the Internet: URL: http://www.3gpp.org/ftp/Meetings%5F3GPP%5FSYNC/RAN1/Docs/R1%2D1812987%2Ezip [retrieved on Nov. 11, 2018] the whole document.

* cited by examiner

LISTEN-BEFORE-TALK (LBT) AWARE AUTONOMOUS SENSING FOR SIDELINK

CROSS-REFERENCE TO RELATED APPLICATIONS

The present application claims priority to and the benefit of U.S. Provisional Application No. 62/706,501, filed Aug. 20, 2020, which is hereby incorporated by reference in its entirety as if fully set forth below and for all applicable purposes.

TECHNICAL FIELD

This application relates to wireless communication systems, and more particularly to listen-before-talk (LBT) aware autonomous sensing for sidelink over a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), the method includes determining, based on a projected listen-before-talk (LBT) completion time, at least one of a sensing window or a first resource selection window; sensing, based on the determining, in a sidelink resource pool within a shared radio frequency band; identifying, based on the sensing, a subset of resources from the sidelink resource pool that are within the first resource selection window; selecting at least a first resource from the subset of resources; and transmitting, to a second UE using the selected first resource, a sidelink transmission.

In an additional aspect of the disclosure, a first user equipment (UE) includes a processor configured to determine, based on a projected listen-before-talk (LBT) completion time, at least one of a sensing window or a first resource selection window; sense, based on the determining, in a sidelink resource pool within a shared radio frequency band; identify, based on the sensing, a subset of resources from the sidelink resource pool that are within the first resource selection window; and select at least a first resource from the subset of resources; and a transceiver configured to transmit, to a second UE using the selected first resource, a sidelink transmission.

In an additional aspect of the disclosure, a non-transitory computer-readable medium having program code recorded thereon, the program code includes code for causing a first user equipment (UE) to determine, based on a projected listen-before-talk (LBT) completion time, at least one of a sensing window or a first resource selection window; code for causing the first UE to sense, based on the determining, in a sidelink resource pool within a shared radio frequency band; code for causing the first UE to identify, based on the sensing, a subset of resources from the sidelink resource pool that are within the first resource selection window; code for causing the first UE to select at least a first resource from the subset of resources; and code for causing the first UE to transmit, to a second UE using the selected first resource, a sidelink transmission.

In an additional aspect of the disclosure, a first user equipment (UE) includes means for determining, based on a projected listen-before-talk (LBT) completion time, at least one of a sensing window or a first resource selection window; means for sensing, based on the determining, in a sidelink resource pool within a shared radio frequency band; means for identifying, based on the sensing, a subset of resources from the sidelink resource pool that are within the first resource selection window; means for selecting at least a first resource from the subset of resources; and means for transmitting, to a second UE using the selected first resource, a sidelink transmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
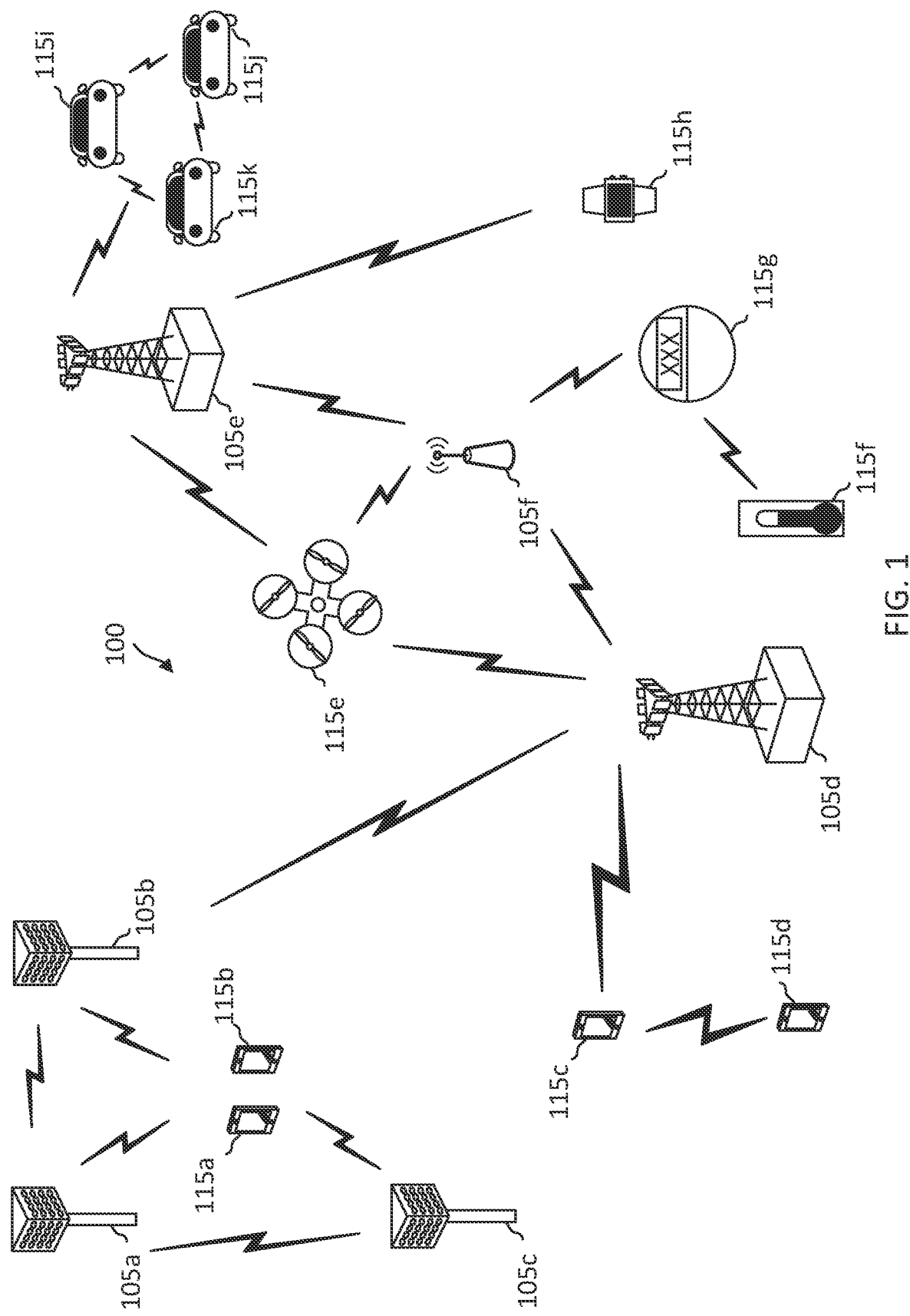
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and as a receiving sidelink UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

For mode-2 RRA, a sidelink UE may perform sensing in a sidelink resource pool. The sensing may include decoding SCI and/or measuring signal energy in the channel. For SCI decoding, the UE may blindly decode SCI from a PSCCH of each resource. If the decoding is successful, the UE may record the decoded SCI. For signal measurements, the UE may receive a signal from each resource and compute a reference signal received power (RSRP) and/or receive signal strength indicator (RSSI) for each resource. The UE may also record the signal measurements. The UE may generate a packet (e.g., a medium access control (MAC), packet data unit (PDU)) for transmission. Upon generating the packet, the UE may trigger a resource selection. The UE may define a sensing window and a resource selection window in the resource pool with respect to a time when the resource selection is triggered. The sensing window may be located prior to the trigger, and the resource selection window may be located after the trigger. The UE may determine the sensing window and the resource selection window based on a set of parameters, which may be preconfigured and/or predetermined). The UE may identify candidate resources within the resource selection window based on past sensing results (e.g., decoded SCI and/or signal measurements) obtained in the sensing window. In other words, the UE may predict resource usages in the resource selection window based on the past sensing results. The UE may randomly select a resource from the identified candidate resources. The UE may transmit a sidelink transmission (e.g., including SCI in a PSCCH and the packet in a PSSCH) using the selected resource. In some instances, the UE may select multiple resources from the candidate resources, for example, a first resource for an initial transmission of the packet and a second resource for a retransmission of the packet when hybrid automatic repeat request (HARQ) is used for the packet transmission.

The deployment of NR over an unlicensed spectrum is referred to as NR-unlicensed (NR-U). Some studies have been conducted for NR-U deployment over 5 gigahertz (GHz) unlicensed bands. Channel access in an unlicensed band may be regulated by regulations. For instance, LBT is imposed on some unlicensed bands. To perform an LBT, a transmitting node may listen to the channel to determine whether there are active transmissions in the channel (e.g., based on channel signal energy measurements). When the channel is idle, the transmitting node may transmit in the channel. However, if the channel is busy, the transmitting node may refrain from accessing the channel Thus, LBT can lead to channel access uncertainty. The autonomous mode-2 RRA and sensing are designed to operate over a licensed band, and thus may not account for channel access uncertainty. For instance, the set of predetermined and/or preconfigured parameters may not account for channel access uncertainty. Thus, a resource selection window defined based on the predetermined and/or preconfigured parameters may start before an LBT is completed, and thus the resource selection window may be outdated. Additionally, the duration of the resource selection window based on the predetermined and/or preconfigured parameters may be too short to accommodate an LBT prior to the retransmission resource (the second resource).

The present application describes mechanisms for LBT aware autonomous sidelink sensing over a shared radio frequency band (e.g., in a shared spectrum or an unlicensed spectrum). For example, upon generating a MAC PDU ready for transmission, a first UE may project an LBT completion time based on various factors, such as a contention window size, a traffic type or priority of the MAC PDU transmission and various other LBT parameters. The first UE may determine at least one of a sensing window or resource selection window based on the projected LBT completion time. For instance, the first UE may define the resource selection window such that the resource selection window starts after the projected LBT completion time and has a duration long enough to accommodate an LBT (e.g., with a projected LBT duration) prior to a retransmission resource. The first UE may trigger a resource selection based on the projected LBT completion time instead of at the time when the MAC PDU is generated. The first UE may define the sensing window relative to the resource selection trigger. Thus, the sensing window may also be based on the projected LBT completion time. The first UE may perform sensing (e.g., SCI decoding and signal measurements) in a sidelink resource pool within the shared radio frequency band during the sensing window. The first UE may record the sensing results. The first UE may identify a subset of resources (e.g., candidate resources) in the sidelink resource pool that are within the resource selection window based on the sensing results. The first UE may select at least a first resource from the subset of resources and transmit a sidelink transmission to a second UE using the selected first resource.

In some aspects, instead of defining the resource selection window base on the projected LBT completion time, the first UE may filter the candidate resources identified from the resource selection window based on the projected LBT completion time. For instance, the first UE may exclude candidate resources that are earlier than the projected LBT completion time.

In some aspects, the first UE may select a second resource from the candidate resources for a retransmission such that the first resource and the second resource are spaced apart from each other by a duration that can accommodate an LBT procedure prior to the retransmission.

In some aspects, the first UE may filter the candidate resources identified from the resource selection window based on LBT gaps. For instance, one or more of the candidate resources can include an overlap with an LBT gap associated with another UE, and thus the candidate resources may end early (e.g., a shortened duration) to allow for the LBT gap. In some aspects, the first UE may exclude any candidate resource that includes an overlap with an LBT gap of another UE. In some other aspects, the first UE may exclude a candidate resource that has an overlap with an LBT gap exceeding a certain number of symbols.

In some aspects, the first UE may filter the candidate resources identified from the resource selection window based on LBT types. Examples of LBT types may include a type 1 LBT and a type 2 LBT. A type 1 LBT may be similar to a category 4 (CAT4) LBT including a countdown (a random backoff procedure). A type 2 LBT may be similar to a category 2 (CAT2) LBT with no countdown. In some instances, some candidate resources may be available via a type 1 LBT, some candidate resources may be available via a type 2 LBT, and some candidate resources may be available via a type 1 LBT or a type 2 LBT. A resource available via a type 2 LBT may be a resource that is shared by another UE. For instance, another UE may contend for a channel occupancy time (COT) in a channel Upon winning the contention, the other UE can transmit in the channel during the COT, and may also share the COT with other UEs. A resource can be available via a type 1 LBT or a type 2 LBT when the first UE detected a COT sharing indicator from another UE sharing a COT around the resource and there is no other reservation blocking a type 1 LBT. Thus, the first UE may win the medium via a type 1 LBT by itself or via a type 2 LBT by sharing the other UE's COT.

Aspects of the present disclosure can provide several benefits. For example, determining a resource selection window based on a projected LBT completion time can avoid having the first UE searching for candidate resources from an outdated resource selection window. Determining a sensing window based on a projected LBT completion time can allow the first UE to utilize more recent sensing results for identifying candidate resources, and thus may be more reliable. Further, filtering candidate resources based on LBT gaps and/or LBT types may allow for more flexibility in selecting resources, and thus may improve performance. For instance, the first UE can avoid selecting from a candidate resource that has a large overlap with an LBT gap, which may require a reduced transmission duration and impacting performance Additionally, a type 2 LBT may have a higher chance in passing than a type 1 LBT, and thus the first UE can select a candidate resource available via type 2 LBT to increase the likelihood in gaining access to the resource.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames.

A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel Conversely, the LBT results in a failure when a channel reservation signal is detected in the channel A TXOP may also be referred to as channel occupancy time (COT).

Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS 105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

Figure 2:
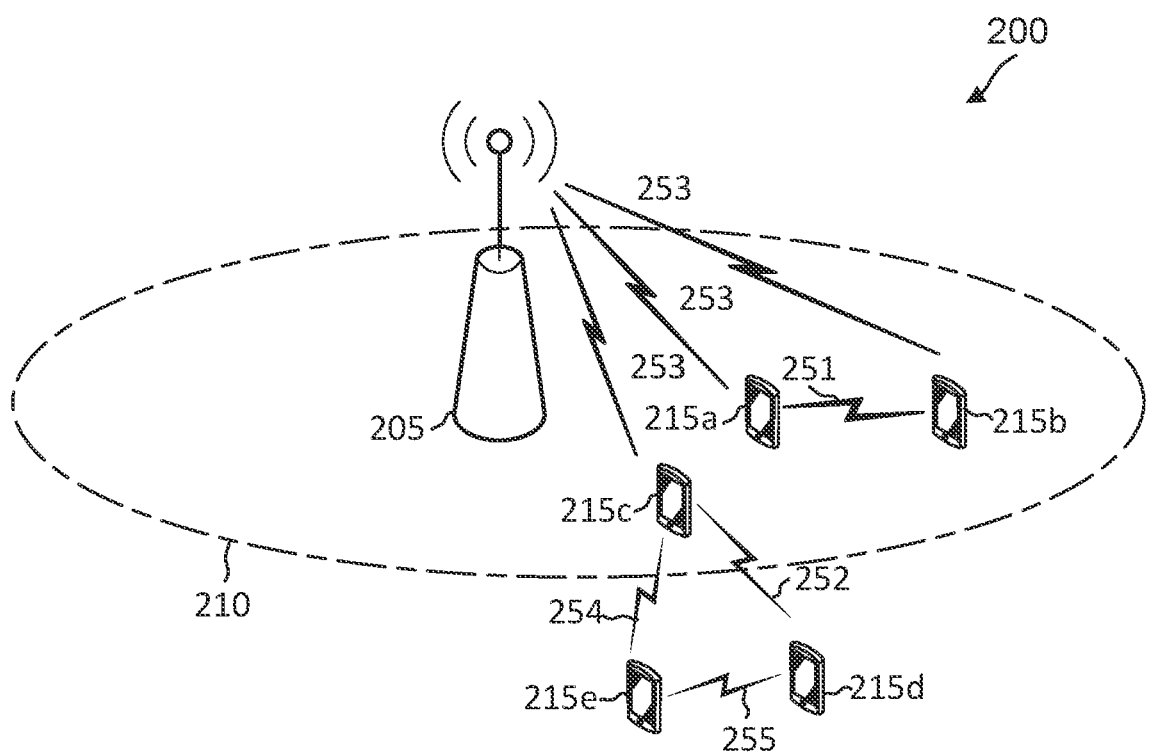
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. SCI may also carry information to reserve future resources (e.g., up to about two future PSSCH for retransmissions with HARQ). In some examples, a transmitting sidelink UE 115 may indicate SCI in two stages. In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include a –bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

In some aspects, a pair of sidelink transmitting UE 115 and sidelink receiving UE 115 may communicate with each other using the autonomous mode-2 RRA discussed above. For instance, the sidelink transmitting UE 115 may continuously sense or monitor resources in a sidelink resource pool. The sensing or monitoring may include decoding SCI decoding and/or measuring signal energy in the channel. The sidelink transmitting UE 115 may record the SCI decoding results and the signal measurements. Upon receiving a data packet for transmission, the sidelink transmitting UE 115 may determine a resource selection window and identify candidate resources from the resource selection window based on sensing results (e.g., decoded SCI and signal measurements) obtained from a sensing window as will be discussed more fully below in FIGS. 3A-3B. The sidelink transmitting UE 115 may randomly select a resource from the candidate resources and transmit a sidelink transmission (e.g., including SCI over a PSCCH and/or data over a PSSCH) using the selected resource.

According to aspects of the present disclosure, the sidelink transmitting UE 115 may perform an LBT in the shared radio frequency band and may consider a timeline of the LBT (e.g., a completion time of the LBT) when determining the sensing window and/or the resource selection window. The sidelink transmitting UE 115 may also apply various filters associated with LBTs to resources in the resource selection window to identify available resources for sidelink transmission as will be described more fully.

FIG. 2 illustrates an example of a wireless communication network 200 that provisions for sidelink communications according to embodiments of the present disclosure. The network 200 may correspond to a portion of the network 100. FIG. 2 illustrates one BS 205 and five UEs 215 (shown as 215a, 215v, 215c, 215d, and 215e) for purposes of simplicity of discussion, though it will be recognized that embodiments of the present disclosure may scale to any suitable number of UEs 215 (e.g., the about 2, 3, 4, 5, 7 or more) and/or BSs 205 (e.g., the about 2, 3 or more). The BS 205 and the UEs 215 may be similar to the BSs 105 and the UEs 115, respectively. The BS 205 and the UEs 215 may share the same radio frequency band for communications. In some instances, the radio frequency band may be a licensed band. In some instances, the radio frequency band may be an unlicensed band (e.g., in a 5 GHz band). In some instances, the radio frequency band may be a frequency range 1 (FR1) band. In some instances, the radio frequency band may be a FR2 band. In general, the radio frequency band may be at any suitable frequency and may have any suitable bandwidth (e.g., about 5 MHz, about 10 MHz, about 20 MHz, about 80 MHz, about 100 MHz or more).

In the network 200, some of the UEs 215 may communicate with each other in peer-to-peer communications. For example, the UE 215a may communicate with the UE 215b over a sidelink 251, the UE 215c may communicate with the UE 215d over a sidelink 252 and/or with the UE 215e over a sidelink 254, and the UE 215d may communicate with the UE 215e over a sidelink 255. The sidelinks 251, 252, 254, and 255 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d and UE 215e are outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

Figure 3A:
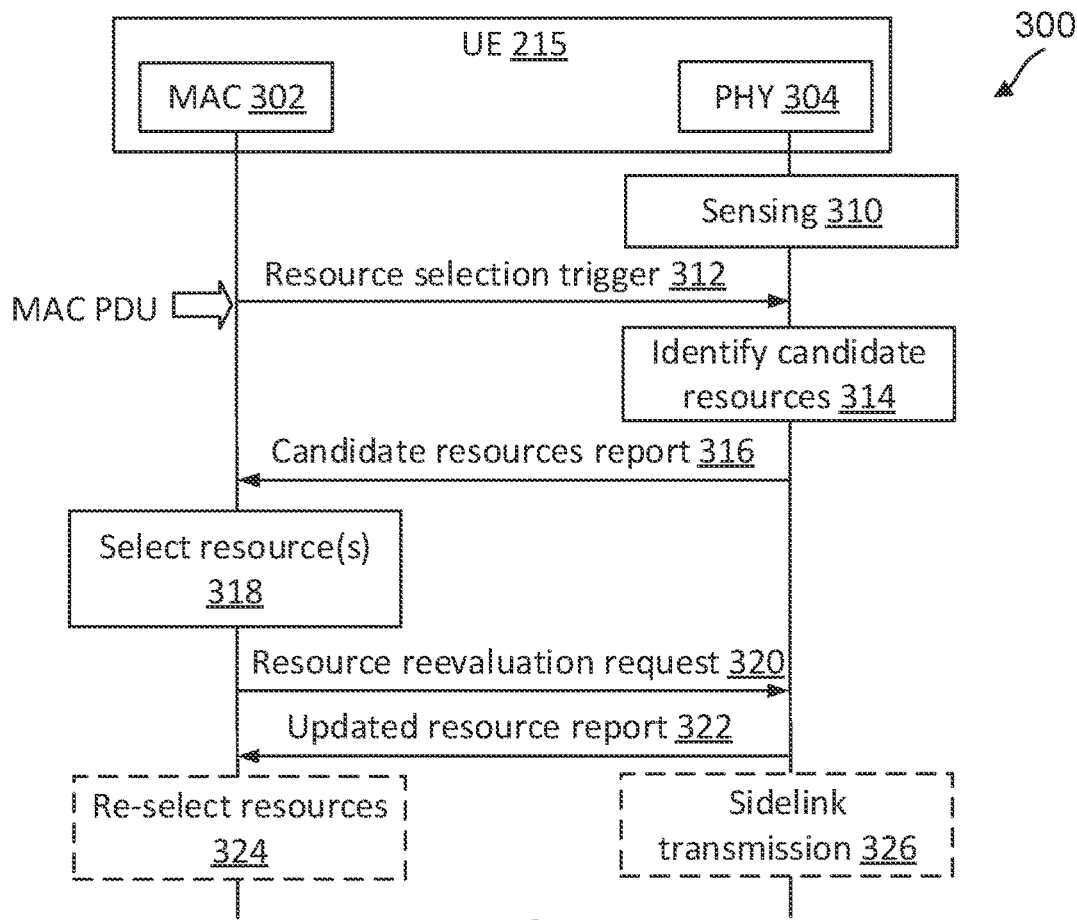
FIG. 3A is a sequence diagram illustrating an autonomous sidelink sensing method according to some aspects of the present disclosure.
Figure 3B:
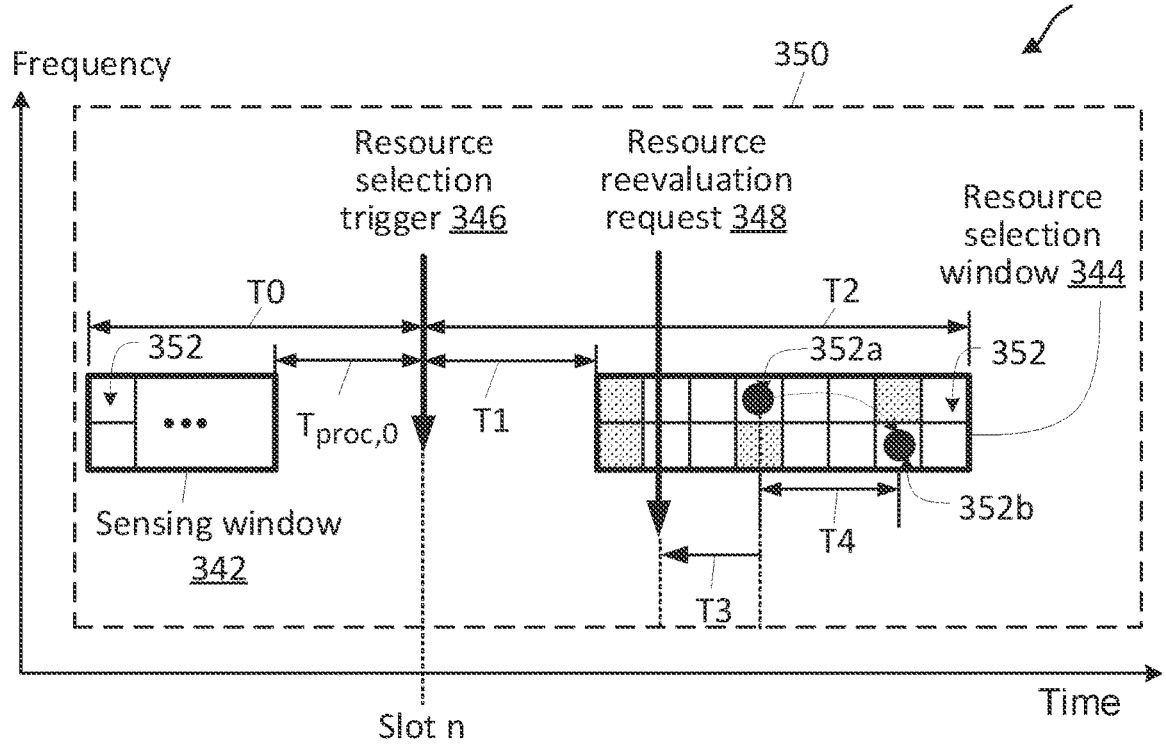
FIG. 3B illustrates an autonomous sidelink sensing scheme according to some aspects of the present disclosure.

FIGS. 3A and 3B are discussed in relation to each other to illustrate autonomous sidelink sensing using mode-2 RRA. FIG. 3A is a sequence diagram illustrating an autonomous sidelink sensing method 300 according to some aspects of the present disclosure. The method 300 may be implemented by a UE 215. As illustrated, the method 300 includes a number of enumerated actions, but embodiments of the method 300 may include additional actions before, after, and in between the enumerated actions. In some embodiments, one or more of the enumerated actions may be omitted or performed in a different order.

The autonomous sidelink sensing may be implemented between a MAC layer 302 and a PHY layer 304 at the UE 215. As shown, at action 310, the PHY layer 304 performs sensing in a sidelink resource pool (e.g., the sidelink resource pool 350 of FIG. 3B). A sidelink resource pool may refer to a set of time and frequency resources that may be used for sidelink operations. For instance, the PHY layer 304 may continuously sense or monitor resources (e.g., the resources 352 for FIG. 3B) in the sidelink resource pool. The sensing or monitoring may include decoding SCI and/or measuring signal energy in the channel. For SCI decoding, the PHY layer 304 may blindly decode SCI from a PSCCH of each resource. If the decoding is successful, the PHY layer 304 may record the decoded SCI. For signal measurements, the PHY layer 304 may receive a signal from each resource and compute a reference signal received power (RSRP) and/or receive signal strength indicator (RSSI) for each resource. The PHY layer 304 may also record the signal measurements.

At action 312, the MAC layer 302 sends a resource selection trigger (e.g., the resource selection trigger 346 of FIG. 3B) to the PHY layer 304, for example, based on a MAC PDU being generated and ready for transmission.

At action 314, in response to the resource selection trigger, the PHY layer 304 identifies candidate resources from the resource pool based on the sensing result. In this regard, the PHY layer 304 may determine a sensing window (e.g., the sensing window 342 of FIG. 3B) and a resource selection window (e.g., a resource selection window 344 of FIG. 3B) based on the resource selection trigger. The PHY layer 304 may identify candidate resources from the resource selection window based on past sensing results (e.g., decoded SCI and/or signal measurements) obtained in the sensing window. The resource selection trigger, the sensing window, and the resource selection window are shown in FIG. 3B.

FIG. 3B illustrates an autonomous sidelink sensing scheme 340 according to some aspects of the present disclosure. The scheme 340 may be employed by the UE 215 or any other UEs such as the UEs 115 and 215. In FIG. 3B, the x-axis represents time in some arbitrary units, and the y-axis represents frequency in some arbitrary units.

In the scheme 340, the UE 215 is preconfigured with a sidelink resource pool 350. The sidelink resource pool 350 may span a certain frequency bandwidth in a licensed band. The sidelink resource pool 350 may include a plurality of time-frequency resources 352. Each resource 352 may include a certain number of symbols (e.g., OFDM symbols) in time and a certain number of frequency subcarriers in frequency. In some aspects, the each resource 352 may be in units of RBs (e.g., including 12 consecutive subcarriers in frequency and a time duration of a slot or any suitable time duration). FIG. 3B illustrates the sidelink resource pool 350 over a certain time period. In general, a sidelink resource pool may include time-frequency resources over consecutive slots (e.g., a continuous time period) and/or slots that are spaced apart in time (e.g., non-consecutive time periods).

In the illustrated example of FIG. 3B, the MAC layer 302 may generate a MAC PDU at slot n and may generate a resource selection trigger 346 at slot n. Upon receiving the resource selection trigger 346, the PHY layer 304 may define a sensing window 342 and a resource selection window 344 with respect to the time of the resources selection trigger 346 based on a set of parameters including $T_{proc,0}$, $T_{proc,1}$, T0, T1, T2, and $T2_{min}$. For instance, the PHY layer 304 may determine a start of the sensing window 342 based on a T0 duration before the resource selection trigger 346 and may determine an end of the sensing window 342 based on a $T_{proc,0}$ duration before the resource selection trigger 346. As shown, the sensing window 342 starts at the start of the T0 duration and ends at the start of the $T_{proc,0}$ duration. The PHY layer 304 may determine a start of the resource selection window 344 based on a T1 duration after the resource selection trigger 346 and may determine an end of the resource selection window 344 based on a T2 duration after the resource selection trigger 346. The T1 duration may have an upper bound limited by the parameter $T_{proc,1}$ (e.g., $0 \leq T1 \leq T_{proc,1}$). The T2 duration can be determined to meet a certain packet delay budget (PDB) and may have a lower bound limited by $T2_{min}$ (e.g., $T2_{min} \leq T2 \leq PDB$). As shown, the resource selection window 344 starts at the end of the T1 duration and ends at the end of the T2 duration. In some aspects, the PHY layer 304 may be preconfigured with some of the parameters (e.g., $T_{proc,0}$, $T_{proc,1}$). In some aspects, the PHY layer 304 may receive some of the parameters (e.g., T1, T2, $T2_{min}$) from an upper layer (e.g., an RRC layer). Although FIG. 3B illustrates the resource selection window 344 including 16 resources, it should be understood that in other examples a resource selection window can include a less number of resources (e.g., about 4, 5, 6, 8, or 10) or a greater number of resources (e.g., 17, 18, 19, 20, 24, 32, or more).

The PHY layer 304 may identify candidate resources 352 within the resource selection window 344 by examining or analyzing sensing results obtained within the sensing window 342. In other words, the PHY layer 304 may utilize past sensing results to predict future usages of resources 352 in the resource selection window 344. The PHY layer 304 may use a combination of SCI decoding, signal measurements, and/or priority information to identify candidate resources. In some aspects, the PHY layer 304 may exclude resources 352 in the resource selection window 344 that are reserved (e.g., based on SCI decoding in the sensing window 342 and/or prediction). The PHY layer 304 may exclude resources 352 in the resource selection window 344 that are to be used for transmissions with a higher traffic priority than the UE 215 (e.g., based on SCI decoding in the sensing window 342 and/or prediction). The PHY layer 304 may exclude resources 352 in the resource selection window 344 based on resources 352 within the sensing window 342 that have signal measurements (e.g., RSRP and/or RSSI) higher than a certain signal threshold and a predicted resource usage pattern. The PHY layer 304 may perform the resource filtering or exclusion by SCI decoding, priority, and/or signal measurements in the resource selection window 344 in any suitable order. If the remaining candidate resources 352 in the resource selection window 344 is less than 20% of the total resources in the resource selection window 344, the PHY layer 304 may increase the signal threshold and repeat the resource filtering or exclusion until the candidate resources 352 in the resource selection window 344 is about 20% of the total resources 352 in the resource selection window 344. In FIG. 3B, the candidate resources (available resources) 352 in the resource selection window 344 are shown as empty-filled boxes. The unavailable resources 352 are shown as pattern-filled boxes.

Returning to FIG. 3A, at action 316, the PHY layer 304 sends a candidate resource report indicating the identified candidate resources 352 (e.g., the empty-filled boxes in the resource selection window 344 shown in FIG. 3B). The report may indicate the time and frequency location information for the candidate resources.

At action 318, upon receiving the candidate resource report, the MAC layer 302 selects one or more resources from the candidate resources. For instance, the MAC layer 302 may randomly select a first resource from the candidate resources for transmitting the MAC PDU. As an example, if report includes a list of N candidate resources, the MAC layer 302 may draw a random number (e.g., k) between 1 and N and select $k^{th}$ candidate resources. In some instances, the UE 215 may apply HARQ to the transmission of a transport block (TB) (carrying the MAC PDU) and may retransmit the same TB upon receiving a NACK or failing to receive an ACK for the transmission from a corresponding receiving UE. Thus, the MAC layer 302 may also randomly select a second resource from the candidate resources by drawing another random number between 1 and N, for example, for a potential retransmission of the MAC PDU. FIG. 3B illustrates an example of the resource selection.

Referring to FIG. 3B, the MAC layer 302 may randomly select a first resource 352a (shown by a black circle) from the candidate resources for an initial transmission and may randomly select a second resource 352b (shown by a black circle) from the candidate resources for a retransmission. In some instance, the MAC layer 302 may select the second resource 352b for the retransmission such that the first resource 352a and the second resource 352b are separated by a T4 duration. In some aspects, the T4 duration may be less than about 32 slots or any other suitable time duration. In some aspects, the T4 duration may have a predetermined or preconfigured lower bound and/or upper bound.

Referring to FIG. 3A, at action 320, the MAC layer 302 sends a resource reevaluation request (e.g., the resource reevaluation request 348 of FIG. 3B) to the PHY layer 304. The resource reevaluation request may request the PHY layer 304 to report updated available resources at this time instant to double check whether the previously selected resources (e.g., resources 352a and 352b of FIG. 3B) are still available. In some instances, the MAC layer 302 may send the resource reevaluation request slightly before (e.g., 1 symbol, 2 symbols, 3 symbols, 4 symbol, or a slot) the actual time where the MAC PDU is to be transmitted using the selected first resource (e.g., the resource 352a in FIG. 3B). As such, the resource reevaluation request can also be referred to as a "last-minute re-evaluation".

Referring to FIG. 3B, the MAC layer 302 sends a resource reevaluation request 348 at T3 duration before the actual transmission time for the selected first resource 352a. In some aspects, the T3 duration may have a predetermined or preconfigured lower bound and/or upper bound.

Referring to FIG. 3A, at action 322, in response to the resource reevaluation request, the PHY layer 304 sends an updated resource report to the MAC layer 302. The PHY layer 304 may identify resources in the resource selection window 344 that are still available at the time instant when the resource reevaluation request is received. The PHY layer 304 may use substantially similar mechanisms as discussed at action 314 to identify available resources (candidate resources) at that time instant. If the first resource (e.g., the resource 352a) previously selected by the MAC layer 302 is no longer available, the PHY layer 304 may indicate an indication in the report. For instance, the report may include a re-selection flag set to 1 for the first resource. Similarly, if the second resource (e.g., the resource 352b) previously selected by the MAC layer 302 is no longer available, the PHY layer 304 may indicate an indication in the report. For instance, the report may include a re-selection flag set to 1 for the second resource.

If the first resource is no longer available, the MAC layer 302 may re-select another resource from the candidate resources indicated in the updated candidate resource report at action 324 and may repeat the action 320 and 322 at a later time for another last-minute resource reevaluation for newly selected resource. Otherwise, the PHY layer 304 may transmit the MAC PDU to another sidelink UE (e.g., the UEs 115 and/or 215) using the selected first resource at action 326.

Similarly, if the second resource (to be used for the retransmission) is no longer available, the MAC layer 302 may re-select another resource from the candidate resources indicated in the updated candidate resource report at action 324. The MAC layer 302 may also request the PHY layer 304 for a last-minute resource reevaluation for the resource to be used for the retransmission.

In some aspects, the UE 215 may communicate with another UE similar to the UEs 115, 215, and/or 215 over a sidelink channel in a shared radio frequency band (e.g., in a shared spectrum or an unlicensed spectrum). As discussed above, LBT may be used when communicating over an unlicensed band, where a transmitting node may listen to the channel (by measuring signal energy in the channel and comparing the measurement to a threshold. When the channel is idle (e.g., with signal measurement(s) below the threshold), the transmitting node may transmit in the channel. However, if the channel is busy (e.g., with signal measurement(s) above the threshold), the transmitting node may refrain from accessing the channel. Thus, LBT can lead to channel access uncertainty.

For instance, referring to the example shown in FIG. 3B, the UE 215 may perform a CAT4 LBT (a type 1 LBT) prior to transmitting the MAC PDU. As discussed above, a CAT4 LBT may include a random backoff or countdown. The time duration of the random backoff or countdown may be dependent on a CW size. In some instances, the random backoff can have a substantially longer duration (e.g., the CW may have a time length of 1024 slots) than the $T_{proc,1}$ parameter used for defining the T1 duration. As such, the resource selection window 344 may start before the LBT countdown is completed. Additionally, the LBT countdown may still be in progress at the time instant when the resource reevaluation request is sent by the MAC layer 302, and thus the PHY layer 304 may not be able to reevaluate the availability of the resources. Further, the T4 duration between the selected first resource 352a (to be used for the initial transmission of the MAC PDU) and second resource 352b (to be used for the retransmission of the MAC PDU) may be too short for performing another LBT before the retransmission. Thus, the addition of LBT to autonomous sidelink sensing can impact packet delivery delay, power consumption at the UE 215, and/or loss in spectral efficiency.

Accordingly, the present disclosure provides techniques for a sidelink UE (e.g., the UEs 115, 215, and/or 215) to perform LBT aware autonomous sidelink sensing over a shared radio frequency band (e.g., in a shared spectrum or an unlicensed spectrum). For instance, a UE 215 may determine at least one of a sensing window or a resource selection window based on a projected LBT timeline (e.g., a project LBT completion time). The UE 215 may also anchor a resource selection trigger based on the projected LBT completion time instead of based on a time when a MAC PDU is generated. The UE 215 (at a MAC layer) may also continuously apply screening and/or filtering on candidate resources identified from the resource selection window (by a PHY layer) for retransmission. The UE 215 (at a MAC layer or PHY layer) may also filter out candidate resources (available resources) that include overlaps with LBT gaps of another UE or include overlaps with LBT gaps of another UE by a certain number of OFDM symbols. The UE 215 (at a MAC layer or PHY layer) may also filter candidate resources (available resources) based on whether the resources are obtained via UE-to-UE COT sharing.

Figure 4:
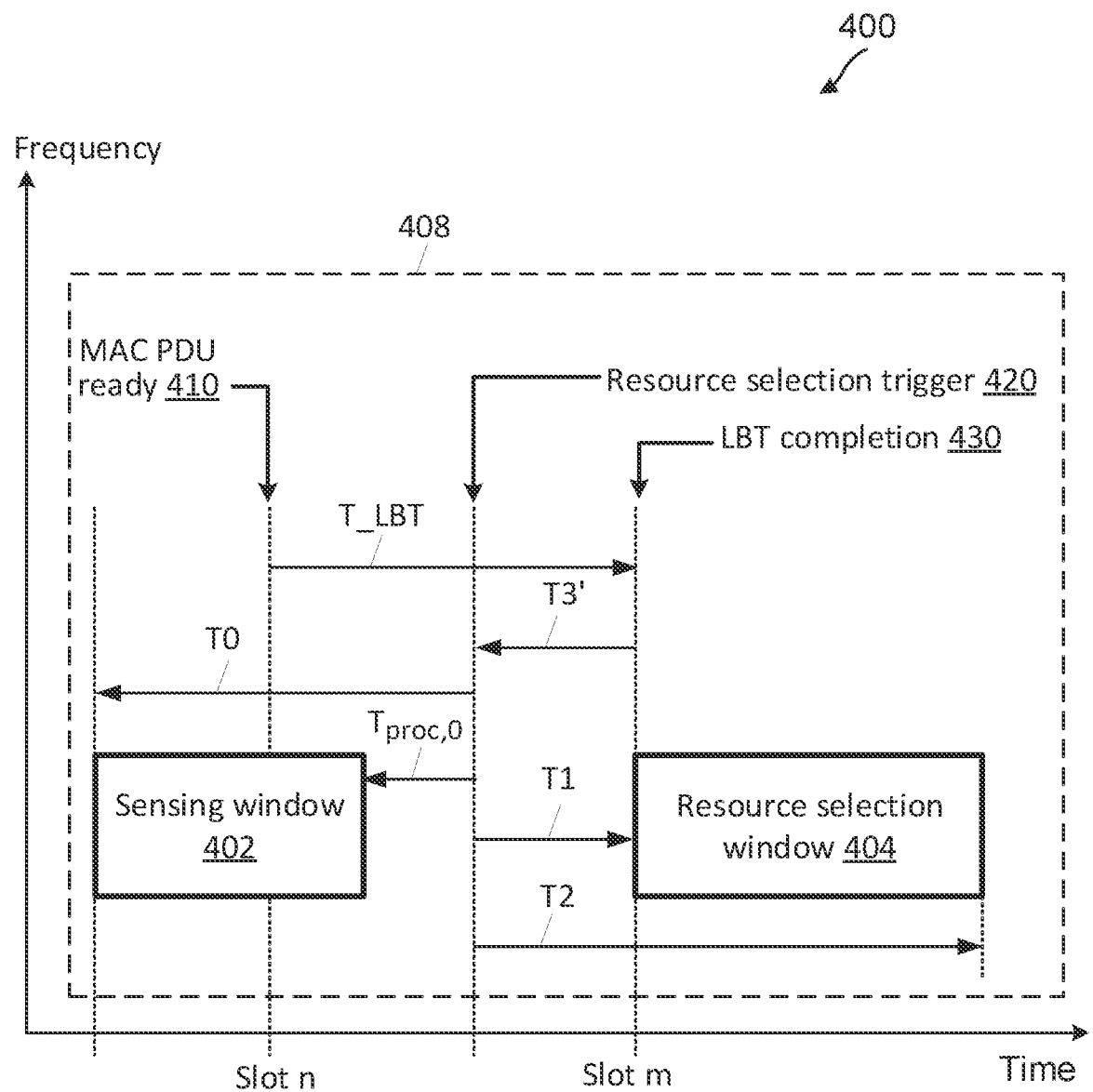
FIG. 4 illustrates a listen-before-talk (LBT) aware autonomous sidelink sensing scheme according to some aspects of the present disclosure.

FIG. 4 illustrates an LBT aware autonomous sidelink sensing scheme 400 according to some aspects of the present disclosure. The scheme 400 may be employed by a UE such as the UEs 115 and/or 215 in a network such as the networks 100 and/or 200 for sidelink communication. 215 or any other UEs such as the UEs 115 and 215. In FIG. 4, the x-axis represents time in some arbitrary units, and the y-axis represents frequency in some arbitrary units.

The scheme 400 illustrates LBT aware autonomous sidelink sensing at a high level. In the scheme 400, a UE 215 may generate a MAC PDU 410 at a slot n. The UE 215 may draw a random number (e.g., within a CW between a CW minimum value and a CW maximum value) for an LBT countdown. The random number may represent a number of time units (e.g., a predetermined duration) for the countdown. Thus, the UE 215 may project an LBT completion time 430 based on the drawn random number and various other factors as will be discussed more fully below. As an example, the projected LBT completion time 430 is at a slot m (a T_LBT duration from the slot n).

In some aspects, a UE 215 may define an LBT aware resource selection window 404 in a resource pool 408. In this regard, the UE 215 may determine a T1 duration relative to a resource selection trigger 420 such that the resource selection window 404 starts after the projected LBT completion time (e.g., at a slot m). In other words, the T1 duration is defined to be long enough to exclude resources blocked by an LBT procedure. In some aspects, the T1 duration may have an upper bound limited by a predetermined $T_{proc,1}$ parameter.

In some aspects, the UE 215 may determine a T2 duration such that that a difference between the T1 duration and the T2 duration is greater than a projected LBT duration. In other words, the T2 duration is defined to be long enough to allow for an initial transmission resource and at least one retransmission resource (e.g., for one retransmission) to be sufficiently spaced apart in time such that an LBT can be performed prior to using the retransmission resource. In some aspects, the T2 duration may have a lower bound limited by a $T2_{min}$ parameter, which may be configured by an RRC layer.

In some aspects, the UE 215 may anchor the resource selection trigger 420 to the projected LBT completion time 430 instead of to the time (slot n) when the MAC PDU 410 is generated. For instance, the UE 215 may generate resource selection trigger 420 based on a later time between the slot n (when the MAC PDU 410 is generated) and a T3' duration before the slot m (where corresponding LBT completion is projected). For instance, the UE 215 may determine a time for the resource selection trigger 420 based on max{n, (m−T3')}. In some instances, the T3' duration can be substantially similar to the T3 duration discussed above in relation to FIGS. 3A-3B. When the CW size is large, the resource selection trigger 420 can be delayed to a time later than the slot n as shown in FIG. 4. The UE 215 may determine a sensing window based on a $T_{proc,0}$ duration before the resource selection trigger 420. Thus, the delaying of the resource selection trigger 420 also leads to a delayed sensing window 402, which allows the UE 215 to utilize more recent sensing results for identifying candidate resources from the resource selection window 404. Thus, the prediction of resource usages in the resource selection window 404 can be more reliable. The sensing window 402 may start at a T0 duration before the resource selection trigger 420 as in the scheme 340 discussed above in relation to FIGS. 3A-3B.

Figure 5:
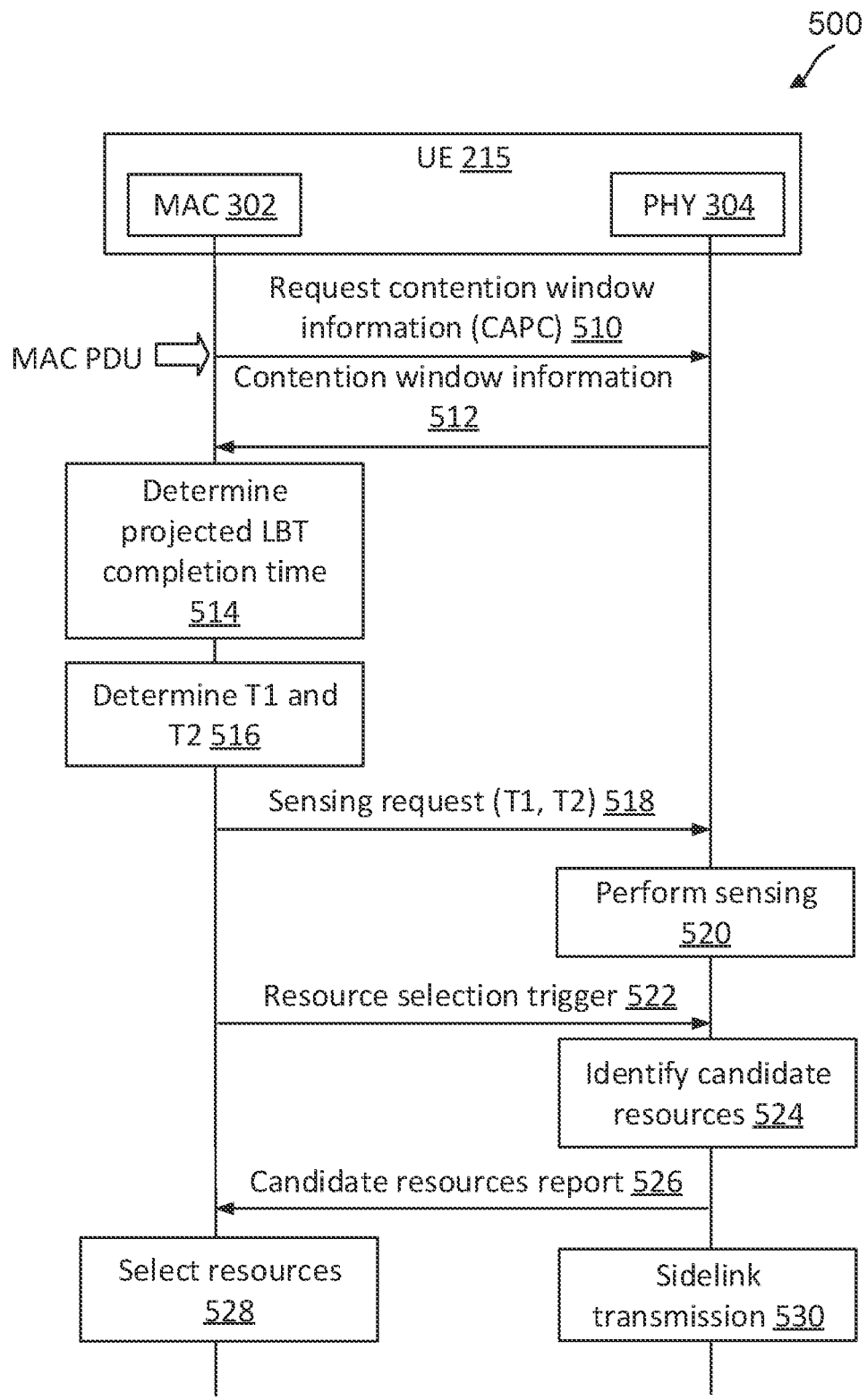
FIG. 5 is a sequence diagram illustrating an LBT aware autonomous sidelink sensing method according to some aspects of the present disclosure.
Figure 6:
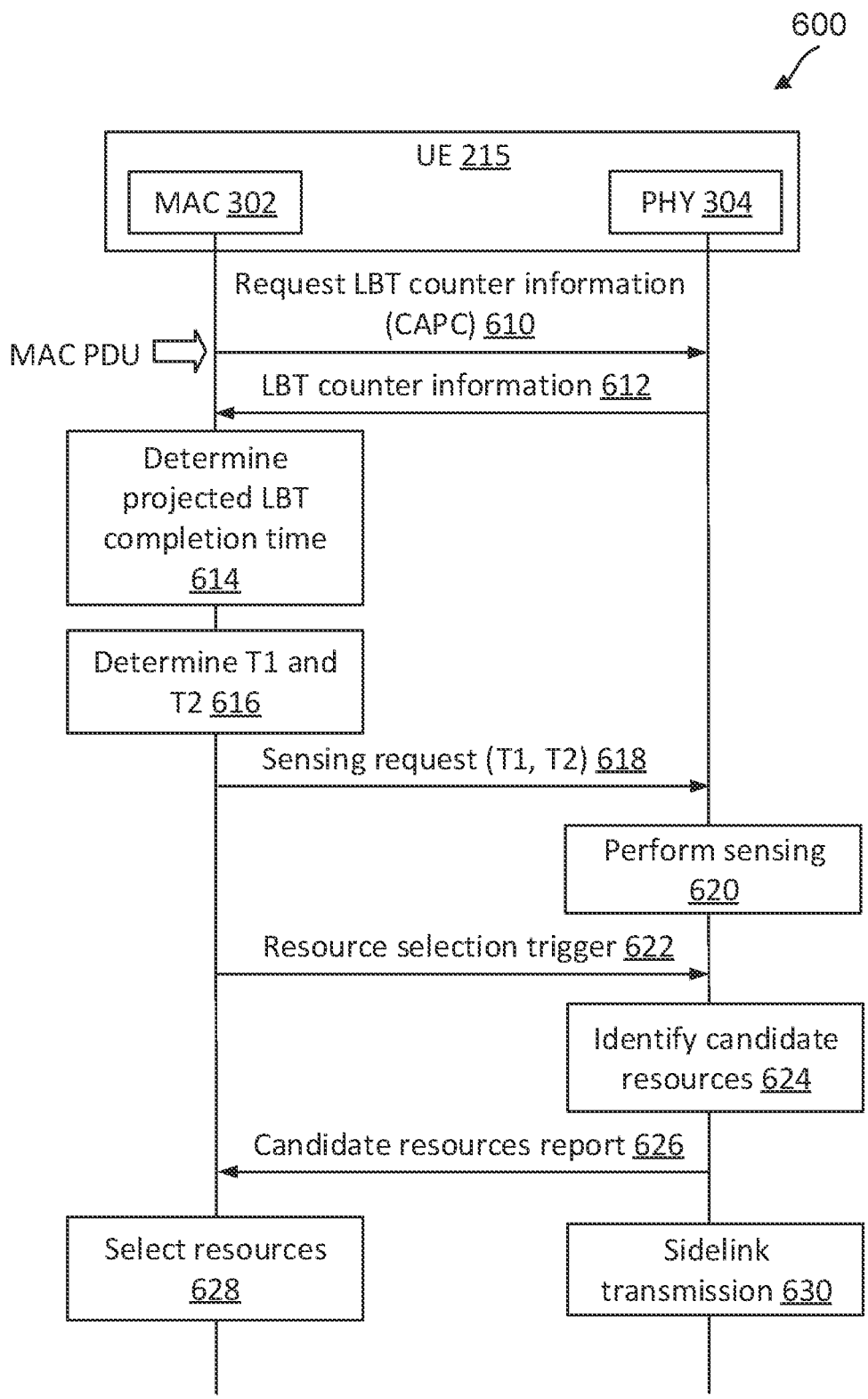
FIG. 6 is a sequence diagram illustrating an LBT aware autonomous sidelink sensing method according to some aspects of the present disclosure.
Figure 7:
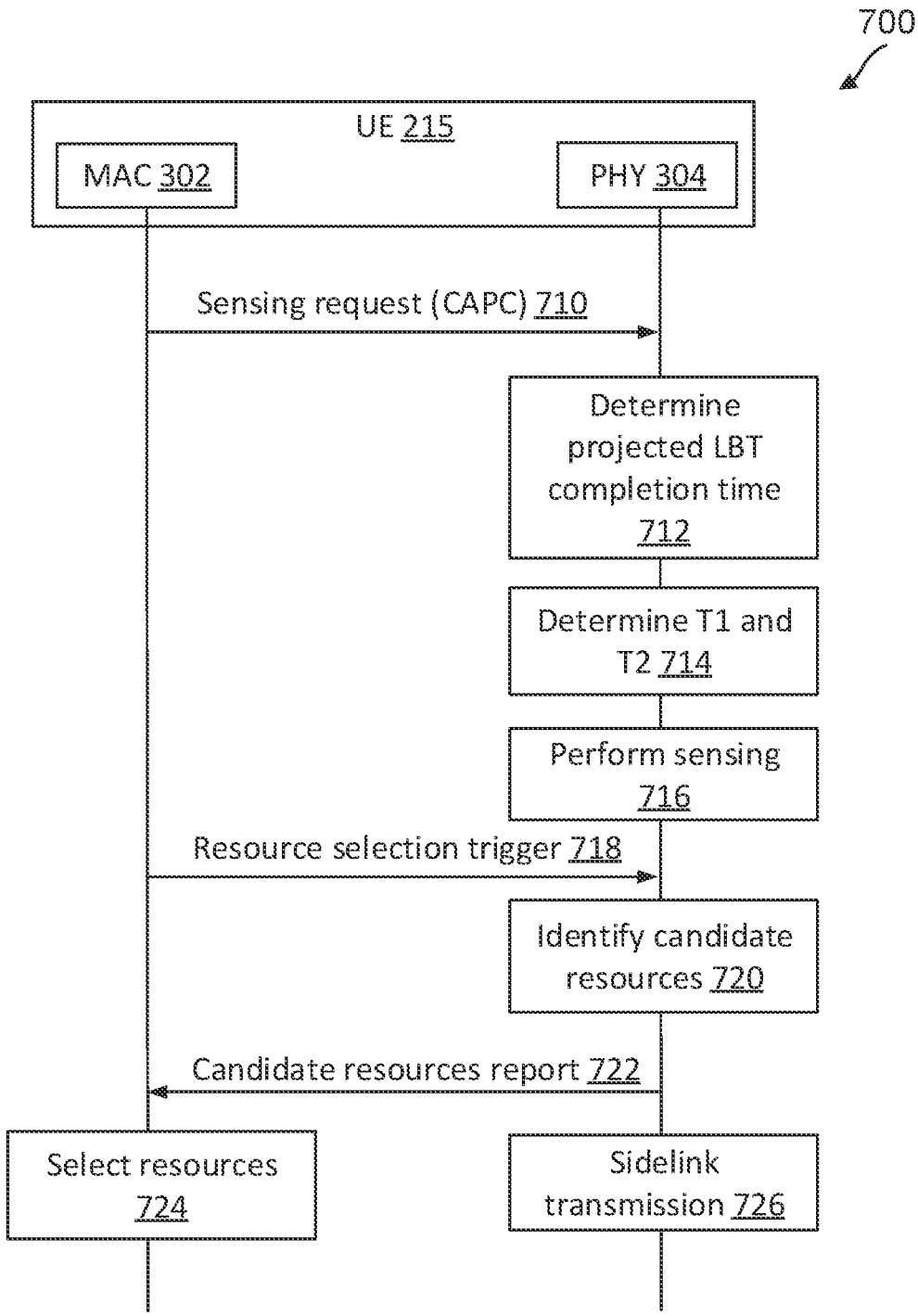
FIG. 7 is a sequence diagram illustrating an LBT aware autonomous sidelink sensing method according to some aspects of the present disclosure.

FIGS. 5-7 illustrate various mechanisms for defining an LBT aware resource selection window (e.g., the resource selection window 404) for autonomous sidelink sensing over a shared radio frequency band. For instance, the UE 215 may determine a resource selection window based on a projected LBT completion time. The UE 215 may determine the T1 duration on the projected LBT completion time and may determine the T2 duration based on a projected LBT duration (e.g., time for performing an LBT procedure). In some aspects, a MAC layer may interface with a PHY layer at the UE 215 to determine the resource selection window based on the projected LBT completion. In some instances, the MAC layer and the PHY layer may be implemented on the same hardware component or by the same processor at the UE 215, and the interactions or communications between the MAC layer and the PHY layer may be via function calls. In some other instances, the MAC layer and the PHY layer may be implemented on different hardware components or by different processors at the UE 215, and the interactions or communications between the MAC layer and the PHY layer may be via signaling between the hardware components or processors. In some aspects, the MAC layer at the UE 215 may determine the T1 duration and the T2 duration and provide a PHY layer at the UE 215 with the determined T1 duration and T2 duration. In some instances, the PHY layer may include an LBT engine and a sensing engine. The LBT engine and sensing engine may include hardware and/or software components. The sensing engine may continuously perform resource sensing in a sidelink resource pool. The LBT engine may perform an LBT prior to a sidelink transmission. In some instances, the LBT engine may also perform multiple LBTs in parallel with different LBT parameters (e.g., CW size, random backoffs, CAPC, etc.). In some instances, the LBT engine can start performing an LBT immediately after completing a sidelink transmission so that the UE 215 may be able to access the channel quickly when a next sidelink transmission is ready for transmit. The PHY layer may determine the resource selection window based on the T1 and T2 durations provided by the MAC layer. In some aspects, the MAC layer can query the PHY layer for contention window information and/or LBT information project the LBT completion time for determining the T1 and T2 durations as discussed in FIGS. 5 and 6 below. In some other aspects, the MAC layer may request the PHY layer to determine the T1 and T2 durations based on a CAPC as discussed in FIG. 7 below.

FIG. 5 is a sequence diagram illustrating an LBT aware autonomous sidelink sensing method 500 according to some aspects of the present disclosure. The method 500 may be implemented by between a MAC layer 302 and a PHY layer 304 at a UE 215. In particular, the UE 215 may implement the method 500 for determining a resource selection window based on a projected LBT completion time when communicating over a sidelink channel in a shared radio frequency band. The method 500 may use mechanisms similar to the scheme 400 discussed above with respect to FIG. 4. As illustrated, the method 500 includes a number of enumerated actions, but embodiments of the method 500 may include additional actions before, after, and in between the enumerated actions. In some embodiments, one or more of the enumerated actions may be omitted or performed in a different order.

At action 510, upon generation of a MAC PDU, for example, at a slot n, the MAC layer 302 request contention window information from the PHY layer 304. The MAC layer 302 may include an indication of a CAPC associated with a traffic type of the MAC PDU. The CAPC can be based on a QoS, such a latency requirement, of the traffic type. In some instances, the CAPC may include a class for guaranteed transmission delay for real-time traffic, guaranteed transmission delay for non-real-time traffic, non-guaranteed transmission delay, and/or the like.

At action 512, the PHY layer 304 provides the MAC layer 302 with the contention window information including at least one of a CW size, CW minimum value or a CW maximum value. The PHY layer 304 may determine the CW size, CW minimum value, and/or CW maximum value. for a CAT4 LBT or a type 1 LBT based on the CAPC. In some instances, there may be a one-to-one mapping between CAPC and allowable CW size, CW minimum value, and/or CW maximum value. For instance, a high priority class may be assigned with a smaller CW size than a lower priority class.

At action 514, the MAC layer 302 determines a projected LBT completion (e.g., at a slot m) time based on the contention window information provided by the PHY layer 304. The MAC layer 302 may draw a random number between the CW minimum value and the CW maximum value. The MAC layer 302 may also consider deferral time or idle time that is associated with channel access in the frequency band. For instance, transmissions in the channel are to leave certain idle time after each transmission according to a certain regulations or protocols. The idle time may be referred to as an arbitration interframe spacing (AIFS) or deferral period. Additionally, the random backoff can be in certain time units (e.g., of about 9 µs). Thus, the MAC layer 302 may determine a lower bound for the projected LBT completion time (an earliest projected LBT completion time) as shown below:

Projected LBT completion time≥AIFS+w×9 µs.　　(1)

At action 516, the MAC layer 302 determines a T1 duration and a T2 duration based on the projected LBT completion time. The MAC layer 302 can add a margin to the lower bound (AIFS+w×9 µs) for the projected LBT completion time (e.g., at a slot m). In some instances, the MAC layer 302 can determine the margin based on the CW size. The MAC layer 302 can determine the T1 duration such that a resource selection window (e.g., the resource selection window 404) may start after the projected LBT completion time. The MAC layer 302 can determine the T2 duration such that that a difference between the T1 duration and the T2 duration is greater than a projected LBT duration (to accommodate an LBT procedure before a retransmission). The MAC layer 302 may determine the T1 duration and the T2 duration relative to a resource selection trigger (e.g., the resource selection trigger 420) to be sent to the PHY layer 304 at a later time. The MAC layer 302 may determine the time for sending the resource selection trigger at a later time between slot n and (slot m−T3') (e.g., max{n, (m−T3')}) as discussed above in relation to FIG. 4.

At action 518, the MAC layer 302 sends a sensing request to the PHY layer 304. The sensing request includes an indication of at least one of the T1 duration or T2 duration.

At action 520, the PHY layer 304 performs sensing in a sidelink resource pool (e.g., the sidelink resource pool 408 of FIG. 4). As discussed above, the PHY layer 304 may continuously sense or monitor resources in the sidelink resource pool. Thus, the PHY layer 304 may be performing the sensing prior to the sensing request from the MAC layer 304. The sensing or monitoring may include decoding SCI and/or measuring signal energy in the channel. For SCI decoding, the PHY layer 304 may blindly decode SCI from a PSCCH of each resource. If the decoding is successful, the PHY layer 304 may record the decoded SCI. For signal measurements, the PHY layer 304 may receive a signal from each resource and compute a reference signal received power (RSRP) and/or receive signal strength indicator (RSSI) for each resource. The PHY layer 304 may also record the signal measurements.

At action 522, the MAC layer 302 sends a resource selection trigger (e.g., the resource selection trigger 420) to the PHY layer 304, for example, at a later time between slot n and (slot m−T3').

At action 524, in response to the resource selection trigger, the PHY layer 304 identifies candidate resources within a resource selection window (e.g., the resource selection window 404) based on sensing results in a sensing window (e.g., the sensing window 402). The PHY layer 304 may determine a start of the sensing window based on a T0 duration before the resource selection trigger and may determine an end of the sensing window based on a $T_{proc,0}$ duration before the resource selection trigger. The PHY layer 304 may determine a start of the resource selection window based on the T1 duration (provided by the MAC layer 302) after the resource selection trigger and may determine an end of the resource selection window based on the T2 duration (provided by the MAC layer 302) after the resource selection trigger.

The PHY layer may identify the candidate resources using similar mechanisms as discussed above in relation to FIGS. 3A-3B. For instance, the PHY layer 304 may identify candidate resources within the resource selection window by examining or analyzing sensing results obtained within the sensing window. The PHY layer 304 may use a combination of SCI decoding, signal measurements, and/or priority information to identify candidate resources. In some aspects, the PHY layer 304 may exclude resources in the resource selection window that are reserved (e.g., based on SCI decoding in the sensing window and/or prediction). The PHY layer 304 may exclude resources in the resource selection window that are to be used for transmissions with a higher traffic priority than the UE 215 (e.g., based on SCI decoding in the sensing window and/or prediction). The PHY layer 304 may exclude resources in the resource selection window based on resources 352 within the sensing window 342 that have signal measurements (e.g., RSRP and/or RSSI) higher than a certain signal threshold and a predicted resource usage pattern. The PHY layer 304 may perform the resource filtering or exclusion by SCI decoding, priority, and/or signal measurements in the resource selection window in any suitable order. If the remaining candidate resources in the resource selection window is less than 20% of the total resources in the resource selection window, the PHY layer 304 may increase the signal threshold and repeat the resource filtering or exclusion until the candidate resources in the resource selection window is about 20% of the total resources in the resource selection window.

At action 526, the PHY layer 304 sends a candidate resource report indicating the identified candidate resources 352. The report may indicate the time and frequency location information for the candidate resources.

At action 528, upon receiving the candidate resource report, the MAC layer 302 selects one or more resources from the candidate resources. For instance, the MAC layer 302 may randomly select a first resource from the candidate resources for transmitting the MAC PDU and randomly select a second resource from the candidate resources for a potential retransmission of the MAC PDU. As an example, if report includes a list of N candidate resources, the MAC layer 302 may draw two random numbers (e.g., k1 and k2) between 1 and N and select the k1$^{th}$ and k2$^{th}$ candidate resources. In some instances, the MAC layer 302 may randomly select more than two resources from the candidate resources, for example, based on a number of allowable retransmissions for the MAC PDU. In some other instances, the MAC layer 302 may select the second resource or a third resource with consideration for a projected LBT duration as will be discussed more fully below in FIGS. 9 and 10.

At action 530, the PHY layer 304 transmits a sidelink transmission carrying the MAC PDU to another sidelink UE (e.g., the UEs 115 and/or 215) using the selected first resource.

FIG. 6 is a sequence diagram illustrating an LBT aware autonomous sidelink sensing method 600 according to some aspects of the present disclosure. The method 600 may be implemented by between a MAC layer 302 and a PHY layer 304 at a UE 215. In particular, the UE 215 may implement the method 600 for determining a resource selection window based on a projected LBT completion time when communicating over a sidelink channel in a shared radio frequency band. The method 600 may use mechanisms similar to the scheme 400 discussed above with respect to FIG. 4 and the method 500 discussed above with respect to FIG. 5. As illustrated, the method 600 includes a number of enumerated actions, but embodiments of the method 600 may include additional actions before, after, and in between the enumerated actions. In some embodiments, one or more of the enumerated actions may be omitted or performed in a different order.

Generally speaking, the method 600 includes features similar to method 500 in many respects. For example, actions 616, 618, 620, 622, 624, 626, 628, and 630 are similar to actions 516, 518, 520, 522, 524, 526, 528, and 530, respectively. Accordingly, for sake of brevity, details of those steps will not be repeated here.

At action 610, upon generation of a MAC PDU, for example, at a slot n, the MAC layer 302 requests LBT counter information from the PHY layer 304. The MAC layer 302 may include an indication of a CAPC associated with a traffic type of the MAC PDU.

At action 612, the PHY layer 304 provides the MAC layer 302 with the LBT counter information including an LBT counter value associated with an LBT corresponding to the CAPC. As discussed above, the PHY layer 304 can run multiple LBTs in parallel, where each LBT may be configured with different LBT parameters, such as CW size, CW minimum value, CW maximum value, based on a certain CAPC. For instance, the PHY layer 304 may perform, in the shared radio frequency band, one or more LBTs. Each LBT of the one or more LBT may be associated with a CAPC. The PHY layer 304 may provide the MAC layer 302 with the LBT counter value that is associated with a first LBT of the one or more LBTs, where the first LBT is executed based on LBT parameters configured for the requested CAPC.

At action 614, the MAC layer 302 determines a projected LBT completion time (e.g., at a slot m) based on the LBT counter information (e.g., the counter value for the first LBT) provided by the PHY layer 304. For instance, the MAC layer 302 may determine a remaining time when the first LBT may be completed based on the LBT counter value. The MAC layer 302 may compute the remaining time as LBT counter value×countdown time units (e.g., of about 9 µs).

At action 616, the MAC layer 302 determines a T1 duration and a T2 duration based on the projected LBT completion time, for example, using similar mechanisms as discussed at action 516.

At action 618, the MAC layer 302 sends a sensing request including the T1 and/or T2 durations to the PHY layer 304.

At action 620, the PHY layer 304 performs sensing in a sidelink resource pool, for example, using similar mechanisms as discussed at action 520. The PHY layer 304 may continuously sense or monitor resources in the sidelink resource pool prior to receiving the sensing request from the MAC layer 304.

At action 622, the MAC layer 302 sends a resource selection trigger (e.g., the resource selection trigger 420) to the PHY layer 304, for example, at a later time between slot n and (slot m−T3').

At action 624, in response to the resource selection trigger, the PHY layer 304 identifies candidate resources within a resource selection window (e.g., the resource selection window 404) based on sensing results in a sensing window (e.g., the sensing window 402), for example, using similar mechanisms as discussed at action 524.

At action 626, the PHY layer 304 sends a candidate resource report indicating the identified candidate resources 352. The report may indicate the time and frequency location information for the candidate resources.

At action 628, upon receiving the candidate resource report, the MAC layer 302 selects one or more resources from the candidate resources. For instance, the MAC layer 302 may randomly select a first resource from the candidate resources for an initial transmission of the MAC PDU and randomly select a second resource from the candidate resources for a potential retransmission of the MAC PDU as discussed above at action 528.

At action 630, the PHY layer 304 transmits a sidelink transmission carrying the MAC PDU to another sidelink UE (e.g., the UEs 115 and/or 215) using the selected first resource.

FIG. 7 is a sequence diagram illustrating an LBT aware autonomous sidelink sensing method 700 according to some aspects of the present disclosure. The method 700 may be implemented by between a MAC layer 302 and a PHY layer 304 at a UE 215. In particular, the UE 215 may implement the method 700 for determining a resource selection window based on a projected LBT completion time when communicating over a sidelink channel in a shared radio frequency band. The method 700 may use mechanisms similar to the scheme 400 discussed above with respect to FIG. 4 and the methods 500 and 600 discussed above with respect to FIGS. 5 and 6, respectively. As illustrated, the method 700 includes a number of enumerated actions, but embodiments of the method 700 may include additional actions before, after, and in between the enumerated actions. In some embodiments, one or more of the enumerated actions may be omitted or performed in a different order.

Generally speaking, the method 700 includes features similar to method 500 in many respects. For example, actions 714, 716, 718, 720, 722, 724, and 726 are similar to actions 516, 520, 522, 524, 526, 528, and 530, respectively. Accordingly, for sake of brevity, details of those steps will not be repeated here.

In the method 700, the UE 215 may determine a projected LBT completion time, determine a T1 duration, and a T2 duration based on the projected LBT completion time, and determine a resource selection window based on the determined T1 and T2 durations similar to the methods 500 and 600. However, the method 700 provisions for a lighter MAC layer by offloading the projected LBT completion time, and T1 and T2 duration determination to the PHY layer.

At action 710, upon generation of a MAC PDU, for example, at a slot n, the MAC layer 302 sends a sensing request including a CAPC to the PHY layer 304. The CAPC may be associated with a traffic type of the MAC PDU. The CAPC can be based on a QoS, such a latency requirement, of the traffic type. In some instances, the CAPC may include a class for guaranteed transmission delay for real-time traffic, guaranteed transmission delay for non-real-time traffic, non-guaranteed transmission delay, and/or the like.

At action 712, the PHY layer 304 determines a projected LBT completion time (e.g., at a slot m) based on the CAPC. For instance, the PHY layer 304 may identify a CW size, CW minimum value, and the CW maximum value for the CAPC. The PHY layer 304 may draw a random number (e.g., denoted as a w parameter) between the CW minimum value and the CW maximum value. The PHY layer 304 may also consider deferral time or idle time (e.g., AIFS) that is associated with channel access in the frequency band. The PHY layer 304 compute the projected LBT completion time by applying equation (1) discuss above in relation to FIG. 5.

In some aspects, the PHY layer 304 may perform, in the shared radio frequency band, one or more LBTs (e.g., a type 1 LBTs or CAT4 LBTs). Each LBT of the one or more LBTs may be associated with a CAPC. For instance, the PHY layer 304 may start one or more LBTs after each transmission to gain access to the channel quicker upon arrival of new data for transmission as discussed above. The PHY layer 304 may identify a first LBT of the one more LBTs based on the CAPC. The PHY layer 304 may utilize the LBT counter value for the first LBT to estimate a remaining time for the first LBT and determine the projected LBT completion time based on the remaining time.

At action 714, the PHY layer 304 determines a T1 duration and a T2 duration based on the projected LBT completion time. For instance, the PHY layer 304 can determine the T1 duration such that a resource selection window (e.g., the resource selection window 404) may start after the projected LBT completion time. The PHY layer 304 can determine the T2 duration such that a difference between the T1 duration and the T2 duration is greater than a projected LBT duration (to accommodate an LBT procedure before a retransmission). In some aspects, the PHY layer 304 may determine the T1 duration and the T2 duration with respect to a resource selection trigger (e.g., the resource selection trigger 420), which may be sent to the PHY layer 304 by the MAC layer 302 at a later time. For instance, the MAC layer 302 may also provide the PHY layer 304 with a resource selection trigger time.

At action 716, the PHY layer 304 performs sensing in a sidelink resource pool, for example, using similar mechanisms as discussed at action 520. The PHY layer 304 may continuously sense or monitor resources in the sidelink resource pool prior to receiving the sensing request from the MAC layer 304.

At action 718, the MAC layer 302 sends a resource selection trigger (e.g., the resource selection trigger 420) to the PHY layer 304, for example, at a later time between slot n and (slot m−T3').

At action 720, in response to the resource selection trigger, the PHY layer 304 identifies candidate resources within a resource selection window (e.g., the resource selection window 404) based on sensing results in a sensing window (e.g., the sensing window 402), for example, using similar mechanisms as discussed at action 524. In some aspects, the PHY layer 304 may define the resource selection window based on the T1 and T2 duration determined at action 714.

At action 722, the PHY layer 304 sends a candidate resource report indicating the identified candidate resources 352. The report may indicate the time and frequency location information for the candidate resources.

At action 724, upon receiving the candidate resource report, the MAC layer 302 selects one or more resources from the candidate resources. For instance, the MAC layer 302 may randomly select a first resource from the candidate resources for an initial transmission of the MAC PDU and randomly select a second resource from the candidate resources for a potential retransmission of the MAC PDU as discussed above at action 528.

At action 726, the PHY layer 304 transmits a sidelink transmission carrying the MAC PDU to another sidelink UE (e.g., the UEs 115 and/or 215) using the selected first resource.

In some other aspects, the PHY layer 304 may prepare or determine one or more resource selection windows. Each resource selection window may be associated with a certain CAPC. In some instances, the number of resource selection windows can be greater than a number of CAPCs.

At action 720, the PHY layer 304 can select a first resource selection window from the one or more resource selection windows based on the CAPC provided by the MAC layer 302 at action 710. The PHY layer 304 may identify candidate resources within the first resource selection window based on past sensing results obtained from a sensing window defined with respect to the resource selection trigger received at action 718. For instance, the PHY layer 304 may determine a start of the sensing window based on a T0 duration before the resource selection trigger and may determine an end of the sensing window based on a $T_{proc,0}$ duration before the resource selection trigger as discussed above.

In some aspects, the MAC layer 302 may also provide the PHY layer 304 with a transmission power to be used for transmitting the MAC PDU. Thus, the PHY layer 304 may account for the transmission power when determining the projected LBT completion time. For instance, if the transmission power to be used for transmitting the MAC PDU is high, the PHY layer 304 may use a lower energy detection threshold to perform the LBT. An LBT using a lower energy detection threshold may take a longer time to complete as it may have a higher likelihood in failing.

In general, a UE 215 may determine a the projected LBT completion time based on at least one of a CAPC associated with a sidelink transmission, an interframe spacing (e.g., AIFS), a contention window size associated with the CAPC, an LBT counter value associated with the CAPC, an LBT energy detection threshold, or a transmission power for transmitting the sidelink transmission. The UE 215 may determine a T1 duration and a T2 duration based on the projected LBT completion time. The UE 215 may determine an LBW aware resource selection window based on the T1 duration and the T2 duration. The UE 215 may divide the tasks of determining LBT completion time and the T1 and T2 durations between the MAC layer 302 and the PHY layer 304 as shown in the methods 500, 600, and/or 700 discussed above with respect to FIGS. 5, 6, and/or 7, respectively. In some aspects, the UE 215 may alternatively configure the interactions between the MAC layer 302 and the PHY layer 304 for determining similar LBT aware resource selection window.

Figure 8A:
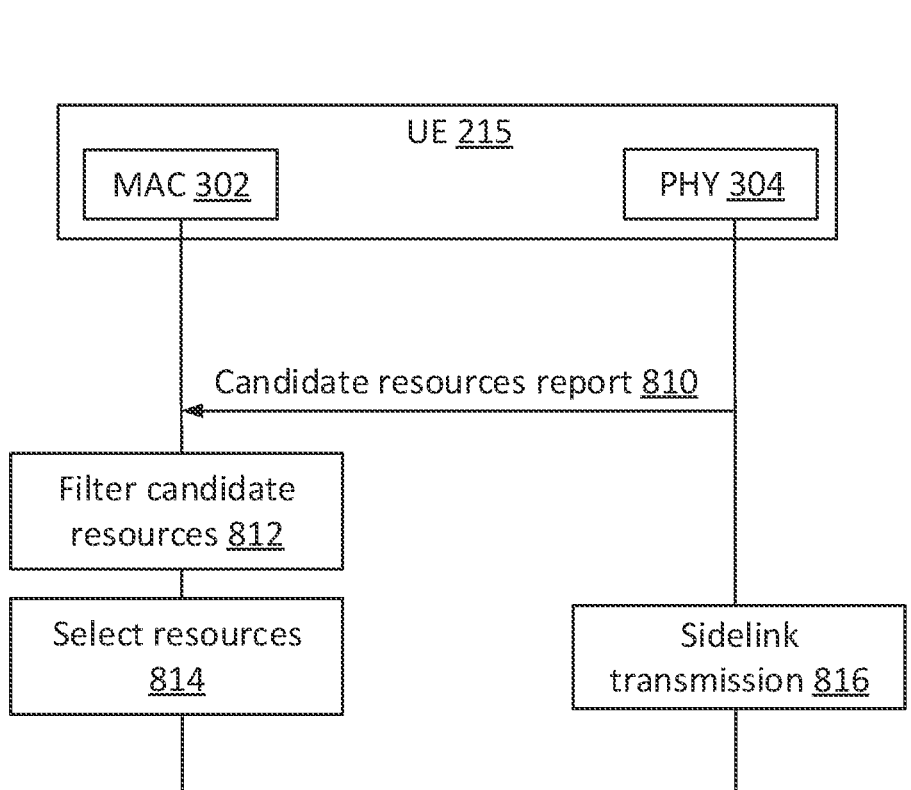
FIG. 8A is a sequence diagram illustrating an LBT aware autonomous sidelink sensing method according to some aspects of the present disclosure.
Figure 8B:
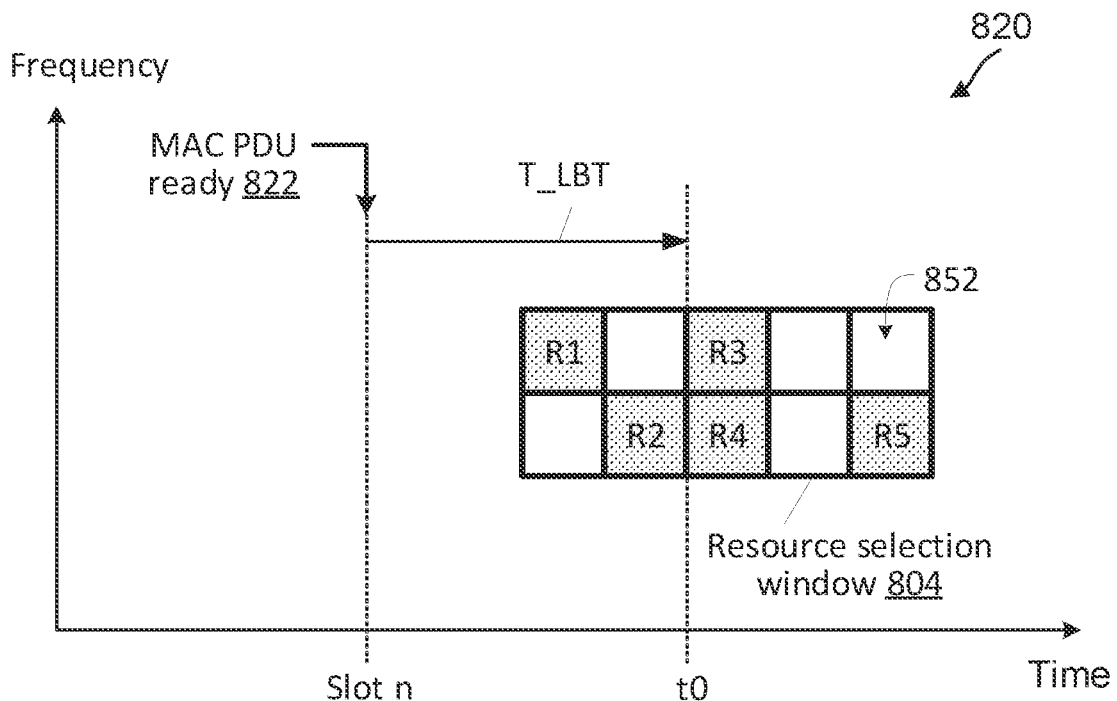
FIG. 8B illustrates an LBT aware autonomous sidelink sensing method according to some aspects of the present disclosure.

FIGS. 8A and 8B are discussed in relation to each other to illustrate LBT aware autonomous sidelink sensing. FIG. 8A is a sequence diagram illustrating an LBT aware autonomous sidelink sensing method 800 according to some aspects of the present disclosure. The method 800 may be implemented by a UE 215. In particular, the UE 215 may implement the method 800 for filtering candidate resources based on a projected LBT completion time when communicating over a sidelink channel in a shared radio frequency band. The method 800 can be implemented in conjunction with the methods 500, 600, and/or 700 discussed above with respect to FIGS. 5, 6, and/or 7, respectively. As illustrated, the method 800 includes a number of enumerated actions, but embodiments of the method 800 may include additional actions before, after, and in between the enumerated actions. In some embodiments, one or more of the enumerated actions may be omitted or performed in a different order.

In the method 800, the UE 215 may perform sensing and LBT (at the PHY layer 304), determine projected LBT completion time (at the MAC layer 302 and/or at the PHY layer 304), and identify candidate resources within a resource selection window based on past sensing results in a sensing window using similar mechanisms discussed above in relation to FIGS. 5-7. However, instead of determining resource selection window based on the projected LBT completion time, the UE 215 may filter the candidate resources in the resource selection window based on projected LBT completion time.

At action 810, the PHY layer 304 sends a candidate resource report indicating identified candidate resources within a resource selection window (e.g., a resource selection window 702 of FIG. 7B). The PHY layer 304 may identify the candidate resources based on a resource selection trigger. The PHY layer 304 may identify the candidate resources (available resources) within the resource selection window by excluding resources in the resource selection window based on SCI decoding SCI decoding and signal measurements in the sensing window and traffic priority associated with a MAC PDU to be transmitted over the sidelink channel, for example, using similar mechanisms as discussed in relation to action 524 of FIG. 5.

At action 812, upon receiving the candidate resource report, the MAC layer 302 filters the candidate resources based on a projected LBT completion time. For instance, the MAC layer 302 may exclude any resource in the candidate resources that are at an earlier time than the projected LBT completion time as shown in FIG. 8B.

FIG. 8B illustrates an LBT aware autonomous sidelink sensing scheme 820 according to some aspects of the present disclosure. The scheme 820 may be employed by the UE 215 or any other UEs such as the UEs 115 and 215. In FIG. 8B, the x-axis represents time in some arbitrary units, and the y-axis represents frequency in some arbitrary units.

In the scheme 820, the MAC layer 302 may generate a MAC PDU at slot n. The MAC layer 302 may project an LBT completion time (e.g., at t0) using similar mechanisms in the methods 500, 600, and/or 700 discussed above with respect to FIGS. 5, 6, and/or 7, respectively. The MAC layer 302 may send the PHY layer 304 a resource selection trigger. The PHY layer 304 may identify candidate resources from resources 852 (e.g., time-frequency resources similar to the resources 352) within a resource selection window 804 (e.g., by excluding resources based on SCI decoding and signal measurements in a past sensing window and/or a traffic priority associated with the MAC PDU as discussed above at action 524 of FIG. 5). The resource selection window 804 may be defined based on T1 and T2 durations discussed in the scheme 300 above (without considering an LBT timeline). As an example, the PHY layer 304 may identify the resources 852 R1, R2, R3, R4, and R5 in the resource selection window 804 as available. The PHY layer 304 sends a candidate resource report to the MAC layer 302. The report may indicate the candidate resources 852 R1, R2, R3, R4, and R5 in the resource selection window 804. The MAC layer 302 may exclude the candidate resources 852 R1 and R2 based on the candidate resources 852 R1 and R2 being at an earlier time than the projected LBT completion time t0. Although FIG. 8B illustrates the resource selection window 804 including 10 resources, it should be understood that in other examples a resource selection window can include a less number of resources (e.g., about 4, 5, 6, 7, or 8) or a greater number of resources (e.g., 12, 13, 14, 17, 18, 19, 20, 24, 32, or more). Additionally, the number of candidate resources available may also vary depending on the sensing.

In some aspects, in the scheme 820, the UE 215 may determine a sensing window that is anchored at the time (at a slot n) when the MAC PDU 822 is generated, for example, similar to the scheme 300 discussed above in relation to FIGS. 3A-3B. In some other aspects, UE 215 may determine a sensing window that is anchored at a later time than the slot n when the MAC PDU 822 is generated, for example, similar to the scheme 400 discussed above in relation to FIG. 4. By utilizing a sensing window at a later time can allow for a more reliable prediction for resource usages in the resource selection window 804.

Returning to FIG. 8A, at action 814, after filtering the candidate resources indicated by the PHY layer 304, the MAC layer 302 selects one or more resources from the filtered candidate resources (e.g., the resources 852 R3, R4, and R5). For instance, the MAC layer 302 may randomly select a first resource from the filtered candidate resources for an initial transmission of the MAC PDU and randomly select a second resource from the filtered candidate resources for a potential retransmission of the MAC PDU as discussed above at action 528.

At action 816, the PHY layer 304 transmits a sidelink transmission carrying the MAC PDU to another sidelink UE (e.g., the UEs 115 and/or 215) using the selected first resource.

In some aspects, the method 800 can be less efficient compared to the methods 500-700 discussed above as the PHY layer 304 are utilizing an outdated resource selection window (with resources before the projected LBT completion time) to determine candidate resources. However, the method 800 can have a lower processing complexity and with a minimal change the current autonomous sidelink sensing framework compared to the methods 500-700.

As discussed above, a transmitting UE 215 may apply HARQ to sidelink transmissions. For instance, the UE 215 may transmit a TB carrying a MAC PDU in an initial transmission to a corresponding receiving UE 215. If the receiving UE 215 successfully decoded the TB in the initial transmission, the receiving UE 215 may feedback a HARQ ACK to the transmitting UE 215. Otherwise, the UE 215 may feedback a HARQ NACK to the transmitting UE 215. Upon receiving a HARQ NACK at the transmitting UE 215, the transmitting UE 215 may retransmit the TB to the receiving UE 215. The retransmission can use the same coded version or redundancy version as the initial transmission or a different coded version or redundancy version than the initial transmission. In some aspects, a MAC layer 302 at the UE 215 may select multiple resources (e.g., 2, 3, or 4) from a set of candidate resources provided by a PHY layer 304 at the UE 215, for example, at action 528 of the method 500, action 628 of the method 600, action 724 of the method 700, and/or action 814 of the method 800 discussed above. In some instances, the UE 215 may select an earliest available resource from the set of candidate resources as a first resource and select a next available resource from the set of candidate resources as the second resource. In some other instances, the UE 215 may account for a projected LBT duration by checking whether a time distance between a pair of resources can accommodate the projected LBT duration.

Figures 9, 10:
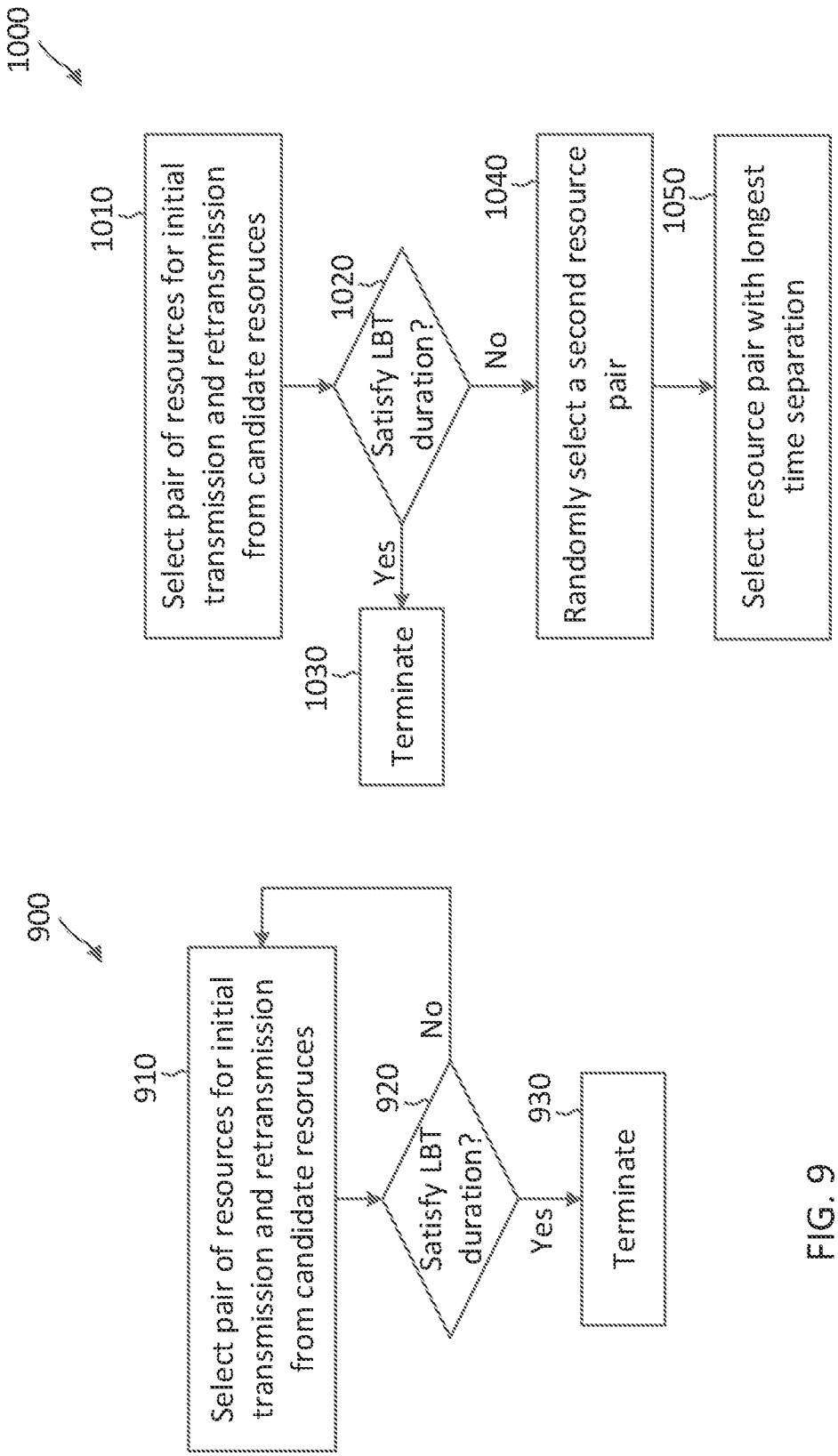
FIG. 9 is a flow diagram illustrating an LBT aware autonomous sidelink resource selection method according to some aspects of the present disclosure.
FIG. 10 is a flow diagram illustrating an LBT aware autonomous sidelink resource selection method according to some aspects of the present disclosure.

FIGS. 9-10 illustrate various mechanisms for screening resources for HARQ retransmissions. FIG. 9 is a flow diagram illustrating an LBT aware autonomous sidelink resource selection method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as a UE 115, 215, 1400 may utilize one or more components, such as the processor 1402, the memory 1404, the LBT aware autonomous sidelink sensing module 1408, the transceiver 1410, the modem 1412, and the one or more antennas 1416, to execute the steps of method 900. As illustrated, the method 900 includes a number of enumerated steps, but aspects of the method 900 may include additional steps before, after, and in between the enumerated steps. In some aspects, one or more of the enumerated steps may be omitted or performed in a different order. Although FIG. 9 illustrates the UE selecting a pair of resources (e.g., an initial transmission resource and a retransmission resource), it should be understood that in other examples the UE can select a set of any number of resources (e.g., 3, 4 or more) to provision for a greater number of retransmissions.

In some aspects, the method 900 may be implemented by the UE at action 528 of the method 500, action 628 of the method 600, action 724 of the method 700, and/or action 814 of the method 800 discussed above in relation to FIGS. 5, 6, 7, and 8A, respectively.

At block 910, the UE randomly selects a pair of resources for an initial transmission of a MAC PDU and a potential retransmission of the MAC PDU from candidate resources. The pair of resources may be denoted as {R1, R2}. The candidate resources may be identified from a resource selection window as discussed at action 524 of the method 500. To select the pair of resources, the UE may draw two random numbers (e.g., k1 and k2) between 1 and N, where N represents the number of candidate resources available. The UE may select the $k1^{th}$ and $k2^{th}$ candidate resources as the resource R1 and R2, respectively, based on the drawn random numbers.

At block 920, the UE determines whether a time gap (e.g., the T4 duration) between the pair of resources (between R1 and R2) exceeds (satisfies) a projected LBT duration (e.g., the time to perform an LBT including an AIFS and a countdown based on a certain CW size). If the UE determines that the time gap exceeds (satisfies) the projected LBT duration, the UE proceeds to action 930 where the resource selection may terminate. After completing the resource selection, the UE may use the selected resources for transmissions, for example, as shown at action 530. If the UE determines that the time gap is below (fails to satisfy) the projected LBT duration, the UE returns to block 910 and randomly select another pair of resources from the candidate resources.

In some aspects, the method 900 may be implemented by at a MAC layer 302 of the UE 215. The MAC layer 302 may include a random resource selection function call. The random resource selection function call may take a set of candidate resources as input and may output a pair of resources (R1, R2) randomly selected from the random resource selection function call. The MAC layer 302 may call the random resource selection function call repeatedly until the random resource selection function call outputs a pair of resources spaced apart from each other in time by a time gap satisfying the projected LBT duration.

FIG. 10 is a flow diagram illustrating an LBT aware autonomous sidelink resource selection method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as a UE 115, 215, 1400 may utilize one or more components, such as the processor 1402, the memory 1404, the LBT aware autonomous sidelink sensing module 1408, the transceiver 1410, the modem 1412, and the one or more antennas 1416, to execute the steps of method 1000. As illustrated, the method 1000 includes a number of enumerated steps, but aspects of the method 1000 may include additional steps before, after, and in between the enumerated steps. In some aspects, one or more of the enumerated steps may be omitted or performed in a different order. Although FIG. 10 illustrates the UE selecting a pair of resources (e.g., an initial transmission resource and a retransmission resource), it should be understood that in other examples the UE can select a set of any number of resources (e.g., 3, 4 or more) to provision for a greater number of retransmissions.

In some aspects, the method 1000 may be implemented by the UE at action 528 of the method 500, action 628 of the method 600, action 724 of the method 700, and/or action 814 of the method 800 discussed above in relation to FIGS. 5, 6, 7, and 8A, respectively.

At block 1010, the UE randomly selects a first pair of resources for an initial transmission of a MAC PDU and a potential retransmission of the MAC PDU from candidate resources. The first pair of resources may be denoted as {R1, R2}. The candidate resources may be identified from a resource selection window as discussed at action 524 of the method 500. To select the first pair of resources, the UE may draw two random numbers (e.g., k1 and k2) between 1 and N, where N represents the number of candidate resources available. The UE may select the k1$^{th}$ and k2$^{th}$ candidate resources as the resource R1 and R2, respectively, based on the drawn random numbers.

At block 1020, the UE determines whether a time gap (e.g., the T4 duration) between the pair of resources (between R1 and R2) exceeds (satisfies) a projected LBT duration (e.g., the time to perform an LBT including an AIFS and a countdown based on a certain CW size). If the UE determines that the time gap exceeds (satisfies) the projected LBT duration, the UE proceeds to action 1030 where the resource selection may terminate. After completing the resource selection, the UE may use the selected resources for transmissions, for example, as shown at action 530. If the UE determines that the time gap is below (fails to satisfy) the projected LBT duration, the UE proceeds to block 1040.

At block 1040, the UE randomly selects a second pair of resources for an initial transmission of a MAC PDU and a potential retransmission of the MAC PDU from the candidate resources. The second pair of resources may be denoted as {R3, R4}. For instance, the UE may draw two random numbers (e.g., k3 and k4) between 1 and N, where N represents the number of candidate resources available. The UE may select the k3$^{th}$ and k4$^{th}$ candidate resources as the resource R3 and R4, respectively, based on the drawn random numbers.

At block 1050, the UE select the resource pair from the first and second pair of resources with the longer time separation. For instance, the first pair of resources R1 and R2 may be spaced by a first time gap, and the second pair of resources R3 and R4 may be spaced by a second time gap. The UE may select the first pair of resources if the first time gap is larger than second time gap. Alternatively, the UE may select the second pair of resources if the second time gap is larger than first time gap.

Figure 11A:
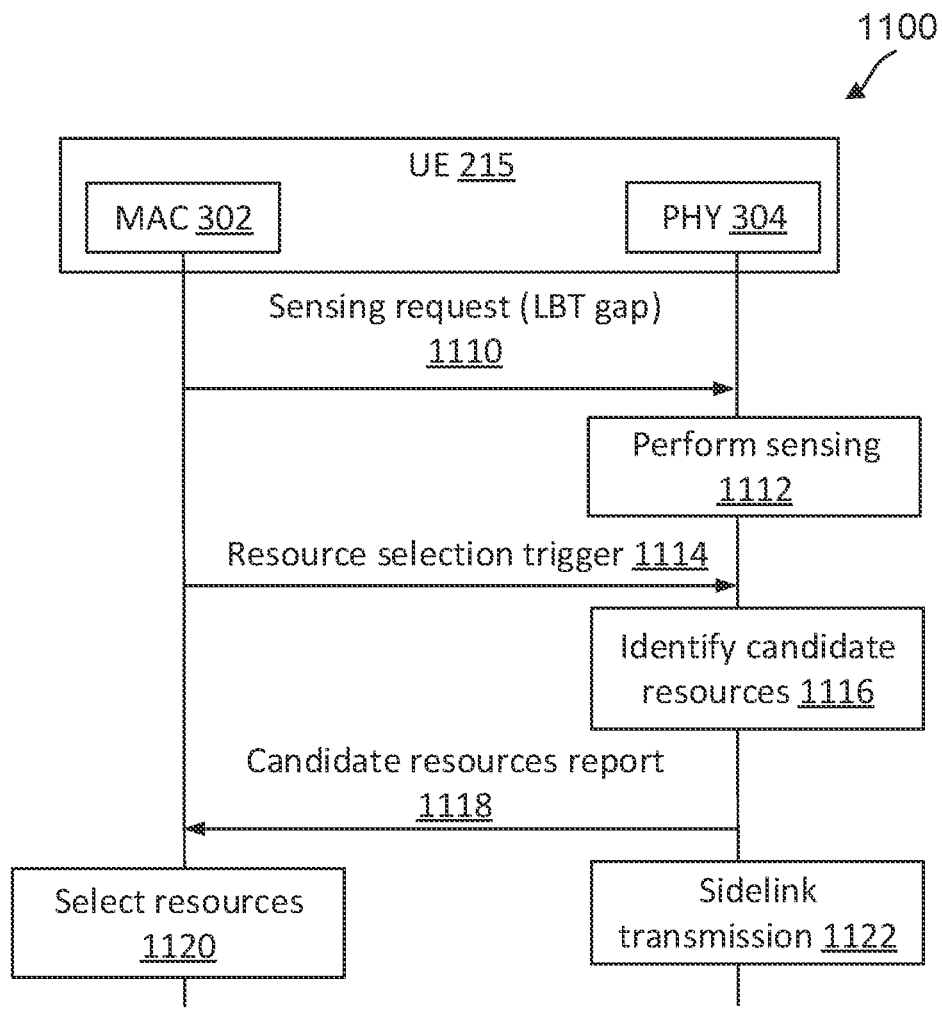
FIG. 11A is a sequence diagram illustrating an LBT aware autonomous sidelink sensing method according to some aspects of the present disclosure.
Figure 11B:
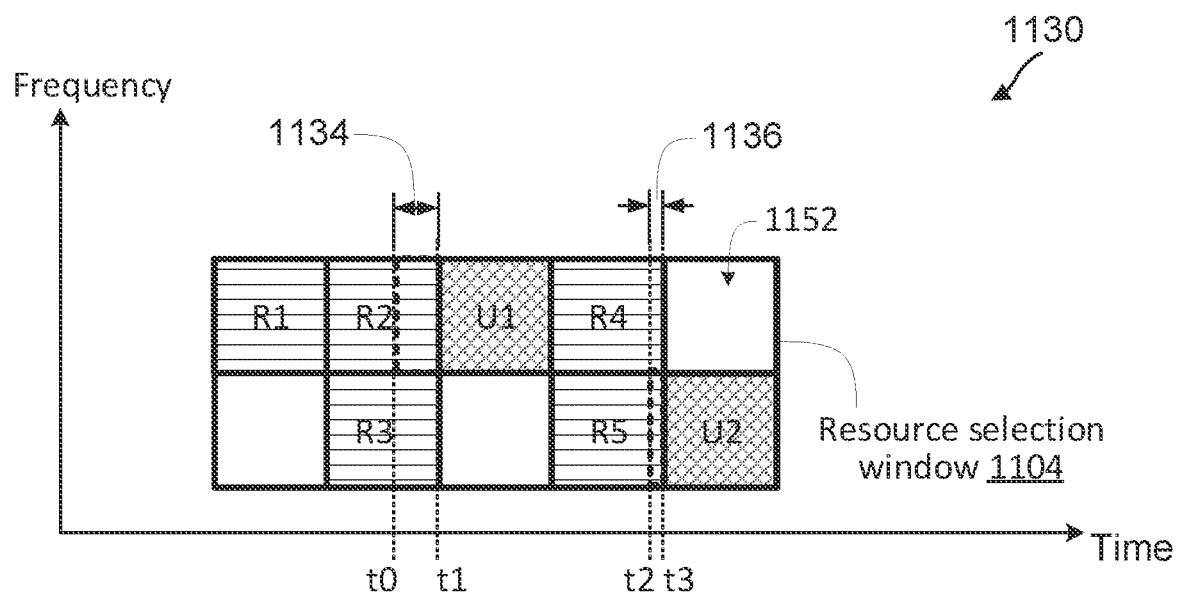
FIG. 11B illustrates an LBT aware autonomous sidelink sensing method according to some aspects of the present disclosure.

FIGS. 11A and 11B are discussed in relation to each other to illustrate LBT aware autonomous sidelink sensing with LBT gap considerations. For instance, resources in a sidelink resource pool (e.g., the sidelink resource pool 408) may leave gaps for sidelink UEs to perform LBTs. Thus, a sidelink resource may have an overlap with an LBT gap near the end of the sidelink resource, where the LBT gap may be used by a sidelink UE intending to use a next sidelink resource in time. In other words, the sidelink resource with an LBT overlap may end at an earlier time, and thus reducing an allowable transmission time. The reduced transmission time can impact performance, and thus a UE 215 may desire to avoid resources that include an overlap with an LBT gap of another UE or at least avoid resources with a large overlap with an LBT gap.

FIG. 11A is a sequence diagram illustrating an LBT aware autonomous sidelink sensing method 1100 according to some aspects of the present disclosure. The method 1100 may be implemented by a UE 215. In particular, the UE 215 may implement the method 1100 for filtering candidate resources based on LBT gaps of another UE 215 when communicating over a sidelink channel in a shared radio frequency band. The method 1100 can be implemented in conjunction with the methods 500, 600, 700, 800, 900, and/or 1000 discussed above with respect to FIGS. 5, 6, 7, 8A, 9, and/or 10, respectively. As illustrated, the method 1100 includes a number of enumerated actions, but embodiments of the method 1100 may include additional actions before, after, and in between the enumerated actions. In some embodiments, one or more of the enumerated actions may be omitted or performed in a different order.

At action 1110, the MAC layer 302 sends a sensing request to the PHY layer 304. The sensing request may include LBT gap information. In an aspect, the sensing request may request the PHY layer 304 to provide candidate resources without any LBT gap. In another aspect, the sensing request may request the PHY layer 304 to provide resources that do not overlap with an LBT gap by more than Z symbols, where Z is a positive integer (e.g., 1, 2, 3 or more). For instance, the MAC layer 302 may determine that it can accept resources that are shortened by an LBT gap up to Z symbols long. In yet another aspect, the sensing request may request the PHY layer 304 to provide resources that do not overlap with an LBT gap by more than Z symbols and indicate the LBT gap for each resource that has an overlap with the LBT gap.

At action 1112, the PHY layer 304 performs sensing in a sidelink resource pool, for example, using similar mechanisms as discussed at action 520. The PHY layer 304 may continuously sense or monitor resources in the sidelink resource pool prior to receiving the sensing request from the MAC layer 304. Additionally, the PHY layer 304 may monitor the resources in the sidelink resource pool for information associated with LBT gaps. For instance, a sidelink UE may also include an LBT duration in SCI in addition to reservation and/or scheduling information. Accordingly, the PHY layer 304 can also record LBT gap duration information associated with a resource upon successfully decoding SCI including LBT gap duration from a PSCCH of the resource.

At action 1114, the MAC layer 302 sends a resource selection trigger (e.g., the resource selection trigger 420) to the PHY layer 304. For instance, the MAC layer 302 may have generated a MAC PDU at a slot n and may have determine a time to send the resource selection trigger based on a projected LBT completion time, for example, using similar mechanisms as discussed above at action 514 of the method 500.

At action 1116, in response to the resource selection trigger, the PHY layer 304 identifies candidate resources within a resource selection window (e.g., the resource selection window 1104 shown in FIG. 11B) based on sensing results in a sensing window (e.g., the sensing window 402). The PHY layer 304 may determine the resource selection window and the sensing window based on T1 and T2 durations. The T1 and T2 durations can be determined based on a projected LBT completion time at the MAC layer 302 as discussed above at action 516 of the method 500 or at action 616 of the method 600. Alternatively, the T1 and T2 durations can be determined based on a projected LBT completion time at the PHY layer 304 as discussed above at action 712 of the method 700. The PHY layer 304 may identify the candidate resources (available resources) within the resource selection window by excluding resources in the resource selection window based on SCI decoding SCI decoding and signal measurements in the sensing window and traffic priority associated with a MAC PDU to be transmitted over the sidelink channel, for example, using similar mechanisms as discussed in relation to action 524 of FIG. 5.

Additionally, the PHY layer 304 may filter the candidate resources based on the LBT gap information received from the sensing request at action 1110. For instance, when the sensing request requests the PHY layer 304 to provide candidate resources without any LBT gap, the PHY layer 304 may exclude any resource in the candidate resource that is at least partially overlapping with an LBT gap. In another instance, when the sensing request requests the PHY layer 304 to provide resources that do not overlap with an LBT gap by more than Z symbols, the PHY layer 304 may exclude any resource in the candidate resources that overlaps with an LBT gap by more than Z symbols. The filtering or exclusion of candidate resources by LBT gaps is shown in FIG. 11B.

FIG. 11B illustrates an LBT aware autonomous sidelink sensing scheme 1130 according to some aspects of the present disclosure. The scheme 1130 may be employed by the UE 215 or any other UEs such as the UEs 115 and 215. In FIG. 11B, the x-axis represents time in some arbitrary units, and the y-axis represents frequency in some arbitrary units.

In the scheme 1130, the PHY layer 304 may identify candidate resources from resources 1152 within the resource selection window 1104, for example, by filtering the resources 1152 using a combination of combination of SCI decoding, signal measurements, and/or priority information as discussed above at action 524. As an example, the PHY layer 304 may identify the resources 1152 R1, R2, R3, R4, R5, U1, and U2 as available after the filtering by SCI decoding, signal measurements, and/or priority information.

Next, the PHY layer 304 may further filter the candidate resources based on the LBT gap information requested by the sensing request received from the MAC layer 302. For instance, when the sensing request requests the PHY layer 304 to provide candidate resources without any LBT gap, the PHY layer 304 may exclude the resource 1152 R2 based on the resource 1152 R2 overlaps with an LBT gap 1134 from the resource 1152 U1. The PHY layer 304 may also exclude the resource 1152 R5 based on the resource 1152 R5 overlaps with an LBT gap 1136 from the resource 1152 U2. In other words, the candidate resources that meet the LBT gap criteria specified by the MAC layer 302 are {R1, R3, R4}. In another instance, when the sensing request requests the PHY layer 304 to provide resources that do not overlap with an LBT gap by more than Z symbols, the PHY layer 304 may exclude the resource 1152 R2, for example, based on the overlap with the LBT gap 1134 having more than Z symbols. The PHY layer 304 may not exclude the resource 1152 R5, for example, based on the overlap with the LBT gap 1136 having than Z symbols. In other words, the candidate resources that meet the LBT gap criteria specified by the MAC layer 302 are {R1, R3, R4, R5}. Although FIG. 11B illustrates the resource selection window 1104 including 10 resources, it should be understood that in other examples a resource selection window can include a less number of resources (e.g., about 4, 5, 6, 7, or 8) or a greater number of resources (e.g., 12, 13, 14, 17, 18, 19, 20, 24, 32, or more). Additionally, the number of candidate resources available may also vary depending on the sensing.

Returning to FIG. 11A, at action 1118, the PHY layer 304 sends a candidate resource report indicating identified candidate resources within the resource selection window. For instance, when the sensing request requests the PHY layer 304 to provide candidate resources without any LBT gap, the report may indicate the candidate resources (e.g., {R1, R3, R4} shown in FIG. 11B) that are without any overlap with an LBT gap. In another instance, when the sensing request requests the PHY layer 304 to provide resources that do not overlap with an LBT gap by more than Z symbols, the report may indicate the candidate resources (e.g., {R1, R3, R4, R5} shown in FIG. 11B) that are without any overlap with an LBT gap or a maximum an LBT gap overlap having Z symbols. In some instances, the report may also indicate, for each resource of the candidate resources, a number of symbols overlapping with an LBT gap. For instance, the report may indicate a number symbols overlapping with the LBT gap 1136 for the resource 1152 R5.

At action 1120, upon receiving the candidate resource report, the MAC layer 302 selects one or more resources from the candidate resources. For instance, the MAC layer 302 may randomly select a first resource from the candidate resources for an initial transmission of the MAC PDU and randomly select a second resource from the candidate resources for a potential retransmission of the MAC PDU as discussed above at action 528. In some aspects, when the report also indicates the number of symbols overlapping with an LBT gap for candidate resources that overlap with the LBT gap, the MAC layer 302 may first randomly select a resource from the candidate resources (e.g., {R1, R3, and R4}) that do not overlap with any LBT gap. If the MAC layer 304 needs to select further resources, the MAC layer 304 may then select a candidate resource with a smallest LBT gap overlap. In general, the MAC layer 304 may prioritize resource selection from candidate resources without any LBT gap overlap, and may rank the remaining candidate resources based on LBT gap overlap durations and prioritize the selection from candidate resources with the smaller LBT gap overlap durations. Referring to the example shown in FIG. 11B, if the resource candidate resources include the resource 1152 R2 and R5, the MAC layer 302 may select the resource 1152 R5 over the resource 1152 R2 based on the resource 1152 R5 having a smaller LBT gap 1136 overlap.

At action 1122, the PHY layer 304 transmits a sidelink transmission carrying the MAC PDU to another sidelink UE (e.g., the UEs 115 and/or 215) using the resource selected by the MAC layer 302 at action 1120.

Figure 12A:
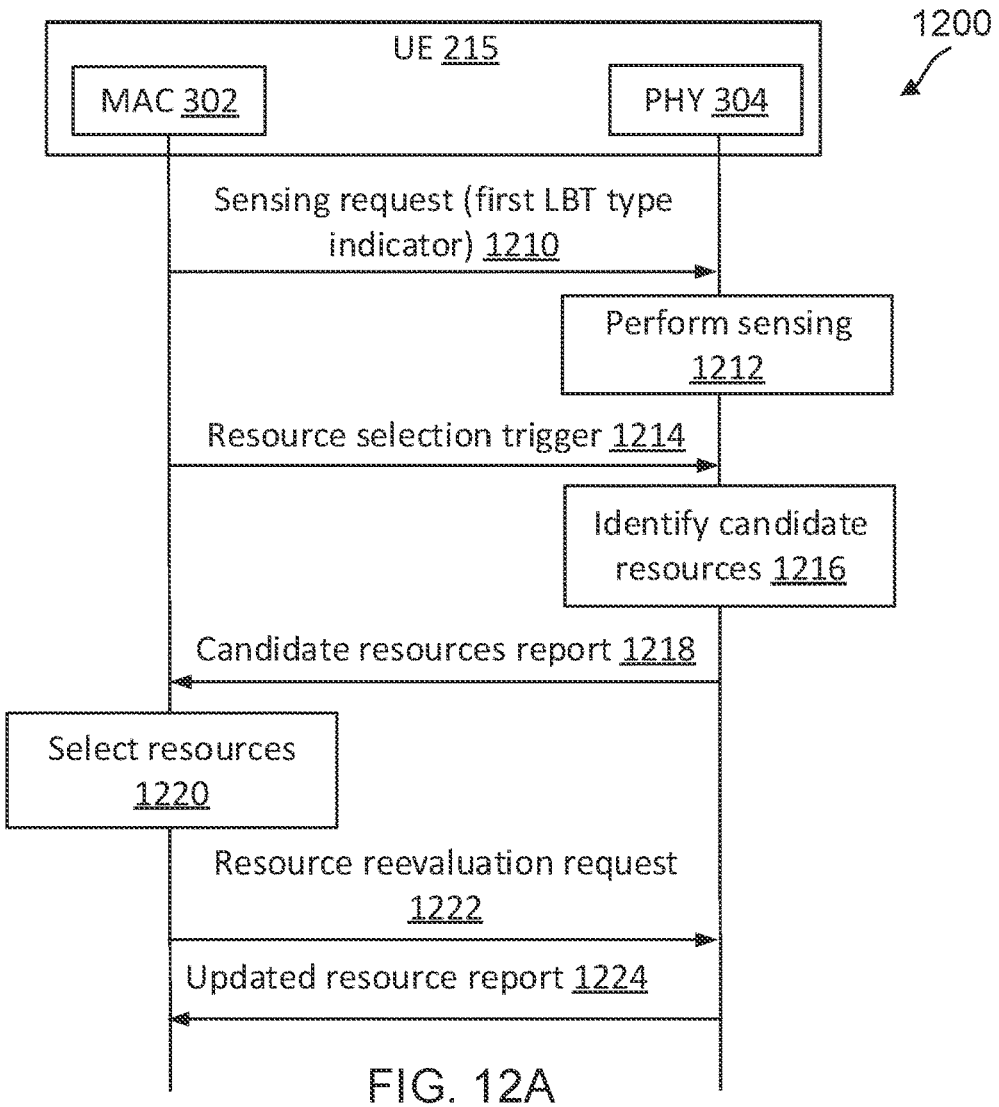
FIG. 12A is a sequence diagram illustrating an LBT aware autonomous sidelink sensing method according to some aspects of the present disclosure.
Figure 12B:
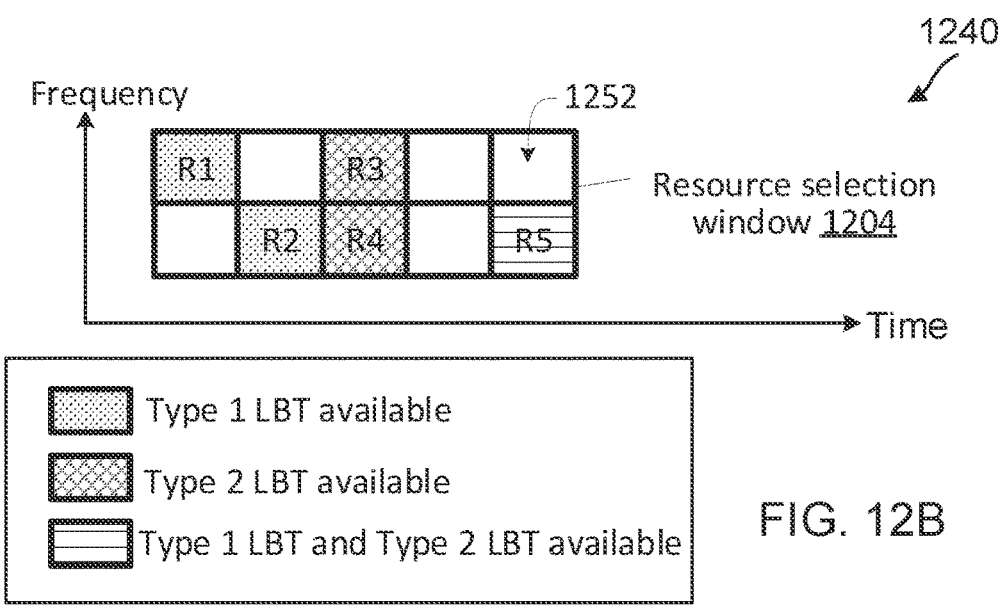
FIG. 12B illustrates an LBT aware autonomous sidelink sensing method according to some aspects of the present disclosure.

FIGS. 12A and 12B are discussed in relation to each other to illustrate LBT aware autonomous sidelink sensing with LBT type considerations. For instance, when operating over a shared radio frequency band, a first sidelink UE 215 may contend for a COT in the share radio frequency band by performing a CAT4 LBT (a type 1 LBT). If the LBT is successful, the first sidelink UE 215 may gain the COT in the share radio frequency band and may communicate with a second sidelink UE 215 over the share radio frequency band during the COT. In some instances, the first sidelink UE 215 may not utilize the entire duration of the COT, and may allow another sidelink UE (e.g., a third sidelink UE 215) to share the remaining duration of the COT. When the third sidelink UE 215 shares the first sidelink UE 215's COT, the third sidelink UE 215 may perform a CAT2 LBT (a type 2 LBT) prior to transmitting during the first sidelink UE 215's COT. In some instances, the first sidelink UE 215 may indicate that the COT is for sharing by transmitting a COT-structure indicator (COT-SI) at the beginning of the COT and may indicate COT sharing information in the COT-SI. For instance, the COT-SI may indicate a remaining duration in the COT for sharing with another sidelink UE. Accordingly, the third sidelink UE 215 may monitor for COT-SI and may be aware of the first sidelink UE 215 sharing its COT based on COT-SI received from the first sidelink UE 215. As such, in some instances, a sidelink resource pool (e.g., the sidelink resource pool 408) may include a first type of resources that require a CAT4 LBT (a type 1 LBT) prior to transmitting in the resources and may include a second type of resources (shared by other UEs via UE-to-UE COT sharing) that require a CAT2 LBT (a type 2 LBT) prior to transmitting in the resources.

FIG. 12A is a sequence diagram illustrating an LBT aware autonomous sidelink sensing method 1200 according to some aspects of the present disclosure. The method 1200 may be implemented by a UE 215. In particular, the UE 215 may implement the method 1200 for filtering candidate resources based on LBT types when communicating over a sidelink channel in a shared radio frequency band. The method 1200 can be implemented in conjunction with the methods 500, 600, 700, 800, 900, 1000, and/or 1100 discussed above with respect to FIGS. 5, 6, 7, 8A, 9, 10, and/or 11, respectively. As illustrated, the method 1200 includes a number of enumerated actions, but embodiments of the method 1200 may include additional actions before, after, and in between the enumerated actions. In some embodiments, one or more of the enumerated actions may be omitted or performed in a different order.

At action 1210, the MAC layer 302 sends a sensing request to the PHY layer 304. The sensing request may include a first LBT type indication indicating a set of one more or more LBT types. In some instances, the first LBT type indication may indicate a first LBT type (e.g., a CAT4 LBT or a type 1 LBT). In some other instances, the first LBT type indication may indicate a second LBT type (e.g., a CAT2 LBT or a type 2 LBT). In yet some other instances, the first LBT type indication may indicate the first LBT type and the second LBT type. In some aspects, when the first LBT type indicator includes a type 2 LBT, the MAC layer 302 may also indicate a CAPC associated with a MAC PDU ready for transmission and/or a transmission power to be used for transmitting the MAC PDU.

At action 1212, the PHY layer 304 performs sensing in a sidelink resource pool, for example, using similar mechanisms as discussed at action 520. The PHY layer 304 may continuously sense or monitor resources in the sidelink resource pool prior to receiving the sensing request from the MAC layer 304. Additionally, the PHY layer 304 may monitor the resources in the sidelink resource pool for information associated with COT sharing opportunities. For instance, a sidelink UE may also include a COT-SI in SCI in addition to reservation and/or scheduling information. The COT-SI may provide COT sharing information, for example, indicating the time and the duration during which another sidelink UE may share the COT. Accordingly, the PHY layer 304 can also record LBT type or COT-sharing information associated with a resource upon successfully decoding SCI including COT sharing duration from a PSCCH of the resource.

At action 1214, the MAC layer 302 sends a resource selection trigger (e.g., the resource selection trigger 420) to the PHY layer 304. For instance, the MAC layer 302 may have generated a MAC PDU at a slot n and may have determine a time to send the resource selection trigger based on a projected LBT completion time, for example, using similar mechanisms as discussed above at action 514 of the method 500.

At action 1216, in response to the resource selection trigger, the PHY layer 304 identifies candidate resources within a resource selection window (e.g., the resource selection window 1204 shown in FIG. 12) based on sensing results in a sensing window (e.g., the sensing window 402). The PHY layer 304 may determine the resource selection window and the sensing window based on T1 and T2 durations. The T1 and T2 durations can be determined based on a projected LBT completion time at the MAC layer 302 as discussed above at action 516 of the method 500 or at action 616 of the method 600. Alternatively, the T1 and T2 durations can be determined based on a projected LBT completion time at the PHY layer 304 as discussed above at action 712 of the method 700. The PHY layer 304 may identify the candidate resources (available resources) within the resource selection window by excluding resources in the resource selection window based on SCI decoding SCI decoding and signal measurements in the sensing window and traffic priority associated with a MAC PDU to be transmitted over the sidelink channel, for example, using similar mechanisms as discussed in relation to action 524 of FIG. 5.

Additionally, the PHY layer 304 may filter the candidate resources based on the first LBT type indicator received from the sensing request at action 1110. For instance, when the first LBT type indicator indicates a type 1 LBT, the PHY layer 304 may only include candidate resources that are available (to be acquired) via type 1 LBT. In other words, the PHY layer 304 may exclude candidate resources that are shared by another UE (e.g., based on the record generated during sensing at action 1212). In another instance, when the first LBT type indicator indicates a type 2 LBT, the PHY layer 304 may only include candidate resources that are available (to be acquired) via type 2 LBT. In other words, the PHY layer 304 may exclude candidate resources that are not shared by another UE (e.g., based on the record generated during sensing at action 1212). In yet another instance, when the first LBT type indicator indicates a type 1 LBT and a type 2 LBT, the PHY layer 304 may include candidate resources that are available (to be acquired) via a type 1 LBT or a type 2 LBT. In some aspects, when the first LBT type indicator indicates a CAPC and/or a transmission power along with a type 2 LBT, the PHY layer 304 may also filter the candidate resources available via type 2 LBT based on the CAPC and/or transmission power. For instance, a UE sharing a COT may indicate in a COT-SI which priority traffic class may share the COT and/or the allowable transmission power in the COT. In some instances, the allowable transmission power in the COT may be based on an energy detection threshold used by the UE for acquiring the COT. Accordingly, the PHY layer 304 may further filter out a type 2 LBT resource(s) that may not satisfy the CAPC and/or the transmission power. The filtering or exclusion of candidate resources by LBT types is shown in FIG. 12B.

FIG. 12B illustrates an LBT aware autonomous sidelink sensing scheme 1240 according to some aspects of the present disclosure. The scheme 1240 may be employed by the UE 215 or any other UEs such as the UEs 115 and 215. In FIG. 12B, the x-axis represents time in some arbitrary units, and the y-axis represents frequency in some arbitrary units.

In the scheme 1240, the PHY layer 304 may identify candidate resources from resources 1252 within the resource selection window 1204, for example, by filtering the resources 1252 using a combination of combination of SCI decoding, signal measurements, and/or priority information as discussed above at action 524. As an example, the PHY layer 304 may identify the resources 1252 R1, R2, R3, R4, and R5 as available after the filtering by SCI decoding, signal measurements, and/or priority information. For instance, the resources 1252 R1 and R2 are available via type 1 LBT, the resources 1252 R3 and R4 are available via type 2 LBT, and the resource 1252 R5 is available via type 1 LBT and a type 2 LBT.

Next, the PHY layer 304 may further filter the candidate resources based on the first LBT type indicator by the sensing request received from the MAC layer 302. For instance, when the first LBT type indicator indicates a type 1 LBT, the PHY layer 304 may include the candidate resources 1252 R1 and R2 that are available (to be acquired) via type 1 LBT. In another instance, when the first LBT type indicator indicates a type 2 LBT, the PHY layer 304 may include the candidate resources 1252 R3 and R4 that are available (to be acquired) via type 2 LBT. In yet another instance, when the first LBT type indicator indicates a type 1 LBT and a type 2 LBT, the PHY layer 304 may include the candidate resource 1252 R5 that is available (to be acquired) via type 1 LBT and a type 2 LBT. Although FIG. 12B illustrates the resource selection window 1204 including 10 resources, it should be understood that in other examples a resource selection window can include a less number of resources (e.g., about 4, 5, 6, 7, or 8) or a greater number of resources (e.g., 12, 13, 14, 17, 18, 19, 20, 24, 32, or more). Additionally, the number of candidate resources available may also vary depending on the sensing.

Returning to FIG. 12A, at action 1218, the PHY layer 304 sends a candidate resource report indicating identified candidate resources within the resource selection window. For instance, when the first LBT type indicator indicates a type 1 LBT, the report may include the candidate resources (e.g., {R1, R2} shown in FIG. 12B) that are available (to be acquired) via type 1 LBT. In another instance, when the first LBT type indicator indicates a type 2 LBT, the report may include the candidate resources (e.g., {R3, R4} shown in FIG. 12B) that are available (to be acquired) via type 2 LBT. In yet another instance, when the first LBT type indicator indicates a type 1 LBT and a type 2 LBT, the report may include the candidate resource (e.g., R5 shown in FIG. 12B) that is available (to be acquired) via type 1 LBT and a type 2 LBT.

At action 1220, upon receiving the candidate resource report, the MAC layer 302 selects one or more resources from the candidate resources. For instance, the MAC layer 302 may randomly select a first resource from the candidate resources for an initial transmission of the MAC PDU and randomly select a second resource from the candidate resources for a potential retransmission of the MAC PDU as discussed above at action 528.

In some aspects, the MAC layer 302 may also request for a last-minute resource reevaluation. For instance, at action 1222, the MAC layer 302 sends a resource reevaluation request to the PHY layer 304 (e.g., at a T3 duration before the actual transmission time of a resource selected at action 1220). The resource reevaluation request may request the PHY layer 304 to report updated available resources at this time instant to double check whether the previously selected resources are still available. The resource reevaluation request may include a second LBT type indication. In some instances, the second LBT type indication may be the same as the first LBT type indication. In some other instances, the second LBT type indication may be the different than the first LBT type indication. For instance, the second LBT type indication may indicate a different set of LBT types than the first LBT type indication.

At action 1224, in response to the resource reevaluation request, the PHY layer 304 sends an updated resource report to the MAC layer 302 based on the second LBT type indication. In some instances, the PHY layer 304 may include, in the updated resource report, indications for resources that are available under a different LBT type than initially identified. For instance, the PHY layer 304 may reevaluate the availability (e.g., via type 1 LBT and/or a type 2 LBT) of the candidate resources that were identified from the resource selection window earlier at action 314. In some instances, the PHY layer 304 may determine that a candidate resource (e.g., the resource R1 shown in FIG. 12B) was available via a type 1 LBT may now be available via a type 2 LBT, for example, due to the PHY layer 304 failing a type 1 LBT. Thus, the PHY layer 304 may include LBT type change indication in the report for the reevaluated resource. In some other instances, the PHY layer 304 may determine that there is no candidate resource available under the second LBT type indication.

Upon receiving the updated resource report, the MAC layer 302 may re-select another resource from the candidate resources indicated in the updated candidate resource report, for example, using similar mechanisms as discussed at action 324 of the method 300, and may repeat the action 320 and 322 at a later time for another last-minute resource reevaluation for newly selected resource. Otherwise, the PHY layer 304 may transmit the MAC PDU to another sidelink UE (e.g., the UEs 115 and/or 215) using the selected first resource at action 1220.

In some aspects, a UE 215 may utilize any suitable combinations of the LBT aware resource selection window determination mechanisms discussed above in relation to FIGS. 4, 5, 6, and 7, the LBT aware candidate resource screening/filtering mechanisms discussed above in relation to FIGS. 8A-8B, the HARQ resource screening mechanisms discussed above in relation to FIGS. 9-10, the LBT gap aware candidate resource screening/filtering mechanisms discussed above in relation to FIGS. 11A-11B, and/or the LBT type aware candidate resource screening/filtering mechanisms discussed above in relation to FIGS. 12A-12B.

Figure 13:
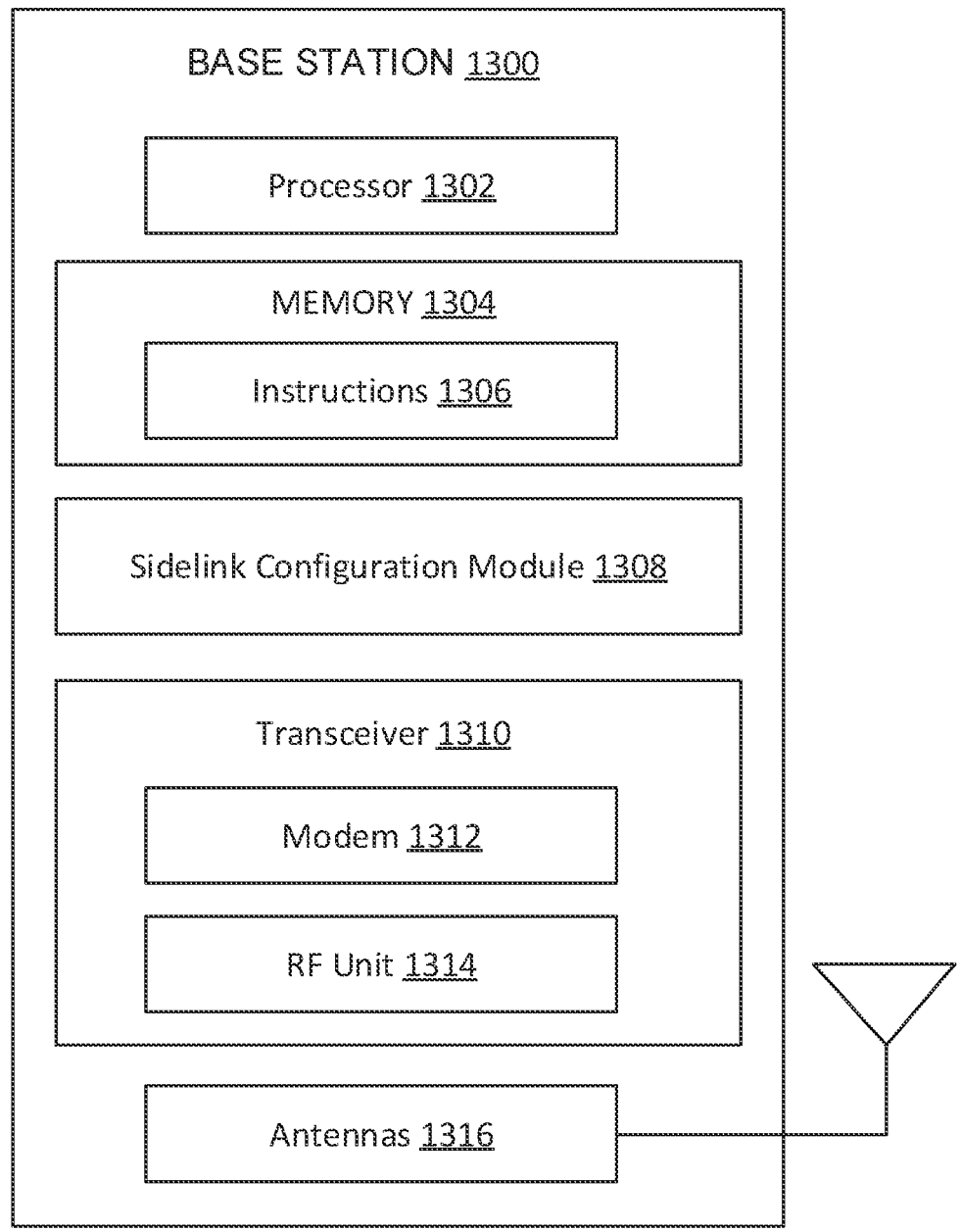
FIG. 13 is a block diagram of an exemplary base station (BS) according to some aspects of the present disclosure.

FIG. 13 is a block diagram of an exemplary BS 1300 according to some aspects of the present disclosure. The BS 1300 may be a BS 105 in the network 100 as discussed above in FIG. 1. A shown, the BS 1300 may include a processor 1302, a memory 1304, a sidelink configuration module 1308, a transceiver 1310 including a modem subsystem 1312 and a RF unit 1314, and one or more antennas 1316. These elements may be in direct or indirect communication with each other, for example via one or more buses.

The processor 1302 may have various features as a specific-type processor. For example, these may include a CPU, a DSP, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1304 may include a non-transitory computer-readable medium. The memory 1304 may store instructions 1306. The instructions 1306 may include instructions that, when executed by the processor 1302, cause the processor 1302 to perform operations described herein, for example, aspects of FIGS. 1-2. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink configuration module 1308 may be implemented via hardware, software, or combinations thereof. For example, the sidelink configuration module 1308 may be implemented as a processor, circuit, and/or instructions 1306 stored in the memory 1304 and executed by the processor 1302. In some examples, the sidelink configuration module 1308 can be integrated within the modem subsystem 1312. For example, the sidelink configuration module 1308 can be implemented by a combination of software components (e.g., executed by a DSP or a general processor) and hardware components (e.g., logic gates and circuitry) within the modem subsystem 1312.

The sidelink configuration module 1308 may communicate with one or more components of the BS 1300 to perform for various aspects of the present disclosure, for example, aspects of FIGS. 1-2. The sidelink configuration module 1308 is configured to configure a UE (e.g., the UEs 115, 215) with a sidelink configuration (e.g., a sidelink resource pool 408) for sidelink communications and/or a configuration for LBT aware autonomous sidelink sensing while the UE is in a coverage of the BS 1300.

As shown, the transceiver 1310 may include the modem subsystem 1312 and the RF unit 1314. The transceiver 1310 can be configured to communicate bi-directionally with other devices, such as the UEs 115 and/or another core network element. The modem subsystem 1312 may be configured to modulate and/or encode data according to a MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., RRC configuration, sidelink resource pool configurations, LBT aware autonomous sensing configuration) from the modem subsystem 1312 (on outbound transmissions) or of transmissions originating from another source such as a UE 115. The RF unit 1314 may be further configured to perform analog beamforming in conjunction with the digital beamforming. Although shown as integrated together in transceiver 1310, the modem subsystem 1312 and/or the RF unit 1314 may be separate devices that are coupled together at the BS 105 to enable the BS 105 to communicate with other devices.

The RF unit 1314 may provide the modulated and/or processed data, e.g. data packets (or, more generally, data messages that may contain one or more data packets and other information), to the antennas 1316 for transmission to one or more other devices. This may include, for example, transmission of information to complete attachment to a network and communication with a camped UE 115 according to some aspects of the present disclosure. The antennas 1316 may further receive data messages transmitted from other devices and provide the received data messages for processing and/or demodulation at the transceiver 1310. The transceiver 1310 may provide the demodulated and decoded data to the sidelink configuration module 1308 for processing. The antennas 1316 may include multiple antennas of similar or different designs in order to sustain multiple transmission links.

In an aspect, the BS 1300 can include multiple transceivers 1310 implementing different RATs (e.g., NR and LTE). In an aspect, the BS 1300 can include a single transceiver 1310 implementing multiple RATs (e.g., NR and LTE). In an aspect, the transceiver 1310 can include various components, where different combinations of components can implement different RATs.

Figure 14:
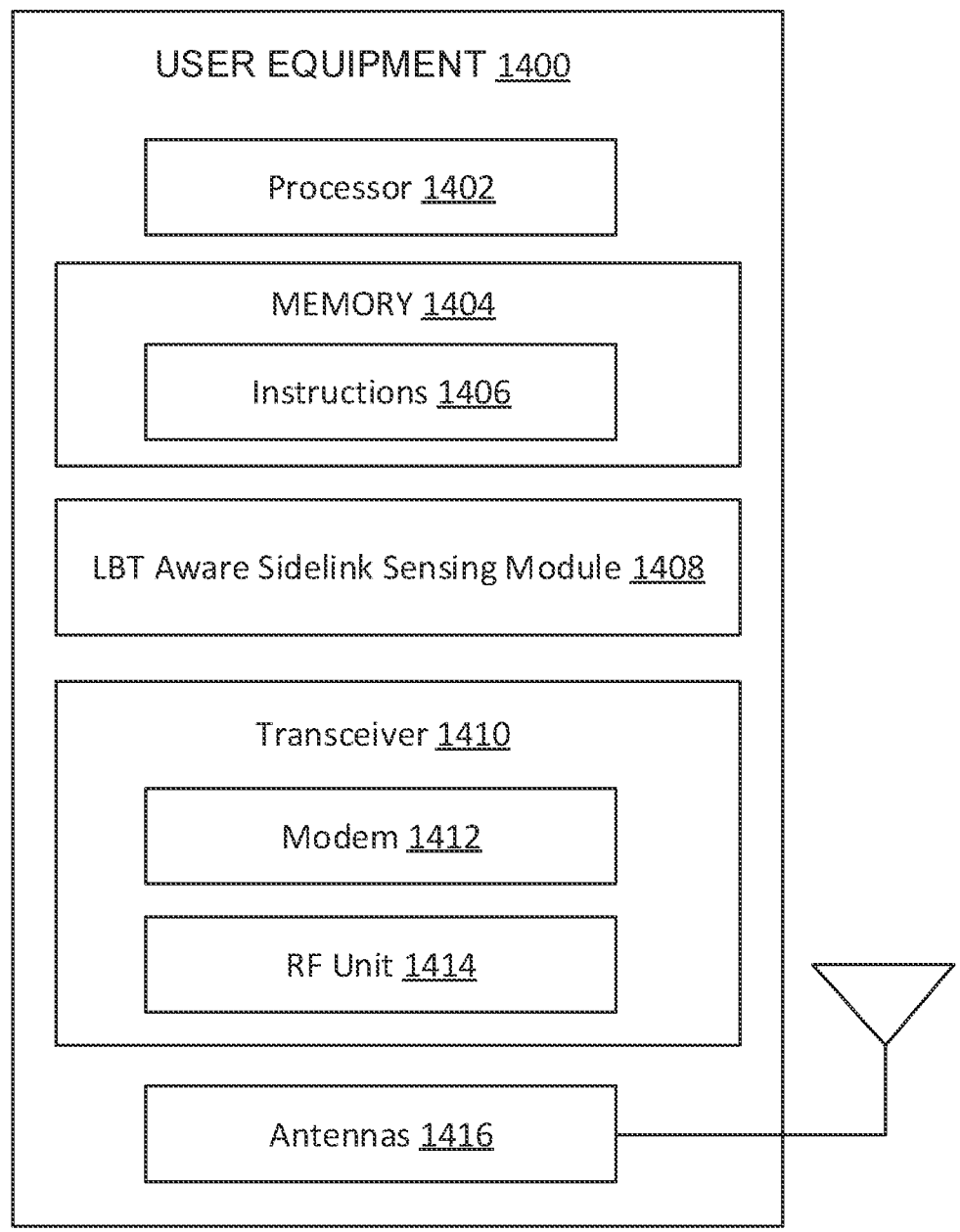
FIG. 14 is a block diagram of an exemplary user equipment (UE) according to some aspects of the present disclosure.

FIG. 14 is a block diagram of an exemplary UE 1400 according to some aspects of the present disclosure. The UE 1400 may be a UE 115 as discussed above with respect to FIG. 1 or a UE 215 as discussed above with respect to FIGS. 2, 3A-3B, 4-7, 8A-8B, 9-10, 11A-11B, and 12A-12B. As shown, the UE 1400 may include a processor 1402, a memory 1404, an LBT aware autonomous sidelink sensing module 1408, a transceiver 1410 including a modem subsystem 1412 and a radio frequency (RF) unit 1414, and one or more antennas 1416. These elements may be in direct or indirect communication with each other, for example via one or more buses.

The processor 1402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1404 includes a non-transitory computer-readable medium. The memory 1404 may store, or have recorded thereon, instructions 1406. The instructions 1406 may include instructions that, when executed by the processor 1402, cause the processor 1402 to perform the operations described herein with reference to the UEs 115 and/or 215 in connection with aspects of the present disclosure, for example, aspects of FIGS. 2, 3A-3B, 4-7, 8A-8B, 9-10, 11A-11B, and 12A-12B. Instructions 1406 may also be referred to as program code, which may be interpreted broadly to include any type of computer-readable statement(s) as discussed above with respect to FIG. 13.

The LBT aware autonomous sidelink sensing module 1408 may be implemented via hardware, software, or combinations thereof. For example, the LBT aware autonomous sidelink sensing module 1408 may be implemented as a processor, circuit, and/or instructions 1406 stored in the memory 1404 and executed by the processor 1402. In some examples, the LBT aware autonomous sidelink sensing module 1408 can be integrated within the modem subsystem 1412. For example, the LBT aware autonomous sidelink sensing module 1408 can be implemented by a combination of software components (e.g., executed by a DSP or a general processor) and hardware components (e.g., logic gates and circuitry) within the modem subsystem 1412.

The LBT aware autonomous sidelink sensing module 1408 may communicate with one or more components of the UE 1400 to perform for various aspects of the present disclosure, for example, aspects of FIGS. 2, 3A-3B, 4-7, 8A-8B, 9-10, 11A-11B, and 12A-12B. In some aspects, the LBT aware autonomous sidelink sensing module 1408 is configured to determine, based on a projected LBT completion time (e.g., the LBT completion time 430), at least one of a sensing window (e.g., the sensing window 402) or a first resource selection window (e.g., the resource selection window 404), for example, as discussed above in relation to FIGS. 4-7.

The LBT aware autonomous sidelink sensing module 1408 is further configured to sense, based on the determining, in a sidelink resource pool within a shared radio frequency band during the sensing window. The sensing or monitoring may include decoding SCI and/or measuring signal energy in the channel. The LBT aware autonomous sidelink sensing module 1408 may be configured to blindly decode SCI from a PSCCH of each resource, record the decoded SCI upon a successful decoding, determine a signal measurement (e.g., RSRP and/or a RSSI) for each resource, and record the signal measurements.

The LBT aware autonomous sidelink sensing module 1408 is further configured to identifies, based on the sensing, a subset of resources from the sidelink resource pool that are within the first resource selection window. For instance, the LBT aware autonomous sidelink sensing module 1408 may be configured to identify the subset of resources within the resource selection window by examining or analyzing sensing results obtained within the sensing window and use a combination of SCI decoding, signal measurements, and/or priority information to filter resources in the resource selection window.

The LBT aware autonomous sidelink sensing module 1408 is further configured to select at least a first resource from the subset of resources. In some aspects, the LBT aware autonomous sidelink sensing module 1408 may be configured to draw a random number (e.g., k) between 1 and N, where N may correspond to the number of resources in the subset of resources, and select the $k^{th}$ resource from the subset. The LBT aware autonomous sidelink sensing module 1408 is further configured to transmits, to a second UE using the selected first resource, a sidelink transmission.

In some aspects, the LBT aware autonomous sidelink sensing module 1408 is further configured to filter resources in the resource selection window based on the projected LBT completion time as discussed above in relation to FIGS. 8A-8B. In some aspects, the LBT aware autonomous sidelink sensing module 1408 is further configured to screen resources when selecting resources for HARQ retransmission as discussed above in relation to FIGS. 9-10. In some aspects, the LBT aware autonomous sidelink sensing module 1408 is further configured to filter resources in the resource selection window based on LBT gaps in the resources as discussed above in relation to FIGS. 11A-11B. In some aspects, the LBT aware autonomous sidelink sensing module 1408 is further configured to filter resources in the resource selection window based on LBT types (e.g., a type 1 LBT and/or a type 2 LBT) associated with the resources as discussed above in relation to FIGS. 12A-12B.

As shown, the transceiver 1410 may include the modem subsystem 1412 and the RF unit 1414. The transceiver 1410 can be configured to communicate bi-directionally with other devices, such as the BSs 105. The modem subsystem 1412 may be configured to modulate and/or encode the data from the memory 1404 and/or the LBT aware autonomous sidelink sensing module 1408 according to a modulation and coding scheme (MCS), e.g., a low-density parity check (LDPC) coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., PSCCH SCI, PSSCH data, COT-SI) from the modem subsystem 1412 (on outbound transmissions) or of transmissions originating from another source such as a UE 115 or a BS 105. The RF unit 1414 may be further configured to perform analog beamforming in conjunction with the digital beamforming. Although shown as integrated together in transceiver 1410, the modem subsystem 1412 and the RF unit 1414 may be separate devices that are coupled together at the UE 115 to enable the UE 115 to communicate with other devices.

The RF unit 1414 may provide the modulated and/or processed data, e.g. data packets (or, more generally, data messages that may include one or more data packets and other information), to the antennas 1416 for transmission to one or more other devices. The antennas 1416 may further receive data messages transmitted from other devices. The antennas 1416 may provide the received data messages for processing and/or demodulation at the transceiver 1410. The transceiver 1410 may provide the demodulated and decoded data (e.g., RRC configuration, sidelink resource pools configurations, PSCCH SCI, PSSCH data, COT-SI) to the LBT aware autonomous sidelink sensing module 1408 for processing. The antennas 1416 may include multiple antennas of similar or different designs in order to sustain multiple transmission links. The RF unit 1414 may configure the antennas 1416.

In some aspects, the processor 1402 is configured to communicate with one or more components of the UE 1400 to determine at least one of a sensing window or a first resource selection window based on a projected LBT completion time, sense in a sidelink resource pool within a shared radio frequency band during the sensing window based on the determining, identify a subset of resources from the sidelink resource pool that are within the first resource selection window based on the sensing, and select at least a first resource from the subset of resources. The transceiver 1410 is configured to communicate with one or more components of the UE 1400 to transmit, to a second UE (e.g., the UEs 115 and/or 215) using the selected first resource, the sidelink transmission.

In an aspect, the UE 1400 can include multiple transceivers 1410 implementing different RATs (e.g., NR and LTE). In an aspect, the UE 1400 can include a single transceiver 1410 implementing multiple RATs (e.g., NR and LTE). In an aspect, the transceiver 1410 can include various components, where different combinations of components can implement different RATs.

Figure 15:
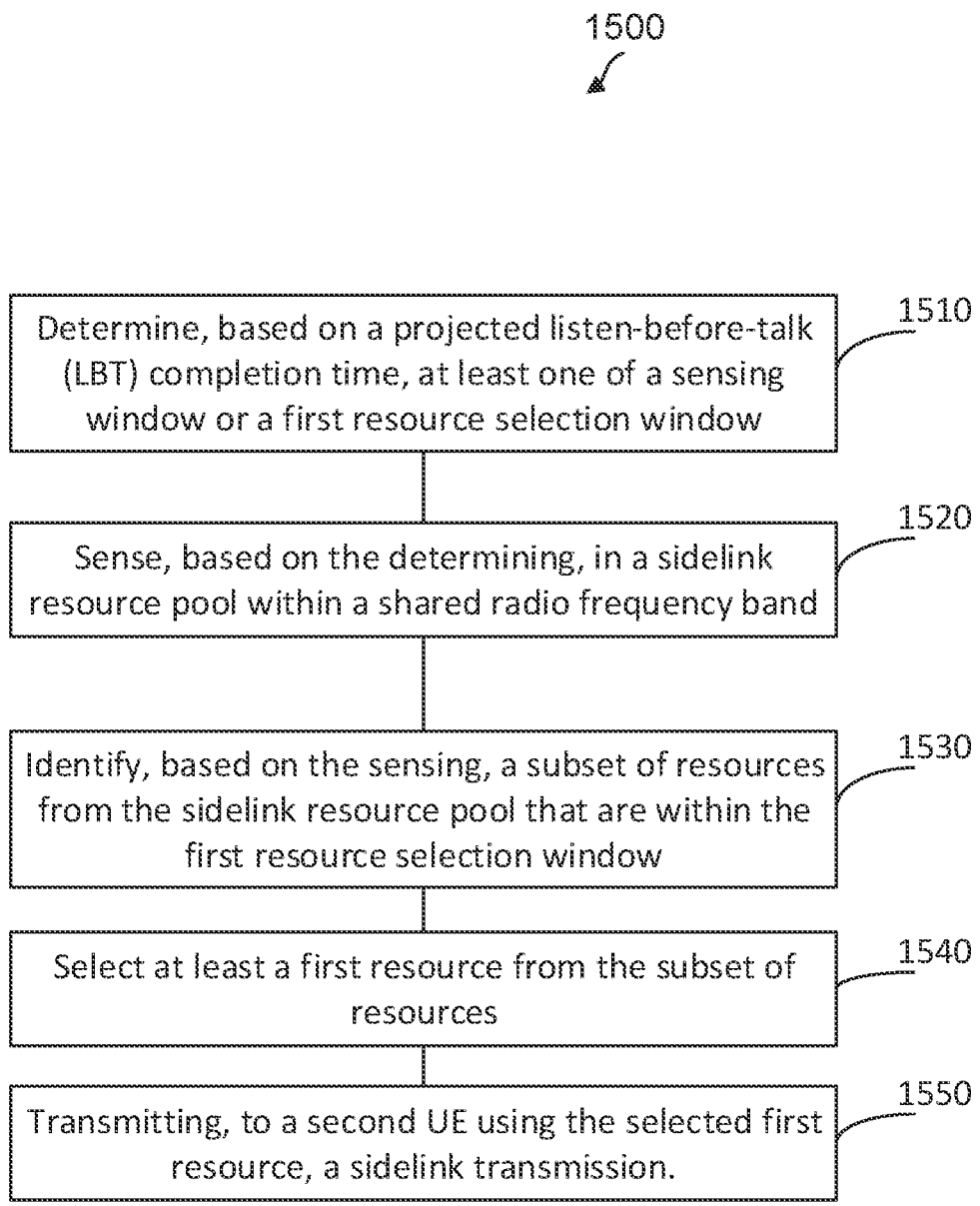
FIG. 15 is a flow diagram of a wireless communication method according to some aspects of the present disclosure.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as a UE 115, 215, 1400 may utilize one or more components, such as the processor 1402, the memory 1404, the LBT aware autonomous sidelink sensing module 1408, the transceiver 1410, the modem 1412, and the one or more antennas

1416, to execute the steps of method 1500. The method 1500 may employ similar mechanisms as described above in FIGS. 2, 3A-3B, 4-7, 8A-8B, 9-10, 11A-11B, and 12A-12B. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, a UE determines, based on a projected LBT completion time (e.g., the LBT completion time 430), at least one of a sensing window (e.g., the sensing window 402) or a first resource selection window (e.g., the resource selection window 404). In some aspects, the UE may determine, based on the projected LBT completion time, at least one of a T1 duration relative to a resource selection trigger (e.g., the resource selection trigger 420) or a T2 duration relative to the resource selection trigger. The T1 duration and the T2 duration correspond to the T2 duration and the T2 duration shown in FIG. 4, respectively. The first resource selection window may start at an end of the T1 duration and end at an end of the T2 duration. The UE may determine the T1 duration such that the first resource selection window starts after the projected LBT completion time, and may determine the T2 duration such that that a difference between the T1 duration and the T2 duration is greater than a projected LBT duration, for example, as discussed above in relation to FIGS. 4-7. In some aspects, the UE may utilize one or more components, such as the processor 1402, the memory 1404, the LBT aware autonomous sidelink sensing module 1408, the transceiver 1410, the modem 1412, and the one or more antennas 1416, to perform the operations at block 1510.

In some aspects, the UE may determine the projected LBT completion time based on at least one of a CAPC associated with a sidelink transmission, an interframe spacing, a contention window size associated with the CAPC, an LBT counter value associated with the CAPC, an LBT energy detection threshold, or a transmission power for transmitting the sidelink transmission, for example, as discussed above at action 514 of the method 500, at action 614 of the method 600, and/or at action 712 of the method 700. In some aspects, the UE may perform, in the shared radio frequency band, one or more LBTs, each LBT of the one or more LBT associated with a CAPC. The LBT counter value may be associated with a first LBT of the one or more LBTs, the first LBT being associated with the CAPC of the sidelink transmission.

In some aspects, the UE may generate, in a slot n, a MAC PDU and generate the resource selection trigger based on a later time between the slot n and a T3 duration before a slot m corresponding to the projected LBT completion time. The UE may determine the sensing window based on a $T_{proc,0}$ duration before the resource selection trigger.

At block 1520, the UE senses, based on the determining, in a sidelink resource pool within a shared radio frequency band. In some aspects, the UE may continuously sense or monitor resources in the sidelink resource pool (e.g., performed by a PHY layer at the UE). The sensing or monitoring may include decoding SCI and/or measuring signal energy in the channel. For SCI decoding, the UE may blindly decode SCI from a PSCCH of each resource. If the decoding is successful, the UE may record the decoded SCI. For signal measurements, the UE may receive a signal from each resource and compute a RSRP and/or a RSSI for each resource. The UE may also record the signal measurements. In some aspects, the UE may utilize one or more components, such as the processor 1402, the memory 1404, the LBT aware autonomous sidelink sensing module 1408, the transceiver 1410, the modem 1412, and the one or more antennas 1416, to perform the operations at block 1520.

At block 1530, the UE identifies, based on the sensing, a subset of resources from the sidelink resource pool that are within the first resource selection window. In some aspects, the UE may identify the subset of resources within the resource selection window by examining or analyzing sensing results (e.g. decoded SCI and/or signal measurements) obtained within the sensing window. The UE may filter the resources in the resource selection window based on the decoded SCI, signal measurements, and/or a traffic priority associated with a sidelink transmission. In some aspects, the UE may utilize one or more components, such as the processor 1402, the memory 1404, the LBT aware autonomous sidelink sensing module 1408, the transceiver 1410, the modem 1412, and the one or more antennas 1416, to perform the operations at block 1530.

At block 1540, the UE selects at least a first resource from the subset of resources. In some aspects, the UE may draw a random number (e.g., k) between 1 and N, where N may correspond to the number of resources in the subset of resources. The UE may select the $k^{th}$ resource from the subset. In some aspects, the UE may utilize one or more components, such as the processor 1402, the memory 1404, the LBT aware autonomous sidelink sensing module 1408, the transceiver 1410, the modem 1412, and the one or more antennas 1416, to perform the operations at block 1540.

At block 1550, the UE transmits, to a second UE using the selected first resource, the sidelink transmission. In some aspects, the UE may utilize one or more components, such as the processor 1402, the memory 1404, the LBT aware autonomous sidelink sensing module 1408, the transceiver 1410, the modem 1412, and the one or more antennas 1416, to perform the operations at block 1550.

In some aspects, a MAC layer (e.g., the MAC layer 302) and a PHY layer (e.g., the PHY layer 304) at the UE may together determine the at least one of the sensing window or the resource selection window at a MAC layer (e.g., the MAC layer 302) as discussed above in relation to FIGS. 5-7. In some aspects, the at least one of the T1 duration or the T2 duration may be determined by the MAC layer based on the projected LBT completion time. The MAC layer may further transmit an indication of the at least one of the T1 duration or the T2 duration. In some aspects, the MAC layer may further transmits an indication of a CAPC associated with the sidelink transmission. The MAC layer may also receive at least one of contention window information or an LBT counter information associated with the CAPC. The MAC layer may also determine the projected LBT completion time based on the at least one of the contention window information or the LBT counter information.

In some aspects, the at least one of the T1 duration or the T2 duration may be determined by the PHY layer based on the projected LBT completion time. In some aspects, the PHY layer may receive an indication of a CAPC associated with the sidelink transmission. The PHY layer may also determine, based on the CAPC, the projected LBT completion time. In some aspects, the PHY layer may also determine one or more resource selection windows, each resource selection window associated with a CAPC. As part of determining the at least one of the sensing window or the first resource selection window, the PHY layer may select, based on the CAPC, the first resource selection window from the one or more resource selection windows.

In some aspects, the PHY layer may receive an indication of at least one of a T1 duration or a T2 duration, the at least one of the T1 duration or the T2 duration being based on the projected LBT completion time. As part of determining the at least one of the sensing window or the first resource selection window, the PHY layer may determine, a start of the first resource selection window based on the T1 duration. The PHY layer may also determine an end of the first resource selection window based on the T2 duration.

In some aspects, the UE may further filter filtering, based on the projected LBT completion time, the subset of resources, for example, as discussed above in relation to FIGS. 8A-8B. As part of filtering the subset of resources, the MAC layer at the UE may exclude any resource in the subset of resources at an earlier time than the projected LBT completion time.

In some aspects, the UE may further retransmit, using a second resource of the subset of resources, the sidelink transmission. In some aspects, as part of selecting the at least the first resource at block 1540, the UE may select an earliest available resource from the subset of resources as the first resource, and select a next available resource from the subset of resources as the second resource. In some aspects, as part of selecting the at least the first resource at block 1540, the UE may select, randomly, the first resource and the second resource from the subset of resources. In some aspects, as part of retransmitting the sidelink transmission using the second resource is based on a time gap between the first resource and the second resource satisfying a projected LBT duration. In some aspects, as part of selecting the at least the first resource at block 1540, the UE may select randomly, a first pair of resources from the subset of resources, and select, randomly in response to a determination that a time gap between the first pair of resources fails to satisfy the projected LBT duration, a second pair of resources from the subset of resources, for example, s discussed above in relation to FIG. 9. The second pair of resources may includes the first resource and the second resource. In some aspects, as part of selecting the at least the first resource at block 1540, the UE may select, randomly, a first pair of resources from the subset of resources, select, randomly in response to a determination that a first time gap between the first pair of resources fails to satisfy the projected LBT duration, a second pair of resources from the subset of resources, and determining whether a second time gap between the second pair of resources is longer than the first time gap, for example, as discussed above in relation to FIG. 9. For instance, the first resource and the second resource correspond to the first pair of resources when the first time gap longer than the first time gap. Alternatively, the first resource and the second resource correspond to the second pair of resources when the second time gap longer than the first time gap.

In some aspects, the UE may further filter resources based on LBT gaps, for example, as discussed above in relation to FIG. 11A-11B. For instance, the UE may identify, based on the sensing, candidate resources within the first resource selection window, and identify the subset of resources from the candidate resources by excluding any resource in the candidate resource that is at least partially overlapping with an LBT gap. In some aspects, the PHY layer at the UE may receive, a request to provide resources without any LBT gap. In some aspects, the UE may identify, based on the sensing, candidate resources within the first resource selection window, and identify the subset of resources from the candidate resources by excluding any resource in the candidate resources that overlaps with an LBT gap by more than Z symbols. In some aspects, the PHY layer may receiving a request to provide resources that do not overlap with an LBT gap by more than Z symbols. In some aspects, the PHY layer may transmit an indication of the subset of resources and an indication of a number of symbols overlapping with an LBT gap for each resource of the subset of resources.

In some aspects, the MAC layer may receive an indication of the subset of resources and an indication of a number of symbols overlapping with an LBT gap for each resource of the subset of resources. In some aspects, as part of selecting the at least the first resource at block 1540, the MAC layer may select, randomly, the first resource from one or more resources in the subset of resources that are non-overlapping with any LBT gap. In some aspects, as part of selecting the at least the first resource at block 1540, the MAC layer may select the first resource from the subset of resources based on a number of symbols in the first resource that overlaps with an LBT gap.

In some aspects, as part of identifying the subset of resources at block 1530, the UE may identify the subset of resources further based on LBT types associated with the subset of resources. In some aspects, as part of the sensing at block 1520, the UE may monitor for channel occupancy time (COT) sharing opportunities, where one or more of the subset of resources are based on the monitoring. In some aspects, the PHY layer may receive a first LBT type indication. As part of identifying the subset of resources at block 1530, the PHY layer may identify the subset of resources further based on the first LBT type indication. In some aspects, the first LBT type indication may indicate at least one of a type 2 LBT, channel access priority class (CAPC) associated with the sidelink transmission, or a transmission power for the sidelink transmission. In some aspects, the PHY layer may receive a resource reevaluation request for the first resource, the resource reevaluation request including a second LBT type indication different from the first LBT type indication. In some aspects, the PHY layer may transmit an indication indicating that there is no resource available based on the second LBT type indication.

In some aspects, the MAC layer may transmit an LBT type indication including at least one of a first LBT type or a second LBT type. In some aspects, the first LBT type indication may indicate at least one of a type 2 LBT, channel access priority class (CAPC) associated with the sidelink transmission, or a transmission power for the sidelink transmission. In some aspects, the MAC layer transmit a resource reevaluation request for the first resource, the resource reevaluation request including a second LBT type indication different from the first LBT type indication. In some aspects, the MAC layer may receive an indication indicating that there is no resource available based on the second LBT type indication.

Further aspects of the present disclosure include the following:

1. A method of wireless communication performed by a first user equipment (UE), the method comprising:
    determining, based on a projected listen-before-talk (LBT) completion time, at least one of a sensing window or a first resource selection window;
    sensing, based on the determining, in a sidelink resource pool within a shared radio frequency band;
    identifying, based on the sensing, a subset of resources from the sidelink resource pool that are within the first resource selection window;
    selecting at least a first resource from the subset of resources; and transmitting, to a second UE using the selected first resource, a sidelink transmission.

2. The method of clause 1, wherein the determining the at least one of the sensing window or the first resource selection window comprises:
determining, based on the projected LBT completion time, at least one of a T1 duration relative to a resource selection trigger or a T2 duration relative to the resource selection trigger,
wherein the first resource selection window starts at an end of the T1 duration and ends at an end of the T2 duration.

3. The method of clause 2, wherein the determining the at least one of the T1 duration or the T2 duration comprises:
determining the T1 duration such that the first resource selection window starts after the projected LBT completion time; and
determining the T2 duration such that that a difference between the T1 duration and the T2 duration is greater than a projected LBT duration.

4. The method of any of clauses 2 or 3, further comprising:
determining the projected LBT completion time based on at least one of a channel access priority class (CAPC) associated with the sidelink transmission, an interframe spacing, a contention window size associated with the CAPC, an LBT counter value associated with the CAPC, an LBT energy detection threshold, or a transmission power for transmitting the sidelink transmission.

5. The method of clause 4, further comprising:
performing, in the shared radio frequency band, one or more LBTs, each LBT of the one or more LBTs associated with a CAPC,
wherein the LBT counter value is associated with a first LBT of the one or more LBTs, the first LBT being associated with the CAPC of the sidelink transmission.

6. The method of clause 2, wherein the determining the at least one of the T1 duration or the T2 duration comprises:
determining, by a media access control (MAC) layer based on the projected LBT completion time, the at least one of the T1 duration or the T2 duration.

7. The method of clause 6, further comprising:
transmitting, by the MAC layer, an indication of the at least one of the T1 duration or the T2 duration.

8. The method of any of clauses 1-3, further comprising:
transmitting, by a media access control (MAC) layer, an indication of a channel access priority class (CAPC) associated with the sidelink transmission;
receiving, by the MAC layer, at least one of contention window information or an LBT counter information associated with the CAPC; and
determining, by the MAC layer, the projected LBT completion time based on the at least one of the contention window information or the LBT counter information.

9. The method of clause 8, wherein the determining the projected LBT completion time comprises:
determining, by the MAC layer based on the contention window information, a w parameter; and
determining, by the MAC layer, the projected LBT completion time based on an arbitration interframe spacing (AIFS)+w×9 microseconds.

10. The method of clause 2, wherein the determining the at least one of the T1 duration or the T2 duration comprises:
determining, by a physical (PHY) layer based on the projected LBT completion time, the at least one of the T1 duration or the T2 duration.

11. The method of clause 10, further comprising:
receiving, by PHY layer, an indication of a channel access priority class (CAPC) associated with the sidelink transmission; and
determining, by the PHY layer based on the CAPC, the projected LBT completion time.

12. The method of clause 11, further comprising:
determining, by the PHY layer, one or more resource selection windows, each resource selection window associated with a CAPC,
wherein the determining the at least one of the sensing window or the first resource selection window comprises:
selecting, by the PHY layer based on the CAPC, the first resource selection window from the one or more resource selection windows.

13. The method of clause 1, further comprising:
generating, in a slot n, a medium access control (MAC) packet data unit (PDU); and
generating a resource selection trigger based on a later time between the slot n and a T3 duration before a slot m corresponding to the projected LBT completion time.

14. The method of clause 13, wherein the determining the at least one of the sensing window or the first resource selection window comprises:
determining the sensing window based on a $T_{proc,0}$ duration before the resource selection trigger.

15. The method of clause 1, further comprising:
receiving, by a physical (PHY) layer, an indication of at least one of a T1 duration or a T2 duration, the at least one of the T1 duration or the T2 duration being based on the projected LBT completion time,
wherein the determining the at least one of the sensing window or the first resource selection window comprises:
determining, by the PHY layer, a start of the first resource selection window based on the T1 duration; and
determining, by the PHY layer, an end of the first resource selection window based on the T2 duration.

16. The method of clause 1, further comprising:
filtering, based on the projected LBT completion time, the subset of resources.

17. The method of clause 16, wherein the filtering the subset of resources comprises:
excluding, by a medium access control (MAC) layer, any resource in the subset of resources at an earlier time than the projected LBT completion time.

18. The method of clause 1, further comprising:
retransmitting, using a second resource of the subset of resources, the sidelink transmission.

19. The method of clause 18, wherein the selecting the at least the first resource comprises:
selecting an earliest available resource from the subset of resources as the first resource; and
selecting a next available resource from the subset of resources as the second resource.

20. The method of clause 18, wherein the selecting the at least the first resource comprises:

selecting, randomly, the first resource and the second resource from the subset of resources.
21. The method of clause 20, wherein the retransmitting the sidelink transmission using the second resource is based on a time gap between the first resource and the second resource satisfying a projected LBT duration.
22. The method of clause 21, wherein the selecting the at least the first resource comprises:
selecting, randomly, a first pair of resources from the subset of resources; and
selecting, randomly in response to a determination that a time gap between the first pair of resources fails to satisfy the projected LBT duration, a second pair of resources from the subset of resources, wherein the second pair of resources includes the first resource and the second resource.
23. The method of clause 20, wherein the selecting the at least the first resource comprises:
selecting, randomly, a first pair of resources from the subset of resources; and
selecting, randomly in response to a determination that a first time gap between the first pair of resources fails to satisfy the projected LBT duration, a second pair of resources from the subset of resources; and
determining whether a second time gap between the second pair of resources is longer than the first time gap,
wherein the first resource and the second resource correspond to the first pair of resources when the first time gap longer than the first time gap, or
wherein the first resource and the second resource correspond to the second pair of resources when the second time gap longer than the first time gap.
24. The method of any of clauses 1-9, 13, 14, or 16-23, further comprising:
identifying, based on the sensing, candidate resources within the first resource selection window; and
identifying the subset of resources from the candidate resources by excluding any resource in the candidate resource that is at least partially overlapping with an LBT gap.
25. The method of clause 24, further comprising:
receiving, by a physical (PHY) layer, a request to provide resources without any LBT gap.
26. The method of any of clauses 1-9, 13, 14, or 16-23, further comprising:
identifying, based on the sensing, candidate resources within the first resource selection window; and
identifying the subset of resources from the candidate resources by excluding any resource in the candidate resources that overlaps with an LBT gap by more than Z symbols.
27. The method of clause 26, further comprising:
receiving, by a physical (PHY) layer, a request to provide resources that do not overlap with an LBT gap by more than Z symbols.
28. The method of clause 26, further comprising:
transmitting, by the PHY layer, an indication of the subset of resources and an indication of a number of symbols overlapping with an LBT gap for each resource of the subset of resources.
29. The method of any of clauses 1-5, 10-12, 15, 16, or 18-28, further comprising:
receiving, by a medium access control (MAC) layer, an indication of the subset of resources and an indication of a number of symbols overlapping with an LBT gap for each resource of the subset of resources.

30. The method of clause 29, wherein the selecting the at least the first resource comprises:
selecting, randomly at the MAC layer, the first resource from one or more resources in the subset of resources that are non-overlapping with any LBT gap.
31. The method of clause 29, wherein the selecting the at least the first resource comprises:
selecting, at the MAC layer, the first resource from the subset of resources based on a number of symbols in the first resource that overlaps with an LBT gap.
32. The method of any of clauses 1-31, wherein the identifying the subset of resources is further based on LBT types associated with the subset of resources.
33. The method of clause 32, wherein the sensing further comprises:
monitoring for channel occupancy time (COT) sharing opportunities, wherein one or more of the subset of resources are based on the monitoring.
34. The method of clause 32, further comprising:
receiving, by a physical (PHY) layer, a first LBT type indication,
wherein the identifying the subset of resources is further based on the first LBT type indication.
35. The method of clause 34, wherein the receiving the first LBT type indication comprises:
receiving, by the PHY layer, the first LBT type indication indicating at least one of a type 2 LBT, channel access priority class (CAPC) associated with the sidelink transmission, or a transmission power for the sidelink transmission.
36. The method of clause 34, further comprising:
receiving, by the PHY layer, a resource reevaluation request for the first resource, the resource reevaluation request including a second LBT type indication different from the first LBT type indication.
37. The method of clause 36, further comprising:
transmitting, by the PHY layer, an indication indicating that there is no resource available based on the second LBT type indication.
38. The method of any of clauses 1-5, 10-12, 15, 16, or 18-28, or 32-33, further comprising:
transmitting, by a medium access control (MAC) layer, an LBT type indication including at least one of a first LBT type indication or a second LBT type indication.
39. The method of clause 38, wherein the transmitting the first LBT type indication comprises:
transmitting, by the MAC layer, the first LBT type indication indicating at least one of a type 2 LBT, channel access priority class (CAPC) associated with the sidelink transmission, or a transmission power for the sidelink transmission.
40. The method of clause 38, further comprising:
transmitting, by the MAC layer, a resource reevaluation request for the first resource, the resource reevaluation request including a second LBT type indication different from the first LBT type indication.
41. The method of clause 40, further comprising:
receiving, by the MAC layer, an indication indicating that there is no resource available based on the second LBT type indication.
42. A first user equipment (UE) comprising:
a processor configured to:
determine, based on a projected listen-before-talk (LBT) completion time, at least one of a sensing window or a first resource selection window;

sense, based on the determining, in a sidelink resource pool within a shared radio frequency band;
identify, based on the sensing, a subset of resources from the sidelink resource pool that are within the first resource selection window; and
select at least a first resource from the subset of resources; and
a transceiver configured to:
transmit, to a second UE using the selected first resource, a sidelink transmission.

43. The first UE of clause 42, wherein:
the processor configured to determine the at least one of the sensing window or the first resource selection window is further configured to:
determine, based on the projected LBT completion time, at least one of a T1 duration relative to a resource selection trigger or a T2 duration relative to the resource selection trigger, and
the first resource selection window starts at an end of the T1 duration and ends at an end of the T2 duration.

44. The first UE of clause 43, wherein the processor configured to determine the at least one of the sensing window or the first resource selection window is further configured to:
determine the T1 duration such that the first resource selection window starts after the projected LBT completion time; and
determine the T2 duration such that that a difference between the T1 duration and the T2 duration is greater than a projected LBT duration.

45. The first UE of any of clauses 43 or 44, wherein the processor is configured to:
determine the projected LBT completion time based on at least one of a channel access priority class (CAPC) associated with the sidelink transmission, an interframe spacing, a contention window size associated with the CAPC, an LBT counter value associated with the CAPC, an LBT energy detection threshold, or a transmission power for transmitting the sidelink transmission.

46. The first UE of clause 45, wherein:
the processor is configured to:
perform, in the shared radio frequency band, one or more LBTs, each LBT of the one or more LBT associated with a CAPC, and
the LBT counter value is associated with a first LBT of the one or more LBTs, the first LBT being associated with the CAPC of the sidelink transmission.

47. The first UE of clause 43, wherein the processor is further configured to:
determine, at a media access control (MAC) layer based on the projected LBT completion time, the at least one of the T1 duration or the T2 duration.

48. The first UE of clause 47, wherein the processor is configured to:
transmit, at the MAC layer, an indication of the at least one of the T1 duration or the T2 duration.

49. The first UE of any of clauses 1-48, wherein the processor is configured to:
transmit, by a media access control (MAC) layer, an indication of a channel access priority class (CAPC) associated with the sidelink transmission;
receive, at the MAC layer, at least one of contention window information or an LBT counter information associated with the CAPC; and
determine, at the MAC layer, the projected LBT completion time based on the at least one of the contention window information or the LBT counter information.

50. The first UE of clause 49, wherein the processor is further configured to:
determine, at the MAC layer based on the contention window information, a w parameter; and
determine, at the MAC layer, the projected LBT completion time based on an arbitration interframe spacing (AIFS)+w×9 microseconds.

51. The first UE of clause 43, wherein the processor is further configured to:
determine, by a physical (PHY) layer based on the projected LBT completion time, the at least one of the T1 duration or the T2 duration.

52. The first UE of clause 51, wherein the processor is configured to:
receive, by PHY layer, an indication of a channel access priority class (CAPC) associated with the sidelink transmission; and
determine, at the PHY layer based on the CAPC, the projected LBT completion time.

53. The first UE of clause 52, wherein:
the processor is configured to:
determine, at the PHY layer, one or more resource selection windows, each resource selection window associated with a CAPC, and
the processor configured to determine the at least one of the sensing window or the first resource selection window is further configured to:
select, at the PHY layer based on the CAPC, the first resource selection window from the one or more resource selection windows.

54. The first UE of clause 43, wherein the processor is configured to:
generate, in a slot n, a medium access control (MAC) packet data unit (PDU); and
generate the resource selection trigger based on a later time between the slot n and a T3 duration before a slot m corresponding to the projected LBT completion time.

55. The first UE of clause 54, wherein the processor configured to determine the at least one of the sensing window or the first resource selection window is further configured to:
determine the sensing window based on a $T_{proc,0}$ duration before the resource selection trigger.

56. The first UE of clause 42, wherein the processor is configured to:
receive, at a physical (PHY) layer, an indication of at least one of a T1 duration or a T2 duration, the at least one of the T1 duration or the T2 duration being based on the projected LBT completion time;
determine, at the PHY layer, a start of the first resource selection window based on the T1 duration; and
determine, at the PHY layer, an end of the first resource selection window based on the T2 duration.

57. The first UE of clause 42, wherein the processor is configured to:
filter, based on the projected LBT completion time, the subset of resources.

58. The first UE of clause 57, wherein the processor is further configured to:
filter the subset of resources by excluding, at a medium access control (MAC) layer, any resource in the subset of resources at an earlier time than the projected LBT completion time.
59. The first UE of clause 42, wherein the transceiver is further configured to:
retransmit, using a second resource of the subset of resources, the sidelink transmission.
60. The first UE of clause 59, wherein the processor configured to select the at least the first resource is configured to:
select an earliest available resource from the subset of resources as the first resource; and
select a next available resource from the subset of resources as the second resource.
61. The first UE of clause 59, wherein the processor configured to select the at least the first resource is configured to:
select, randomly, the first resource and the second resource from the subset of resources.
62. The first UE of clause 61, wherein the transceiver configured to retransmit the sidelink transmission is further configured to:
retransmit the sidelink transmission using the second resource is based on a time gap between the first resource and the second resource satisfying a projected LBT duration.
63. The first UE of clause 62, wherein the processor configured to select the at least the first resource is configured to:
select, randomly, a first pair of resources from the subset of resources; and
select, randomly in response to a determination that a time gap between the first pair of resources fails to satisfy the projected LBT duration, a second pair of resources from the subset of resources, wherein the second pair of resources includes the first resource and the second resource.
64. The first UE of clause 61, wherein:
the processor configured to select the at least the first resource is configured to:
select, randomly, a first pair of resources from the subset of resources; and
select, randomly in response to a determination that a first time gap between the first pair of resources fails to satisfy the projected LBT duration, a second pair of resources from the subset of resources; and
determine whether a second time gap between the second pair of resources is longer than the first time gap, and
the first resource and the second resource correspond to the first pair of resources when the first time gap longer than the first time gap, or the first resource and the second resource correspond to the second pair of resources when the second time gap longer than the first time gap.
65. The first UE of any of clauses 42-50, 54, 55, or 57-64, wherein the processor is further configured to:
identify, based on the sensing, candidate resources within the first resource selection window; and
identify the subset of resources from the candidate resources by excluding any resource in the candidate resource that is at least partially overlapping with an LBT gap.
66. The first UE of clause 65, wherein the processor is further configured to:
receive, at a physical (PHY) layer, a request to provide resources without any LBT gap.
67. The first UE of any of clauses 42-50, 54, 55, or 57-64, wherein the processor is further configured to:
identify, based on the sensing, candidate resources within the first resource selection window; and
identify the subset of resources from the candidate resources by excluding any resource in the candidate resources that overlaps with an LBT gap by more than Z symbols.
68. The first UE of clause 67, wherein the processor is further configured to:
receive, at a physical (PHY) layer, a request to provide resources that do not overlap with an LBT gap by more than Z symbols.
69. The first UE of clause 67, wherein the processor is further configured to:
transmit, at the PHY layer, an indication of the subset of resources and an indication of a number of symbols overlapping with an LBT gap for each resource of the subset of resources.
70. The first UE of any of clauses 42-46, 51-53, 56, 57, or 59-69, wherein the processor is further configured to:
receive, at a medium access control (MAC) layer, an indication of the subset of resources and an indication of a number of symbols overlapping with an LBT gap for each resource of the subset of resources.
71. The first UE of clause 70, wherein the processor is further configured to:
select, randomly at the MAC layer, the first resource from one or more resources in the subset of resources that are non-overlapping with any LBT gap.
72. The first UE of clause 70, wherein the processor is further configured to:
select, at the MAC layer, the first resource from the subset of resources based on a number of symbols in the first resource that overlaps with an LBT gap.
73. The first UE of any of clauses 42-72, wherein the processor configured to identify the subset of resources is further configured to:
identify the subset of resources further based on LBT types associated with the subset of resources.
74. The first UE of clause 73, wherein:
the processor configured to sense in the sidelink resource pool is further configured to:
monitor for channel occupancy time (COT) sharing opportunities, and one or more of the subset of resources are based on the monitoring.
75. The first UE of clause 73, wherein the processor is further configured to:
receive, by a physical (PHY) layer, a first LBT type indication; and
identify the subset of resources further based on the first LBT type indication.
76. The first UE of clause 75, wherein the processor is further configured to:
receive, at the PHY layer, the first LBT type indication indicating at least one of a type 2 LBT, channel access priority class (CAPC) associated with the sidelink transmission, or a transmission power for the sidelink transmission.
77. The first UE of clause 75, wherein the processor is further configured to:
receive, at the PHY layer, a resource reevaluation request for the first resource, the resource reevaluation request including a second LBT type indication different from the first LBT type indication.
78. The first UE of clause 77, wherein the processor is further configured to:

transmit, at the PHY layer, an indication indicating that there is no resource available based on the second LBT type indication.
79. The first UE of any of clauses 42-46, 51-53, 56, 57, or 59-69, or 73-74, wherein the processor is further configured to:
transmit, at a medium access control (MAC) layer, an LBT type indication including at least one of a first LBT type or a second LBT type.
80. The first UE of clause 79, wherein the processor is further configured to:
transmit, at the MAC layer, the first LBT type indication indicating at least one of a type 2 LBT, channel access priority class (CAPC) associated with the sidelink transmission, or a transmission power for the sidelink transmission.
81. The first UE of clause 79, wherein the processor is further configured to:
transmit, at the MAC layer, a resource reevaluation request for the first resource, the resource reevaluation request including a second LBT type indication different from the first LBT type indication.
82. The first UE of clause 81, wherein the processor is further configured to:
receive, at the MAC layer, an indication indicating that there is no resource available based on the second LBT type indication.
83. A non-transitory computer-readable medium having program code recorded thereon, the program code comprising:
code for causing a first user equipment (UE) to determine, based on a projected listen-before-talk (LBT) completion time, at least one of a sensing window or a first resource selection window;
code for causing the first UE to sense, based on the determining, in a sidelink resource pool within a shared radio frequency band;
code for causing the first UE to identify, based on the sensing, a subset of resources from the sidelink resource pool that are within the first resource selection window;
code for causing the first UE to select at least a first resource from the subset of resources; and
code for causing the first UE to transmit, to a second UE using the selected first resource, a sidelink transmission.
84. The non-transitory computer-readable medium of clause 83, wherein:
the code for causing the first UE to determine the at least one of the sensing window or the first resource selection window is further configured to:
determine, based on the projected LBT completion time, at least one of a T1 duration relative to a resource selection trigger or a T2 duration relative to the resource selection trigger, and
the first resource selection window starts at an end of the T1 duration and ends at an end of the T2 duration.
85. The non-transitory computer-readable medium of clause 84, wherein the code for causing the first UE to determine the at least one of the sensing window or the first resource selection window is further configured to:
determine the T1 duration such that the first resource selection window starts after the projected LBT completion time; and
determine the T2 duration such that that a difference between the T1 duration and the T2 duration is greater than a projected LBT duration.

86. The non-transitory computer-readable medium of any of clauses 84 or 85, further comprising:
code for causing the first UE to determine the projected LBT completion time based on at least one of a channel access priority class (CAPC) associated with the sidelink transmission, an interframe spacing, a contention window size associated with the CAPC, an LBT counter value associated with the CAPC, an LBT energy detection threshold, or a transmission power for transmitting the sidelink transmission.
87. The non-transitory computer-readable medium of clause 86, further comprising:
code for causing the first UE to perform, in the shared radio frequency band, one or more LBTs, each LBT of the one or more LBT associated with a CAPC, wherein the LBT counter value is associated with a first LBT of the one or more LBTs, the first LBT being associated with the CAPC of the sidelink transmission.
88. The non-transitory computer-readable medium of clause 84, wherein the code for causing the first UE to determine the at least one of the sensing window or the first resource selection window is further configured to:
determine, by a media access control (MAC) layer based on the projected LBT completion time, the at least one of the T1 duration or the T2 duration.
89. The non-transitory computer-readable medium of clause 88, further comprising:
code for causing the first UE to transmit, at the MAC layer, an indication of the at least one of the T1 duration or the T2 duration.
90. The non-transitory computer-readable medium of any of clauses 83-85, further comprising:
code for causing the first UE to transmit, at a media access control (MAC) layer, an indication of a channel access priority class (CAPC) associated with the sidelink transmission;
code for causing the first UE to receive, at the MAC layer, at least one of contention window information or an LBT counter information associated with the CAPC; and
code for causing the first UE to determine, at the MAC layer, the projected LBT completion time based on the at least one of the contention window information or the LBT counter information.
91. The non-transitory computer-readable medium of clause 90, wherein the code for causing the first UE to determine the projected LBT completion time is further configured to:
determine, at the MAC layer based on the contention window information, a w parameter; and
determine, at the MAC layer, the projected LBT completion time based on an arbitration interframe spacing (AIFS)+w×9 microseconds.
92. The non-transitory computer-readable medium of clause 84, wherein the code for causing the first UE to determine the at least one of the sensing window or the first resource selection window is further configured to:
determine, by a physical (PHY) layer based on the projected LBT completion time, the at least one of the T1 duration or the T2 duration.
93. The non-transitory computer-readable medium of clause 92, further comprising:
code for causing the first UE to receive, by PHY layer, an indication of a channel access priority class (CAPC) associated with the sidelink transmission; and code for causing the first UE to determine, at the PHY layer based on the CAPC, the projected LBT completion time.

94. The non-transitory computer-readable medium of clause 93, further comprising:
code for causing the first UE to determine, at the PHY layer, one or more resource selection windows, each resource selection window associated with a CAPC, wherein the code for causing the first UE to determine the at least one of the sensing window or the first resource selection window is further configured to:
select, at the PHY layer based on the CAPC, the first resource selection window from the one or more resource selection windows.

95. The non-transitory computer-readable medium of clause 84, further comprising:
code for causing the first UE to generate, in a slot n, a medium access control (MAC) packet data unit (PDU); and
code for causing the first UE to generate the resource selection trigger based on a later time between the slot n and a T3 duration before a slot m corresponding to the projected LBT completion time.

96. The non-transitory computer-readable medium of clause 95, wherein the code for causing the first UE to determine the at least one of the sensing window or the first resource selection window is further configured to:
determine the sensing window based on a $T_{proc,0}$ duration before the resource selection trigger.

97. The non-transitory computer-readable medium of clause 83, further comprising:
code for causing the first UE to receive, by a physical (PHY) layer, an indication of at least one of a T1 duration or a T2 duration, the at least one of the T1 duration or the T2 duration being based on the projected LBT completion time,
wherein the code for causing the first UE to determine the at least one of the sensing window or the first resource selection window is further configured to:
determine, at the PHY layer, a start of the first resource selection window based on the T1 duration; and
determine, at the PHY layer, an end of the first resource selection window based on the T2 duration.

98. The non-transitory computer-readable medium of clause 83, further comprising:
code for causing the first UE to filter, based on the projected LBT completion time, the subset of resources.

99. The non-transitory computer-readable medium of clause 98, wherein the code for causing the first UE to filter the subset of resources is configured to:
exclude, at a medium access control (MAC) layer, any resource in the subset of resources at an earlier time than the projected LBT completion time.

100. The non-transitory computer-readable medium of clause 83, further comprising:
code for causing the first UE to retransmit, using a second resource of the subset of resources, the sidelink transmission.

101. The non-transitory computer-readable medium of clause 100, wherein the code for causing the first UE to select the at least the first resource is configured to:
select an earliest available resource from the subset of resources as the first resource; and select a next available resource from the subset of resources as the second resource.

102. The non-transitory computer-readable medium of clause 100, wherein the code for causing the first UE to select the at least the first resource is configured to:
select, randomly, the first resource and the second resource from the subset of resources.

103. The non-transitory computer-readable medium of clause 102, wherein the code for causing the first UE to retransmit the sidelink transmission is further configured to:
retransmit the sidelink transmission using the second resource is based on a time gap between the first resource and the second resource satisfying a projected LBT duration.

104. The non-transitory computer-readable medium of clause 103, wherein the code for causing the first UE to select the at least the first resource is configured to:
select, randomly, a first pair of resources from the subset of resources; and
select, randomly in response to a determination that a time gap between the first pair of resources fails to satisfy the projected LBT duration, a second pair of resources from the subset of resources, wherein the second pair of resources includes the first resource and the second resource.

105. The non-transitory computer-readable medium of clause 102, wherein:
the code for causing the first UE to select the at least the first resource is configured to:
select, randomly, a first pair of resources from the subset of resources; and
select, randomly in response to a determination that a first time gap between the first pair of resources fails to satisfy the projected LBT duration, a second pair of resources from the subset of resources; and
determine whether a second time gap between the second pair of resources is longer than the first time gap, and
the first resource and the second resource correspond to the first pair of resources when the first time gap longer than the first time gap, or the first resource and the second resource correspond to the second pair of resources when the second time gap longer than the first time gap.

106. The non-transitory computer-readable medium of any of clauses 83-91, 95, 96, or 98-105, further comprising:
code for causing the first UE to identify, based on the sensing, candidate resources within the first resource selection window; and
code for causing the first UE to identify the subset of resources from the candidate resources by excluding any resource in the candidate resource that is at least partially overlapping with an LBT gap.

107. The non-transitory computer-readable medium of clause 106, further comprising:
code for causing the first UE to receive, by a physical (PHY) layer, a request to provide resources without any LBT gap.

108. The non-transitory computer-readable medium of any of clauses 83-91, 95, 96, or 98-105, further comprising:
code for causing the first UE to identify, based on the sensing, candidate resources within the first resource selection window; and code for causing the first UE to identify the subset of resources from the candidate resources by excluding any resource in the candidate resources that overlaps with an LBT gap by more than Z symbols.

109. The non-transitory computer-readable medium of clause 108, further comprising:
code for causing the first UE to receive, by a physical (PHY) layer, a request to provide resources that do not overlap with an LBT gap by more than Z symbols.

110. The non-transitory computer-readable medium of clause 108, further comprising:
code for causing the first UE to transmit, at the PHY layer, an indication of the subset of resources and an indication of a number of symbols overlapping with an LBT gap for each resource of the subset of resources.

111. The non-transitory computer-readable medium of any of clauses 83-87, 92-94, 97, 98, or 100-110, further comprising:
code for causing the first UE to receive, by a medium access control (MAC) layer, an indication of the subset of resources and an indication of a number of symbols overlapping with an LBT gap for each resource of the subset of resources.

112. The non-transitory computer-readable medium of clause 111, wherein the code for causing the first UE to select the at least the first resource is configured to:
select, randomly at the MAC layer, the first resource from one or more resources in the subset of resources that are non-overlapping with any LBT gap.

113. The non-transitory computer-readable medium of clause 111, wherein the code for causing the first UE to select the at least the first resource is configured to:
select, at the MAC layer, the first resource from the subset of resources based on a number of symbols in the first resource that overlaps with an LBT gap.

114. The non-transitory computer-readable medium of any of clauses 83-113, wherein the code for causing the first UE to identify the subset of resources is further configured to:
identify the subset of resources further based on LBT types associated with the subset of resources.

115. The non-transitory computer-readable medium of clause 114, wherein:
the code for causing the first UE to sense in the sidelink resource pool is further configured to:
monitor for channel occupancy time (COT) sharing opportunities, and
one or more of the subset of resources are based on the monitoring.

116. The non-transitory computer-readable medium of clause 114, further comprising:
code for causing the first UE to receive, by a physical (PHY) layer, a first LBT type indication,
wherein the code for causing the first UE to identify the subset of resources is further configured to:
identify the subset of resources further based on the first LBT type indication.

117. The non-transitory computer-readable medium of clause 116, wherein the code for causing the first UE to receive the first LBT type indication is further configured to:
receive, at the PHY layer, the first LBT type indication indicating at least one of a type 2 LBT, channel access priority class (CAPC) associated with the sidelink transmission, or a transmission power for the sidelink transmission.

118. The non-transitory computer-readable medium of clause 116, further comprising:
code for causing the first UE to receive, at the PHY layer, a resource reevaluation request for the first resource, the resource reevaluation request including a second LBT type indication different from the first LBT type indication.

119. The non-transitory computer-readable medium of clause 118, further comprising:
code for causing the first UE to transmit, at the PHY layer, an indication indicating that there is no resource available based on the second LBT type indication.

120. The non-transitory computer-readable medium of any of clauses 83-87, 92-94, 97, 98, 100-110, or 114-115, further comprising:
code for causing the first UE to transmit, by a medium access control (MAC) layer, an LBT type indication including at least one of a first LBT type or a second LBT type.

121. The non-transitory computer-readable medium of clause 120, wherein the code for causing the first UE to transmit the first LBT type indication is further configured to:
transmit, at the MAC layer, the first LBT type indication indicating at least one of a type 2 LBT, channel access priority class (CAPC) associated with the sidelink transmission, or a transmission power for the sidelink transmission.

122. The non-transitory computer-readable medium of clause 120, further comprising:
code for causing the first UE to transmit, at the MAC layer, a resource reevaluation request for the first resource, the resource reevaluation request including a second LBT type indication different from the first LBT type indication.

123. The non-transitory computer-readable medium of clause 122, further comprising:
code for causing the first UE to receive, at the MAC layer, an indication indicating that there is no resource available based on the second LBT type indication.

124. A first user equipment (UE) comprising:
means for determining, based on a projected listen-before-talk (LBT) completion time, at least one of a sensing window or a first resource selection window;
means for sensing, based on the determining, in a sidelink resource pool within a shared radio frequency band;
means for identifying, based on the sensing, a subset of resources from the sidelink resource pool that are within the first resource selection window;
means for selecting at least a first resource from the subset of resources; and
means for transmitting, to a second UE using the selected first resource, a sidelink transmission.

125. The first UE of clause 124, wherein:
the means for determining the at least one of the sensing window or the first resource selection window is further configured to:
determine, based on the projected LBT completion time, at least one of a T1 duration relative to a resource selection trigger or a T2 duration relative to the resource selection trigger, and the first resource selection window starts at an end of the T1 duration and ends at an end of the T2 duration.

126. The first UE of clause 125, wherein the means for determining the at least one of the sensing window or the first resource selection window is further configured to:
determine the T1 duration such that the first resource selection window starts after the projected LBT completion time; and
determine the T2 duration such that that a difference between the T1 duration and the T2 duration is greater than a projected LBT duration.

127. The first UE of any of clauses 125 or 126, further comprising:
means for determining the projected LBT completion time based on at least one of a channel access priority class (CAPC) associated with the sidelink transmission, an interframe spacing, a contention window size associated with the CAPC, an LBT counter value associated with the CAPC, an LBT energy detection threshold, or a transmission power for transmitting the sidelink transmission.

128. The first UE of clause 127, further comprising:
means for performing, in the shared radio frequency band, one or more LBTs, each LBT of the one or more LBT associated with a CAPC,
wherein the LBT counter value is associated with a first LBT of the one or more LBTs, the first LBT being associated with the CAPC of the sidelink transmission.

129. The first UE of clause 125, wherein the means for determining the at least one of the sensing window or the first resource selection window is further configured to:
determine, by a media access control (MAC) layer based on the projected LBT completion time, the at least one of the T1 duration or the T2 duration.

130. The first UE of clause 129, further comprising:
means for transmitting, at the MAC layer, an indication of the at least one of the T1 duration or the T2 duration.

131. The first UE of any of clauses 124-126, further comprising:
means for transmitting, at a media access control (MAC) layer, an indication of a channel access priority class (CAPC) associated with the sidelink transmission;
means for receiving, at the MAC layer, at least one of contention window information or an LBT counter information associated with the CAPC; and
means for determining, at the MAC layer, the projected LBT completion time based on the at least one of the contention window information or the LBT counter information.

132. The first UE of clause 131, wherein the means for determining the projected LBT completion time is further configured to:
determine, at the MAC layer based on the contention window information, a w parameter; and
determine, at the MAC layer, the projected LBT completion time based on an arbitration interframe spacing (AIFS)+w×9 microseconds.

133. The first UE of clause 125, wherein the means for determining the at least one of the sensing window or the first resource selection window is further configured to:
determine, by a physical (PHY) layer based on the projected LBT completion time, the at least one of the T1 duration or the T2 duration.

134. The first UE of clause 133, further comprising:
means for receiving, by PHY layer, an indication of a channel access priority class (CAPC) associated with the sidelink transmission; and
means for determining, at the PHY layer based on the CAPC, the projected LBT completion time.

135. The first UE of clause 134, further comprising:
means for determining, at the PHY layer, one or more resource selection windows, each resource selection window associated with a CAPC,
wherein the means for determining the at least one of the sensing window or the first resource selection window is further configured to:
select, at the PHY layer based on the CAPC, the first resource selection window from the one or more resource selection windows.

136. The first UE of clause 125, further comprising:
means for generating, in a slot n, a medium access control (MAC) packet data unit (PDU); and
means for generating the resource selection trigger based on a later time between the slot n and a T3 duration before a slot m corresponding to the projected LBT completion time.

137. The first UE of clause 136, wherein the means for determining the at least one of the sensing window or the first resource selection window is further configured to:
determine the sensing window based on a $T_{proc,0}$ duration before the resource selection trigger.

138. The first UE of clause 124, further comprising:
means for receiving, by a physical (PHY) layer, an indication of at least one of a T1 duration or a T2 duration, the at least one of the T1 duration or the T2 duration being based on the projected LBT completion time,
wherein the means for determining the at least one of the sensing window or the first resource selection window is further configured to:
determine, at the PHY layer, a start of the first resource selection window based on the T1 duration; and
determine, at the PHY layer, an end of the first resource selection window based on the T2 duration.

139. The first UE of clause 124, further comprising:
means for filtering, based on the projected LBT completion time, the subset of resources.

140. The first UE of clause 139, wherein the means for filtering the subset of resources is configured to:
exclude, at a medium access control (MAC) layer, any resource in the subset of resources at an earlier time than the projected LBT completion time.

141. The first UE of clause 124, further comprising:
means for retransmitting, using a second resource of the subset of resources, the sidelink transmission.

142. The first UE of clause 141, wherein the means for selecting the at least the first resource is configured to:
select an earliest available resource from the subset of resources as the first resource; and
select a next available resource from the subset of resources as the second resource.

143. The first UE of clause 141, wherein the means for selecting the at least the first resource is configured to:

select, randomly, the first resource and the second resource from the subset of resources.

144. The first UE of clause 143, wherein the means for retransmitting the sidelink transmission is further configured to:
retransmit the sidelink transmission using the second resource is based on a time gap between the first resource and the second resource satisfying a projected LBT duration.

145. The first UE of clause 144, wherein the means for selecting the at least the first resource is configured to:
select, randomly, a first pair of resources from the subset of resources; and
select, randomly in response to a determination that a time gap between the first pair of resources fails to satisfy the projected LBT duration, a second pair of resources from the subset of resources, wherein the second pair of resources includes the first resource and the second resource.

146. The first UE of clause 143, wherein:
the means for selecting the at least the first resource is configured to:
select, randomly, a first pair of resources from the subset of resources; and
select, randomly in response to a determination that a first time gap between the first pair of resources fails to satisfy the projected LBT duration, a second pair of resources from the subset of resources; and
determine whether a second time gap between the second pair of resources is longer than the first time gap, and
the first resource and the second resource correspond to the first pair of resources when the first time gap longer than the first time gap, or the first resource and the second resource correspond to the second pair of resources when the second time gap longer than the first time gap.

147. The first UE of any of clauses 124-132, 136, 137, or 139-146, further comprising:
means for identifying, based on the sensing, candidate resources within the first resource selection window; and
means for identifying the subset of resources from the candidate resources by excluding any resource in the candidate resource that is at least partially overlapping with an LBT gap.

148. The first UE of clause 147, further comprising:
means for receiving, by a physical (PHY) layer, a request to provide resources without any LBT gap.

149. The first UE of any of clauses 124-132, 136, 137, or 139-146, further comprising:
means for identifying, based on the sensing, candidate resources within the first resource selection window; and
means for identifying the subset of resources from the candidate resources by excluding any resource in the candidate resources that overlaps with an LBT gap by more than Z symbols.

150. The first UE of clause 149, further comprising:
means for receiving, by a physical (PHY) layer, a request to provide resources that do not overlap with an LBT gap by more than Z symbols.

151. The first UE of clause 149, further comprising:
means for transmitting, at the PHY layer, an indication of the subset of resources and an indication of a number of symbols overlapping with an LBT gap for each resource of the subset of resources.

152. The first UE of any of clauses 124-128, 133-135, 138, 139, 141-151, further comprising:
means for receiving, by a medium access control (MAC) layer, an indication of the subset of resources and an indication of a number of symbols overlapping with an LBT gap for each resource of the subset of resources.

153. The first UE of clause 152, wherein the means for selecting the at least the first resource is configured to:
select, randomly at the MAC layer, the first resource from one or more resources in the subset of resources that are non-overlapping with any LBT gap.

154. The first UE of clause 152, wherein the means for selecting the at least the first resource is configured to:
select, at the MAC layer, the first resource from the subset of resources based on a number of symbols in the first resource that overlaps with an LBT gap.

155. The first UE of any of clauses 124-154, wherein the means for identifying the subset of resources is further configured to:
identify the subset of resources further based on LBT types associated with the subset of resources.

156. The first UE of clause 155, wherein:
the means for sensing in the sidelink resource pool is further configured to:
monitor for channel occupancy time (COT) sharing opportunities, and one or more of the subset of resources are based on the monitoring.

157. The first UE of clause 155, further comprising:
means for receiving, at a physical (PHY) layer, a first LBT type indication,
wherein the means for identifying the subset of resources is further configured to:
identify the subset of resources further based on the first LBT type indication.

158. The first UE of clause 157, wherein the means for receiving the first LBT type indication is further configured to:
receive, at the PHY layer, the first LBT type indication indicating at least one of a type 2 LBT, channel access priority class (CAPC) associated with the sidelink transmission, or a transmission power for the sidelink transmission.

159. The first UE of clause 157, further comprising:
means for receiving, at the PHY layer, a resource reevaluation request for the first resource, the resource reevaluation request including a second LBT type indication different from the first LBT type indication.

160. The first UE of clause 159, further comprising:
means for transmitting, at the PHY layer, an indication indicating that there is no resource available based on the second LBT type indication.

161. The first UE of any of clauses 124-128, 133-135, 138, 139, 141-151, or 155-156, further comprising:
means for transmitting, by a medium access control (MAC) layer, an LBT type indication including at least one of a first LBT type or a second LBT type.

162. The first UE of clause 161, wherein the means for transmitting the first LBT type indication is further configured to:
transmit, at the MAC layer, the first LBT type indication indicating at least one of a type 2 LBT, channel access priority class (CAPC) associated with the sidelink transmission, or a transmission power for the sidelink transmission.

163. The first UE of clause 161, further comprising:
means for transmitting, at the MAC layer, a resource reevaluation request for the first resource, the resource reevaluation request including a second LBT type indication different from the first LBT type indication.

164. The first UE of clause 163, further comprising:
means for receiving, at the MAC layer, an indication indicating that there is no resource available based on the second LBT type indication.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
determining a first resource selection window relative to a projected listen-before-talk (LBT) completion time for an LBT procedure performed by the first UE, wherein the projected LBT completion time is based on an estimated duration of the LBT procedure;
sensing, based on the determining, in a sidelink resource pool within a shared radio frequency band;
identifying, based on the sensing, a subset of resources from the sidelink resource pool that are within the first resource selection window;
selecting at least a first resource from the subset of resources; and
transmitting, to a second UE using the selected first resource, a sidelink transmission.

2. The method of claim 1, wherein the determining the first resource selection window relative to the projected LBT completion time comprises:
determining, based on the projected LBT completion time, at least one of a T1 duration relative to a resource selection trigger or a T2 duration relative to the resource selection trigger,
wherein the first resource selection window starts at an end of the T1 duration and ends at an end of the T2 duration.

3. The method of claim 2, wherein the determining the at least one of the T1 duration or the T2 duration comprises:
determining the T1 duration such that the first resource selection window starts after the projected LBT completion time; and
determining the T2 duration such that that a difference between the T1 duration and the T2 duration is greater than a projected LBT duration.

4. The method of claim 2, further comprising:
determining the projected LBT completion time based on at least one of a channel access priority class (CAPC) associated with the sidelink transmission, an interframe spacing, a contention window size associated with the CAPC, an LBT counter value associated with the CAPC, an LBT energy detection threshold, or a transmission power for transmitting the sidelink transmission.

5. The method of claim 2, wherein the determining the at least one of the T1 duration or the T2 duration comprises:
determining, by a media access control (MAC) layer based on the projected LBT completion time, the at least one of the T1 duration or the T2 duration.

6. The method of claim 5, further comprising:
transmitting, by the MAC layer, an indication of the at least one of the T1 duration or the T2 duration.

7. The method of claim 1, further comprising:
transmitting, by a media access control (MAC) layer, an indication of a channel access priority class (CAPC) associated with the sidelink transmission;
receiving, by the MAC layer, at least one of contention window information or an LBT counter information associated with the CAPC; and
determining, by the MAC layer, the projected LBT completion time based on the at least one of the contention window information or the LBT counter information.

8. The method of claim 2, wherein the determining the at least one of the T1 duration or the T2 duration comprises:
determining, by a physical (PHY) layer based on the projected LBT completion time, the at least one of the T1 duration or the T2 duration.

9. The method of claim 8, further comprising:
receiving, by PHY layer, an indication of a channel access priority class (CAPC) associated with the sidelink transmission; and
determining, by the PHY layer based on the CAPC, the projected LBT completion time.

10. The method of claim 9, further comprising:
determining, by the PHY layer, one or more resource selection windows, each resource selection window associated with a CAPC,
wherein the determining the first resource selection window comprises:
selecting, by the PHY layer based on the CAPC, the first resource selection window from the one or more resource selection windows.

11. The method of claim 1, further comprising:
generating, in a slot n, a medium access control (MAC) packet data unit (PDU); and
generating a resource selection trigger based on a later time between the slot n and a T3 duration before a slot m corresponding to the projected LBT completion time.

12. The method of claim 1, further comprising:
receiving, by a physical (PHY) layer, an indication of at least one of a T1 duration or a T2 duration, the at least one of the T1 duration or the T2 duration being based on the projected LBT completion time,
wherein the determining the first resource selection window comprises:
determining, by the PHY layer, a start of the first resource selection window based on the T1 duration; and
determining, by the PHY layer, an end of the first resource selection window based on the T2 duration.

13. The method of claim 1, further comprising:
filtering, based on the projected LBT completion time, the subset of resources.

14. The method of claim 13, wherein the filtering the subset of resources comprises:
excluding, by a medium access control (MAC) layer, any resource in the subset of resources at an earlier time than the projected LBT completion time.

15. The method of claim 1, further comprising:
retransmitting, using a second resource of the subset of resources, the sidelink transmission,
wherein the selecting the at least the first resource comprises:
selecting an earliest available resource from the subset of resources as the first resource; and
selecting a next available resource from the subset of resources as the second resource.

16. The method of claim 1, further comprising:
retransmitting, using a second resource of the subset of resources, the sidelink transmission,
wherein the selecting the at least the first resource comprises:
selecting, randomly, the first resource and the second resource from the subset of resources.

17. The method of claim 16, wherein the retransmitting the sidelink transmission using the second resource is based on a time gap between the first resource and the second resource satisfying a projected LBT duration.

18. The method of claim 16, wherein the selecting the at least the first resource comprises:
selecting, randomly, a first pair of resources from the subset of resources; and
selecting, randomly in response to a determination that a first time gap between the first pair of resources fails to satisfy the projected LBT duration, a second pair of resources from the subset of resources; and
determining whether a second time gap between the second pair of resources is longer than the first time gap,
wherein the first resource and the second resource correspond to the first pair of resources when the first time gap longer than the first time gap, or
wherein the first resource and the second resource correspond to the second pair of resources when the second time gap longer than the first time gap.

19. The method of claim 1, further comprising:
identifying, based on the sensing, candidate resources within the first resource selection window; and
identifying the subset of resources from the candidate resources by excluding any resource in the candidate resource that is at least partially overlapping with an LBT gap.

20. The method of claim 19, further comprising:
receiving, by a physical (PHY) layer, a request to provide resources without any LBT gap.

21. The method of claim 1, further comprising:
identifying, based on the sensing, candidate resources within the first resource selection window; and
identifying the subset of resources from the candidate resources by excluding any resource in the candidate resources that overlaps with an LBT gap by more than Z symbols.

22. The method of claim 21, further comprising:
receiving, by a physical (PHY) layer, a request to provide resources that do not overlap with an LBT gap by more than Z symbols.

23. The method of claim 21, further comprising:
transmitting, by the PHY layer, an indication of the subset of resources and an indication of a number of symbols overlapping with an LBT gap for each resource of the subset of resources.

24. The method of claim 1, further comprising:
receiving, by a medium access control (MAC) layer, an indication of the subset of resources and an indication of a number of symbols overlapping with an LBT gap for each resource of the subset of resources.

25. The method of claim 24, wherein the selecting the at least the first resource comprises:
selecting, randomly at the MAC layer, the first resource from one or more resources in the subset of resources that are non-overlapping with any LBT gap.

26. The method of claim 24, wherein the selecting the at least the first resource comprises:
selecting, at the MAC layer, the first resource from the subset of resources based on a number of symbols in the first resource that overlaps with an LBT gap.

27. The method of claim 1, wherein the identifying the subset of resources is further based on LBT types associated with the subset of resources.

28. A first user equipment (UE) comprising:
a processor configured to:
determine a first resource selection window relative to a projected listen-before-talk (LBT) completion time for an LBT procedure performed by the first UE, wherein the projected LBT completion time is based on an estimated duration of the LBT procedure;
sense, based on the determining, in a sidelink resource pool within a shared radio frequency band;
identify, based on the sensing, a subset of resources from the sidelink resource pool that are within the first resource selection window; and select at least a first resource from the subset of resources; and a transceiver configured to:
transmit, to a second UE using the selected first resource, a sidelink transmission.

29. A non-transitory computer-readable medium having program code recorded thereon, the program code comprising:
code for causing a first user equipment (UE) to determine a first resource selection window relative to a projected listen-before-talk (LBT) completion time for an LBT procedure performed by the first UE, wherein the projected LBT completion time is based on an estimated duration of the LBT procedure;
code for causing the first UE to sense, based on the determining, in a sidelink resource pool within a shared radio frequency band;
code for causing the first UE to identify, based on the sensing, a subset of resources from the sidelink resource pool that are within the first resource selection window;
code for causing the first UE to select at least a first resource from the subset of resources; and
code for causing the first UE to transmit, to a second UE using the selected first resource, a sidelink transmission.

30. A first user equipment (UE) comprising:
means for determining a first resource selection window relative to a projected listen-before-talk (LBT) completion time for an LBT procedure performed by the first UE, wherein the projected LBT completion time is based on an estimated duration of the LBT procedure;
means for sensing, based on the determining, in a sidelink resource pool within a shared radio frequency band;
means for identifying, based on the sensing, a subset of resources from the sidelink resource pool that are within the first resource selection window;
means for selecting at least a first resource from the subset of resources; and
means for transmitting, to a second UE using the selected first resource, a sidelink transmission.

* * * * *